(12) United States Patent
Suzuki

(10) Patent No.: US 6,950,584 B1
(45) Date of Patent: Sep. 27, 2005

(54) FUNCTIONAL MATERIAL AND FUNCTIONAL DEVICE

(75) Inventor: Masayuki Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1072 days.

(21) Appl. No.: 09/666,167

(22) Filed: Sep. 21, 2000

(30) Foreign Application Priority Data

Sep. 24, 1999 (JP) .......................................... P11-271240

(51) Int. Cl.$^7$ ............................................... G02B 6/00
(52) U.S. Cl. ...................... 385/122; 385/129; 385/130; 385/11; 385/147; 385/141
(58) Field of Search .......................... 385/122, 14, 129, 385/130, 131, 141, 2, 8, 147, 11

(56) References Cited

U.S. PATENT DOCUMENTS

| | | | |
|---|---|---|---|
| 5,647,039 A | 7/1997 | Judkins et al. ................. | 385/37 |
| 6,002,522 A | 12/1999 | Todori et al. ................ | 359/573 |
| 6,380,551 B2 * | 4/2002 | Abe et al. ...................... | 257/15 |
| 6,396,617 B1 * | 5/2002 | Scalora ........................ | 359/248 |
| 6,449,403 B1 * | 9/2002 | Cush et al. .................... | 385/15 |
| 6,590,722 B1 | 7/2003 | Koyama et al. ............ | 359/820 |
| 2002/0197042 A1 * | 12/2002 | Kittaka et al. .............. | 385/131 |
| 2003/0039023 A1 * | 2/2003 | Romagnoli et al. ......... | 359/326 |
| 2004/0080805 A1 * | 4/2004 | Levy .......................... | 359/280 |

FOREIGN PATENT DOCUMENTS

| | | | |
|---|---|---|---|
| JP | 11-183859 | 7/1999 | ............. 385/122 X |
| JP | 11-271240 | 7/1999 | ............. 385/122 X |

* cited by examiner

Primary Examiner—Brian M. Healy
(74) Attorney, Agent, or Firm—Sonnenschein, Nath & Rosenthal LLP

(57) ABSTRACT

Disclosed are a functional material and a functional device, each of which is capable of changing a wavelength of a transmission electromagnetic wave such as transmission light or a transmission sound wave such as a transmission ultrasonic wave through the device on the basis of a signal supplied from external. Each of the functional material and the functional device includes a periodic structure having a periodicity with a unit cycle on the order of a wavelength of an electromagnetic wave or a sound wave, and means for disturbing the periodicity which is inserted in at least one portion of the periodic structure, wherein a wavelength of the electromagnetic wave or sound wave passing through the periodic structure by controlling the means on a signal supplied from external.

90 Claims, 32 Drawing Sheets

COMPARISON BETWEEN CHARACTERISTICS OF KINETIC FUNCTION MATERIALS

| | HIGH POLYMER GEL | | SHAPE MEMORY ALLOY[5] | PIEZOELECTRIC CERAMIC ELEMENT[4] | RUBBER ARTIFICIAL MUSCLE[4] | INTERCALATION MATERIAL[2] | BIOMUSCLE[3] |
|---|---|---|---|---|---|---|---|
| | Ionic polymer-metal composites[1] | GEL PRODUCED BY FREEZING-DEFROSTING METHOD[3] | | | | | |
| DISPLACEMENT | 20 – 30% | | 8% | 0.1% | 20% | [Amino-TiNbO5] SEVERAL TIMES (REACTION DRIVE TYPE) 30% ELECTRIC FIELD DRIVE TYPE) | 50% |
| FORCE (MPa) | 10 – 30 | – | 588 | 300 | | | 0.5-1 |
| SPEED OF RESPONSE | >0.2 sec | | sec to min | $\mu$ sec | | | 0.03-0.2sec |
| DRIVE METHOD | APPLICATION OF VOLTAGE (4-7 V) | CHANGE IN SOLUTION | CHANGE IN TEMPERATURE | APPLICATION OF VOLTAGE (50-800V) | CHANGE IN PNEUMATIC PRESSURE | CHANGE IN SOLUTION (APPLICATION OF VOLTAGE) | |
| OUTPUT-WEIGHT RATIO | – | 01.W/g | 0.1W/g | | | | 0.1-0.3W/g |
| LABORATORY | NEW MEXICO UNIVERSITY | MECHANICAL TECHNOLOGY RESEARCH | NAGAOKA TECHNOLOGY/SCIENCE UNIVERSITY | | | BRIDGESTONE CORPORATION | |

1 "Ionic Polymer-Metal Composites (IPMC) As Biomimetic Sensors, Actuators and Artificial Muscles-A Reviw"
  M.Shahinpoor et al. (University of New-Mexico) http:/www.unm.edu/-amri/paper.html
2 "ORGANIC INTERCALATION ON LAYERED COMPOUND KTiNbO5" S.KIKKAWA and M.KOIZUMI (Osaka Univ.)
  Physica 105B (1981) 234
3 "ARTIFICIAL MUSCLE", MAKOTO SUZUKI (MECHANICAL TECHNOLOGY RESEARCH), APPLIED PHYSICS, 60(1991)256
4 "ACTUATOR PRACTICAL DICTIONARY", SUPERVISED BY SHOUTAROU MIYAIRI, FUJI TECHNO SYSTEM (1988)
5 "ARTIFICIAL MUSCLE" EDITED BY HITOSHI MIYAKE, KAMEDA BOOK SERVICE (1998)

F I G. 1

COMPARISON BETWEEN CHARACTERISTICS OF KINETIC FUNCTION MATERIALS

| | HIGH POLYMER GEL Ionic polymer-metal composites[1] PRODUCED BY FREEZING-DEFROSTING METHOD[1] | SHAPE MEMORY ALLOY[5] | PIEZOELECTRIC CERAMIC ELEMENT[4] | RUBBER ARTIFICIAL MUSCLE[4] | INTERCALATION MATERIAL[2] | BIOMUSCLE[3] |
|---|---|---|---|---|---|---|
| DISPLACEMENT | 20 – 30% | 8% | 0.1% | 20% | [Amino-TiNbO5] SEVERAL TIMES (REACTION DRIVE TYPE) 30% ELECTRIC FIELD DRIVE TYPE) | 50% |
| FORCE (MPa) | 10 – 30 | 588 | 300 | | | 0.5–1 |
| SPEED OF RESPONSE | >0.2 sec | sec to min | μ sec | | | 0.03–0.2sec |
| DRIVE METHOD | APPLICATION OF VOLTAGE (4–7 V) | CHANGE IN SOLUTION | APPLICATION OF VOLTAGE (50–800V) | CHANGE IN PNEUMATIC PRESSURE | CHANGE IN SOLUTION (APPLICATION OF VOLTAGE) | |
| OUTPUT-WEIGHT RATIO | — | 0.1W/g | | | | 0.1–0.3W/g |
| LABORATORY | NEW MEXICO UNIVERSITY MECHANICAL TECHNOLOGY RESEARCH | NAGAOKA TECHNOLOGY/SCIENCE UNIVERSITY | | BRIDGESTONE CORPORATION | | |

1 "Ionic Polymer-Metal Composites (IPMC) As Biomimetic Sensors, Actuators and Artificial Muscles-A Review"
  M.Shahinpoor et al (University of New-Mexico) http:/www.unm.edu/-amri/paper.html
2 "ORGANIC INTERCALATION ON LAYERED COMPOUND KTiNbO5" S.KIKKAWA and M.KOIZUMI (Osaka Univ.)
  Physica 105B (1981) 234
3 "ARTIFICIAL MUSCLE", MAKOTO SUZUKI (MECHANICAL TECHNOLOGY RESEARCH), APPLIED PHYSICS, 60(1991)266
4 "ACTUATOR PRACTICAL DICTIONARY", SUPERVISED BY SHOUTAROU MIYAIRI, FUJI TECHNO SYSTEM (1988)
5 "ARTIFICIAL MUSCLE" EDITED BY HITOSHI MIYAKE, KAMEDA BOOK SERVICE (1998)

FIG. 2

DIFFERENCE BETWEEN ELECTROMAGNETIC WAVE AND SOUND WAVE IN TERMS OF WAVELENGTH

| | NAME OF SOUND WAVE (ULTRASONIC WAVE) | WAVE-LENGTH, λ | NAME OF ELECTRO-MAGNETIC WAVE | |
|---|---|---|---|---|
| 1GHz | VERY HIGH FREQUENCY ULTRASONIC WAVE | 380nm | VISIBLE LIGHT RAY | |
| | | 780nm | NEAR INFRARED RADIATION | |
| | | 1.5μm | MID INFRARED RADIATION | |
| | | 5μm | FAR INFRARED RADIATION | |
| 1MHz | HIGH FREQUENCY ULTRASONIC WAVE | 100μm | VERY FAR INFRARED RADIATION | 3THz |
| | | 1mm | | 300GHz |
| | LOW FREQUENCY ULTRASONIC WAVE | 1cm | MILLIMETER WAVE | 30GHz |
| 20KHz | AUDIBLE SOUND WAVE (HIGH TEMPERATURE) | 10cm | MICROWAVE | 3GHz |
| | | | SUPERHIGH HIGH FREQUENCY WAVE | |
| | | 1m | | 300MHz |
| | AUDIBLE SOUND WAVE (LOW TEMPERATURE) | 10m | VERY HIGH FREQUENCY WAVE | 30MHz |
| 20Hz | LOW FREQUENCY WAVE | | HIGH FREQUENCY WAVE | |

F I G. 3
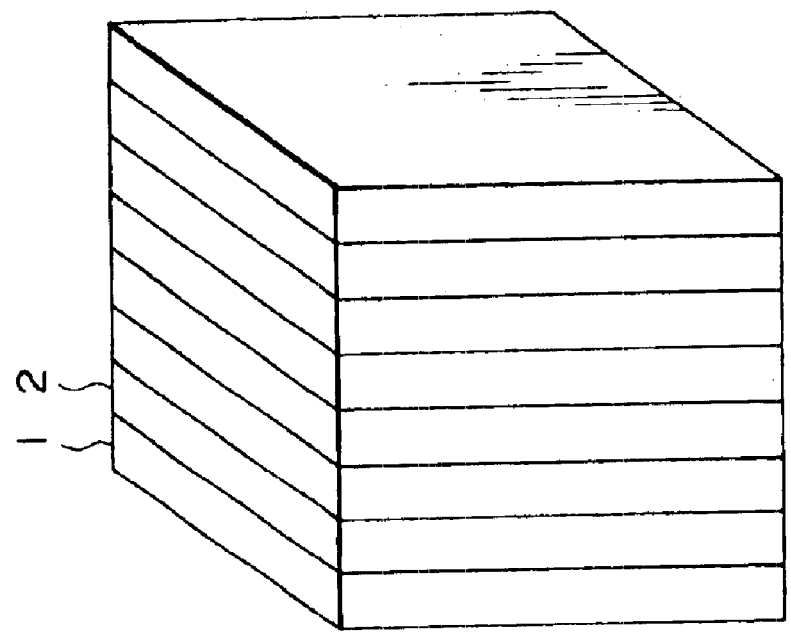
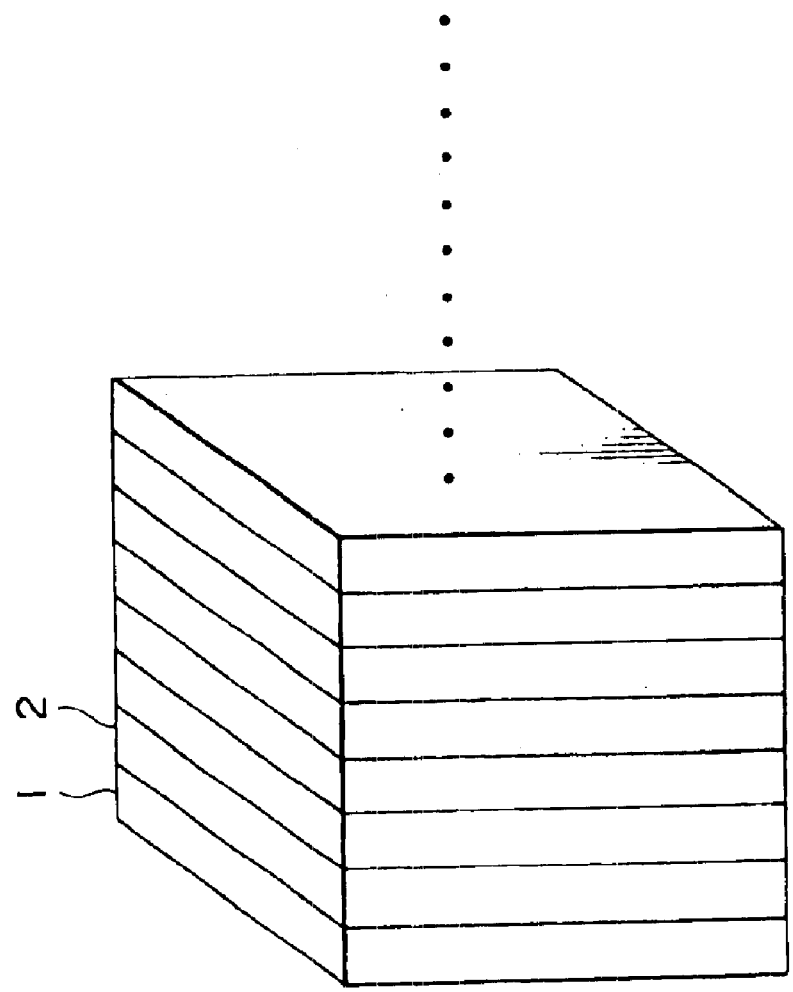

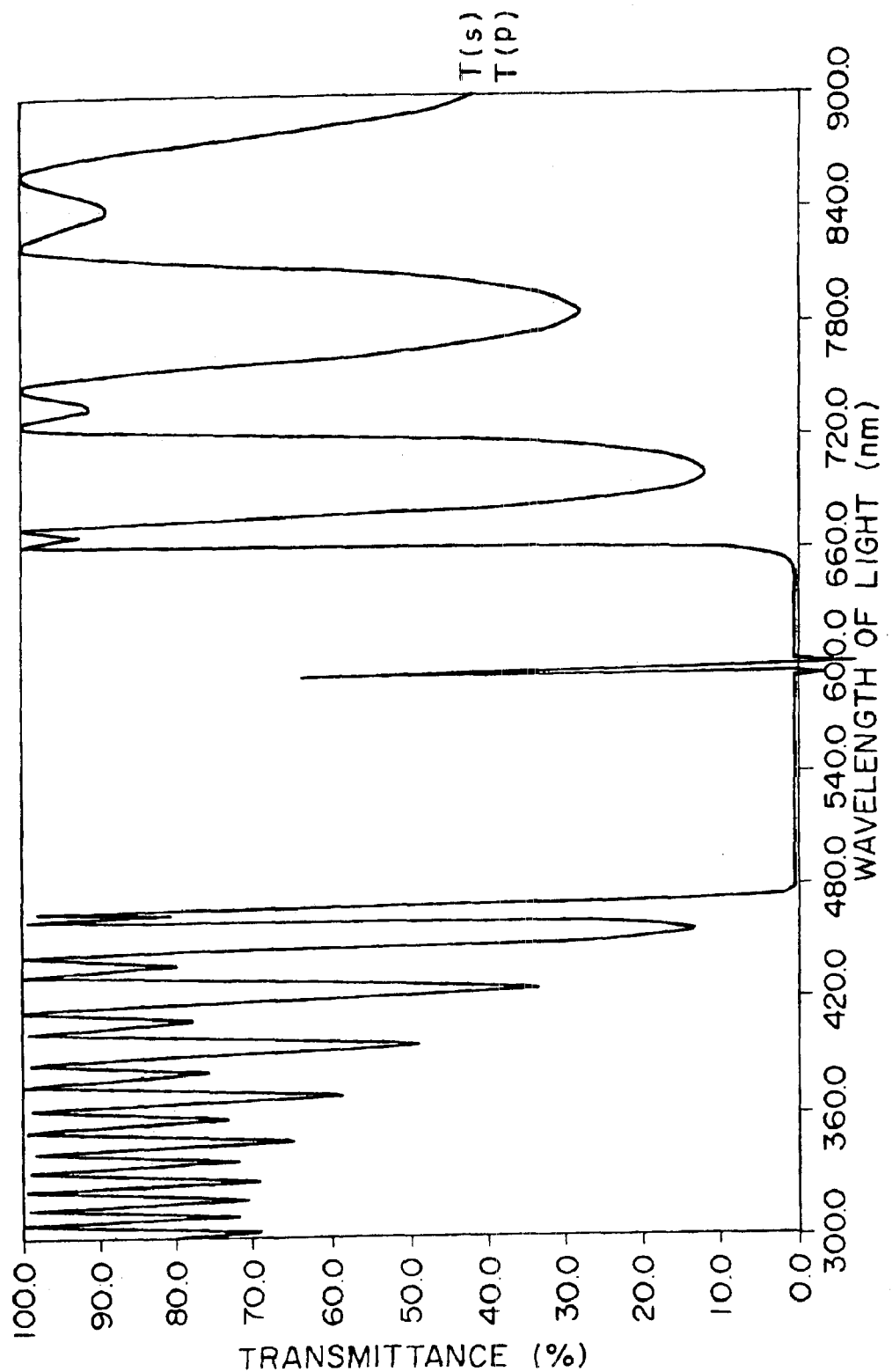

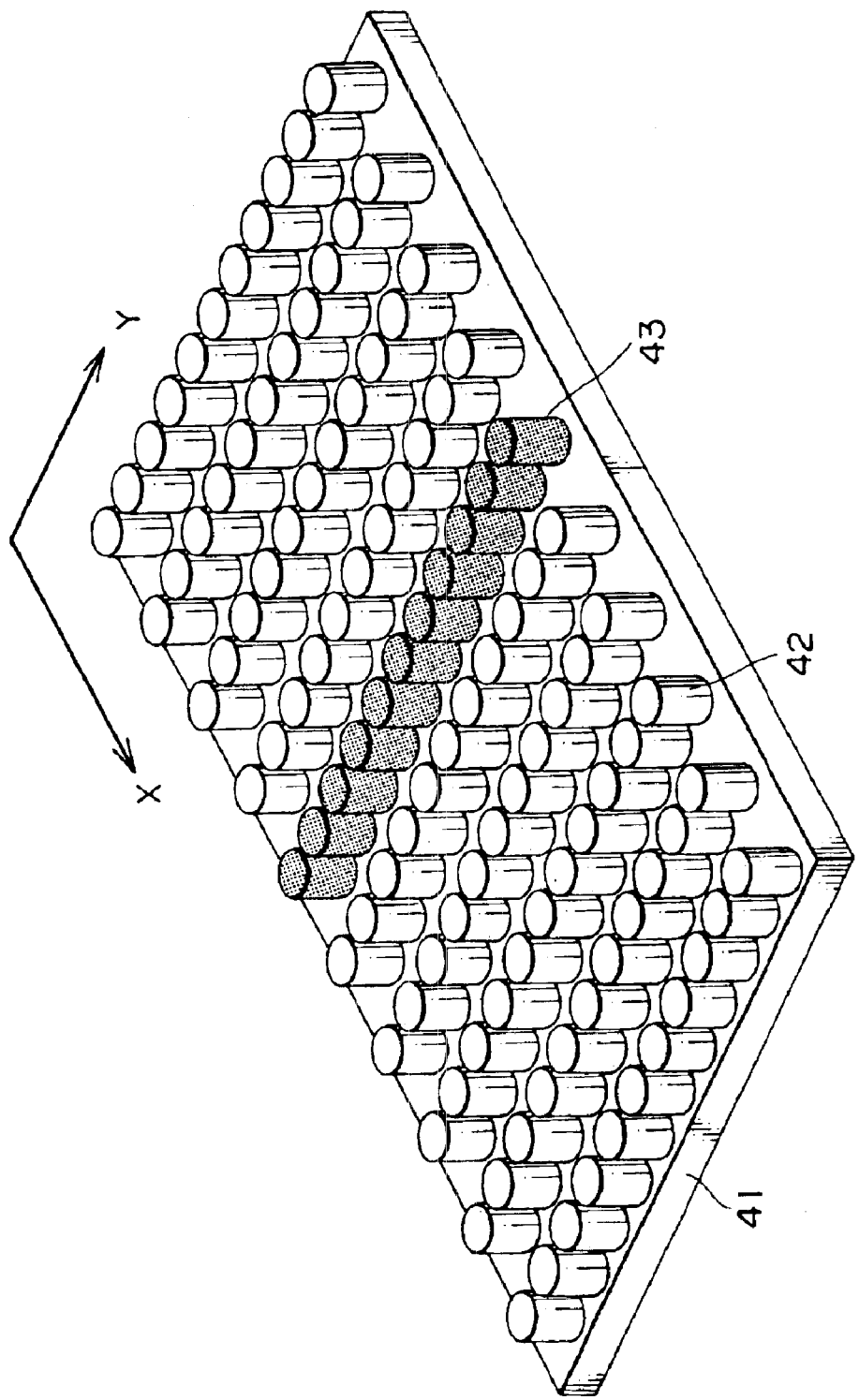

F I G. 22A 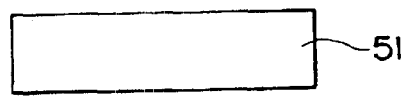
F I G. 22B 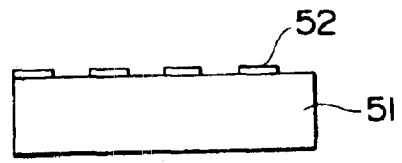
F I G. 22C 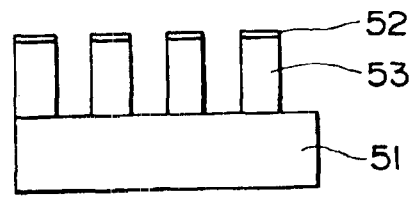
F I G. 22D 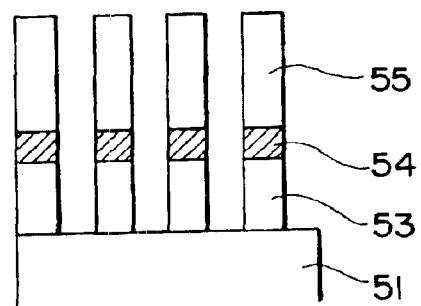
F I G. 23 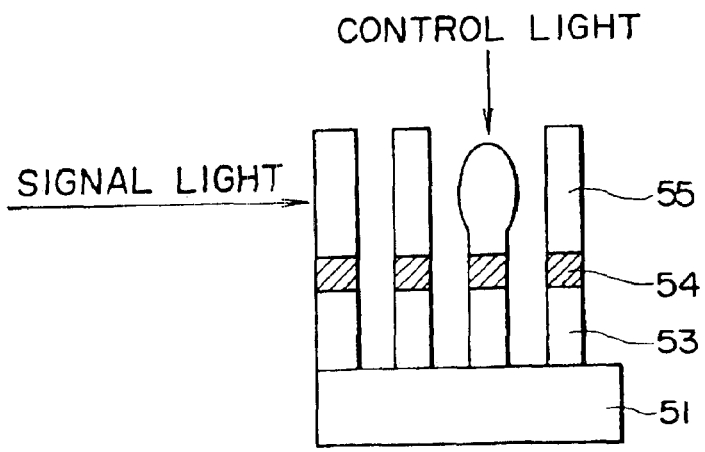

F I G. 29
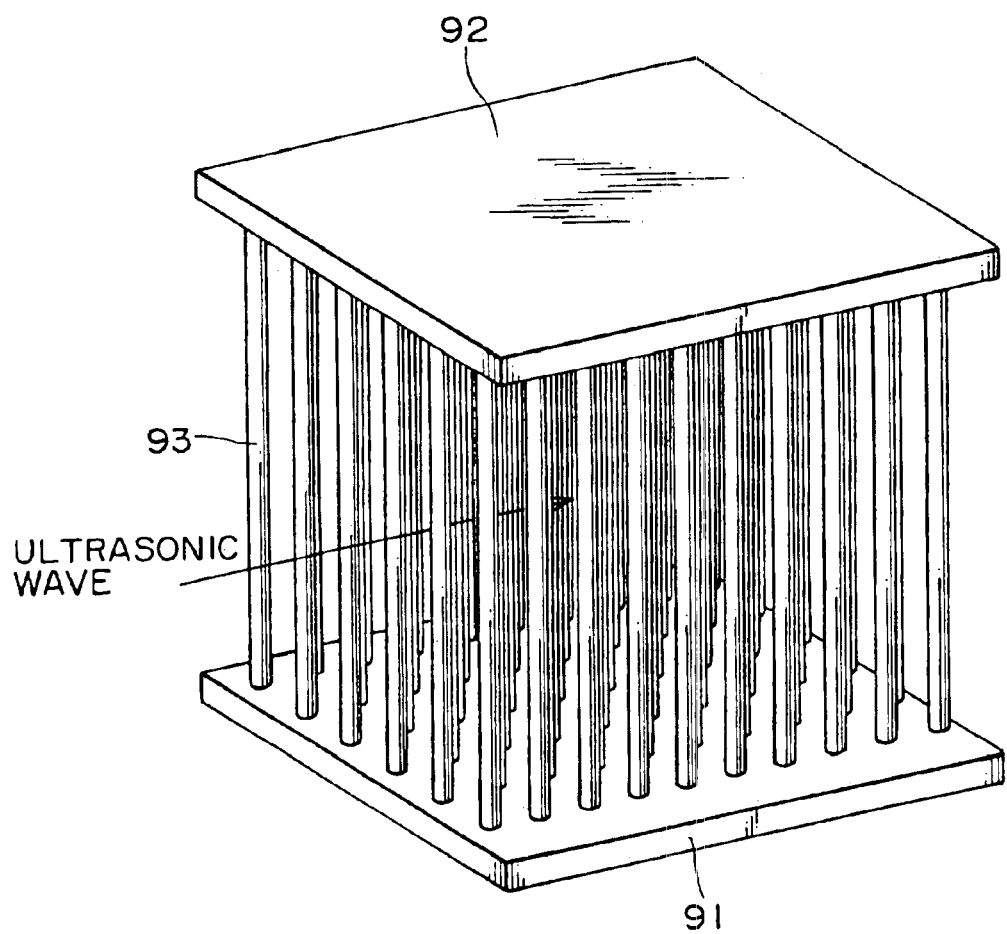

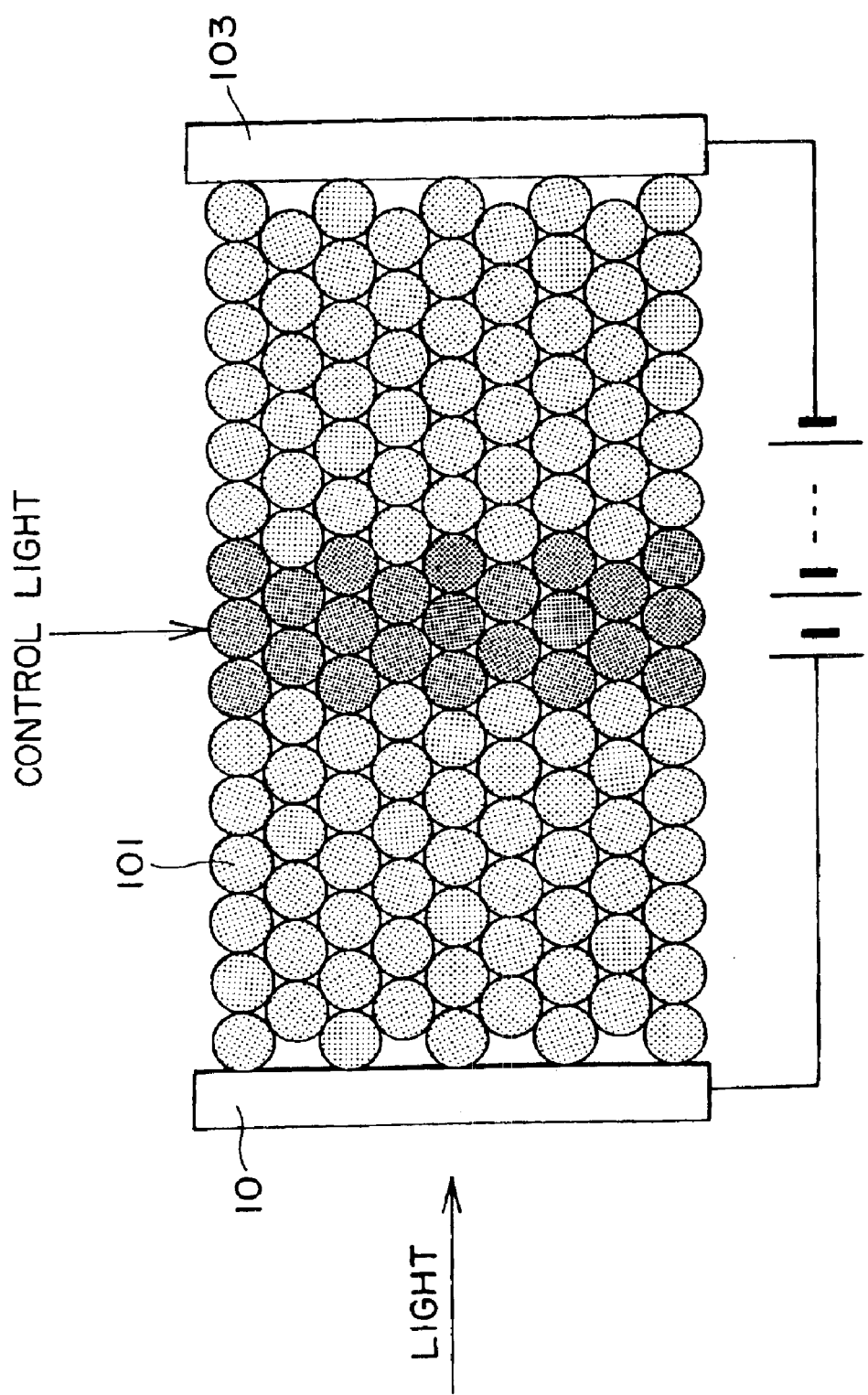

FUNCTIONAL MATERIAL AND FUNCTIONAL DEVICE

RELATED APPLICATION DATA

The present invention claims priority to Japanese Application No. P11-271240 filed Sep. 24, 1999, which application is incorporated herein by reference to the extent permitted by law.

BACKGROUND OF THE INVENTION

The present invention relates to a functional material and a functional device, which particularly not only make an industrial revolution against conventional optical parts, but also are suitable for various applications to, typically, the industrial fields employing electromagnetic waves such as light and sound waves such as an ultrasonic wave.

In conventional optical devices such as an interference filter, since a stacked film is produced on the basis of a predetermined wavelength range of target transmission/reflection light, it is impossible to select the wavelength of transmission/reflection light from external after the production of the optical device. Even in a laser diode, since a material design is generally made on the basis of a predetermined wavelength of laser light to be emitted from the laser diode, it is impossible to select the wavelength of laser light from external after production of the laser diode. Meanwhile, there may be considered a method of simply selecting a wavelength of light by using a prism or the like; however, such a method has a large problem in terms of integration or the like because the direction of the optical path is changed depending on the wavelength of light and the refractive index of the material forming the prism.

On the other hand, recently, a new physical concept "photonic crystal" has appeared, and many research engineers have taken interests in such a photonic crystal and have come to be at grips therewith. It has been revealed by a theoretical approach of Ohtaka et al. that a medium, which has dielectric constants repeated at a periodicity (which is not necessarily large so much but may be as small as about five cycles) with a unit cycle on the order of a wavelength of a target electromagnetic wave, forms a physical concept "photonic band" similar to that of a band structure of electrons in a crystal (see documents (1) K. Ohtaka, Phys. Rev. B., 19(1979)5057–5067, (2) K. Ohtaka and Y. Tanabe, J. Phys. Soc. Jpn., 65(1996)2276–2284, (3) Kazuo Ohtaka, J. Phys. Soc. Jpn., 52(1997)328–335, and (4) H. Miyazaki and K. Ohtaka, Phys, Rev. B., 58(1998)6929–6937). Further, the fact that a "photonic band gap", at which light having a specific wavelength is suppressed, appears in such a photonic crystal has been independently reported at the same time of year by Yablonovitch (see a document (5) E. Yablonovitch, Phys. Rev. Lett., 58(1987)2059–2062) and John (see a document (6) S. John, Phys. Rev. Lett., 58(1987) 2486). In summary, it has been technically supported that the transmission of light having a specific wavelength through a medium can be suppressed by giving a desired periodicity to the medium, and the transmission of only light having a specific wavelength through the medium is allowed by inserting a disturbance in part of the periodicity of the medium.

Such a periodicity can be realized not only in the form of a one-dimensional structure such as a stacked film but also in the form a two-dimensional structure such as balls arranged on a plane or a three-dimensional structure such as balls or dice-like substances densely stacked in a box. A structure for disturbing the periodicity can also be freely inserted in a periodic structure in accordance with a desired design. It has been reported that the photonic crystal can freely reflects or wave-guides light (see documents (7) A. Mekis, J. C. Chen, I. Kurland, S. Fan, P. R. Villeneuve, and J. D. Joannopoulos, Phys. Rev. Lett., 77(1996)3787–3790, (8) J. D. Joannopoulos, P. R. Villeneuve, and S. Fan, Nature, 386(1997)143–149, (9) S-Y. Lin, E. Chow, V. Hietala, P. R. Villeneuve, and J. D. Joannopoulos, Science, 282(1988) 274–276). In this way, the photonic crystal has been extensively studied, for example, in the field of semiconductors (see a document (10) Toshihiko Baba, Michitaka Ikeda, Naohisa Kamizawa, Hans Blom, Appl. Phys. Vol. 67, 9(1998)1041–1045). In recent years, the photonic crystal has been in the spotlight and has been briefly introduced in other documents (see (11) Nikkei Electronics, 730(1998)57–63), (12) Osamu Izumi, Shoujiro Kawakami, Chemical Industry, the January number, (1999)47–52, and (13) Tetsuo Taniuchi, Metal, Vol. 68, 6(1998)26–34).

That is to say, it has been theoretically, experimentally found that the optical properties of a photonic crystal can be largely changed by inserting a foreign matter for disturbing the periodicity. Such a is photonic band structure is similar to an electronic band structure of a semiconductor in which a level is formed in a band gap by doping carriers in the semiconductor.

As will be described in detail later, unlike the conventional device aimed at a static effect obtained by making use of the periodicity of a dielectric substance on the order of a wavelength of light, a functional material and a functional device of the present invention are each aimed at a controllable dynamic effect obtained by inserting, in the functional material or functional device, a foreign matter (or material for disturbing the periodicity), a certain physical property of which is changeable on the basis of a signal supplied from external. The unique behavior of the "foreign matter" or "impurity" for disturbing the periodicity has been described, for example, in documents (14) Toyohiko Yatagai, Optics, Vol. 28, 1(1999)15–21, (15) K. Harada, K. Munakata, M. Itoh, N. Yoshikawa, H. Yonezu, S. Umegaki, and T. Yatagai, Jpn. J. Appl. Phys., 37(1998)4393–4396, and (16) Pioneering Research Promotion Project of Japan Society for the Promotion of Science: "Exploration of Next Generation Artificial Material", special edition, (Proceedings of the First Open Symposium), Jun. 15–16, 1999, (at The Institute of Physical and Chemical Research), Pioneering Research Promotion Project of Japan Society for the Promotion of Science/News No. 5, (1999)60–67. Each of these documents, however, describes only a static device having static physical properties and does not describe any device exhibiting a controllable dynamic behavior.

In the current study situation for the photonic crystal, experiments have been made by using an orthodox static periodic structure, that is, a previously designed periodic structure only in order to further establish the theory of the photonic crystal, and no attempt has been made until now to dynamically change the characteristic of a periodic structure with an elapsed time. It should be noted that the technique described in the above document (16) uses a non-linear material as a foreign matter; however, such a non-linear material is not controlled from external.

To the best of the present inventor's knowledge, as patent documents regarding the "photonic crystal", there have been disclosed five patent documents: Japanese Patent No. 2918881, and Japanese Patent Laid-open Nos. Hei 11-218627, Hei 10-284806, Hei 11-186657, and Hei 10-83005.

These documents, however, are little concerned with the present invention. Japanese Patent No. 2918881 is characterized by providing a resonator mirror used for laser oscillation, wherein the resonator mirror includes a multilayer reflection film obtained by forming periodic oxidation states in a semiconductor active layer, and therefore, such a document is quite different from the present invention. Japanese Patent Laid-open No. Hei 11-218627 is characterized in that a triangular lattice-like refractive index changing (spherical) region is provided in a dielectric slab optical waveguide, and describes only part of the photonic crystal. The content associated with the photonic crystal described in this document, however, can be known to a person skilled in the art on the basis of a document (17) Kuniaki Nagayama, Surface, Vol. 31, 5(1993)353–360. Japanese Patent Laid-open No. Hei 11-218627 also does not examine the controllability of the refractive index changing region at all, and therefore, such a document is quite different from the present invention. Each of Japanese Patent Laid-open Nos. Hei 10-284806 and Hei 11-186657 is characterized in that a photonic crystal is provided outside a semiconductor laser, and therefore, such a document is quite different from the present invention. On the other hand, Japanese Patent Laid-open No. Hei 10-83005 has contents associated with the present invention. Hereinafter, a difference between each of the contents of Japanese Patent Laid-open No. Hei 10-83005 and the present invention will be described.

(1) Japanese Patent Laid-open No. Hei 10-83005 has sixteen claims. Of these claims, ten claims define "the wavelength of light corresponding to a photonic band end is set in the vicinity of a wavelength of transmission light". On the other hand, the present invention is intended to obtain a new effect superior to that obtained by the content described in Japanese Patent Laid-open No. Hei 10-83005 by inserting "a foreign matter" for partially disturbing the periodicity in a periodic photonic crystal and giving "a kinetic function ability" or "a change in refractive index" to the foreign matter on the basis a signal supplied from external. As a result, according to the present invention, the wavelength of transmission light is not required to be positioned in the vicinity of the band end, but can be freely set depending on how to insert the foreign matter in the periodic photonic crystal.

(2) In Japanese Patent Laid-open No. Hei 10-83005, a resist line, an optical fiber core, a diffraction lattice, a phase-separation type block copolymer, or the like is used as a periodicity forming element, and a ultrasonic wave or the like is used as a tool for changing the periodicity. To use the diffraction lattice as the photonic crystal, however, light must be made incident on a medium on the surface of which irregular grooves are formed in such a manner that the incident light receives the effect of the periodicity of the irregular grooves, and more specifically, light must be made incident on the medium in parallel to the irregular grooves, with a result that most of the incident light passes through the medium without receiving the effect of the periodicity. The use of the diffraction lattice as the photonic crystal is thus poor in efficiency. The diffraction lattice basically supposes specific obliquely incident light; however, in the real situation, such a design fails to obtain a strict analytic solution like an interference filter (see a document (18) Toyonen Matsuda, Youichi Okuno, Optics, Vol. 27, 11(1998) 626–631). Under such circumstances, if the diffraction lattice, which is used on the supposition of specific obliquely incident light, is applied to the photonic crystal, it is very difficult to estimate the physical meaning of such application. While there often appears the expression "a diffraction lattice for forming a photonic band" in Japanese Patent Laid-open No. Hei 10-83005, such description merely specifies a non-efficient optical arrangement.

In Japanese Patent Laid-open No. Hei 10-83005, a ultrasonic wave is used as a tool for changing the periodicity; however, the effect of using such a tool is similar to that of the known Raman-Nath scattering. The technique disclosed in Japanese Patent Laid-open No. Hei 10-83005 has a novelty in changing the present periodicity into another periodicity. On the contrary, the most important feature of the present invention lies in not changing all of the periodicity but changing part of the periodicity. In this regard, the present invention is quite different from Japanese Patent Laid-open No. Hei 10-83005.

(3) Japanese Patent Laid-open No. Hei 10-83005 describes five claims associated with "an optical functional device in which metal films are formed on front and back sides of a diffraction lattice"; however, each of the five claims has a limitation in using a diffraction lattice for forming a photonic band. The use of the diffraction lattice means the same non-efficient optical arrangement as described above in which light must be made incident on a medium, on the surface of which irregular grooves are formed, in parallel to the irregular grooves. On the contrary, the present invention is not limited to such a non-efficient optical arrangement and also not limited to the use of a diffraction lattice as a photonic crystal.

(4) In Japanese Patent Laid-open No. Hei 10-83005, a technique of interposing an electro-optic material (to which a voltage is applied from external) between diffraction lattices is described in the last claim; however, such a technique is also limited by the diffraction lattice, and therefore, the invention described in the last claim is quite different in optical arrangement from the present invention (see FIG. 15 in Japanese Patent Laid-open No. Hei 10-83005).

(5) In Japanese Patent Laid-open No. Hei 10-83005, there appears the expression "in consideration of a phenomenon that a group velocity $df\tilde{O}(k)/dk$ is reduced to be close to zero in the vicinity of a photonic band end" (paragraph number: 0021); however, such a phenomenon necessarily occurs at a boundary wavelength when a band gap is newly formed, which is apparent from the above-described documents (1) to (6).

The optical devices proposed as described above are each produced in accordance with a previously designed wavelength range of light, and therefore, in order to freely select a wavelength of light by external control, it is required to move, typically, the entire optical device. As a result, the speed of response of the optical device becomes significantly poor.

On the other hand, the application of an actuator/kinetic function device to optical parts is very limited, for example, to focal correction using a linear motor or movement such as rotation.

In view of the foregoing, it has been expected to develop a technique capable of largely changing a physical function of a functional device by a very small motion (the rate of motion is not necessarily small) whose dimension is different from that of the physical function to be changed, thereby realizing an artificial skin whose color tone is changeable, and largely contributing to the field of typically optical communication.

SUMMARY OF THE INVENTION

An object of the present invention is to provide a functional material and a functional device, each of which is capable of changing a wavelength of transmission light on the basis of a signal supplied from external.

Another object of the present invention is to provide a functional material and a functional device, each of which is capable of changing a wavelength of a transmission electromagnetic wave or converting an incident electromagnetic wave into an electromagnetic wave whose attribute is different from that of the incident electromagnetic wave on the basis a signal supplied from external.

A further object of the present invention is to provide a functional material and a functional device, each of which is capable of changing a wavelength of a transmission sound wave or converting an incident sound wave into a sound wave whose attribute is different from that of the incident sound wave.

Still a further object of the present invention is to provide a functional material or a functional device, each of which is capable of changing a wavelength of a transmission sound wave or converting an incident sound wave into a sound wave whose attribute is different from that of the incident sound wave on the basis of a signal supplied from external.

The present inventor has made examination to achieve the above objects as follows:

As described above, the existing optical devices are limited to static optical devices each of which makes use of the periodicity of a dielectric substance, a unit cycle of the periodicity being on the order of a wavelength of light. However, from the viewpoint of putting emphasis on controllability, it is effective to use a material or an element whose physical properties are changed on the basis of a signal supplied from external as a "foreign matter" inserted in a periodic structure. The present inventor has sufficiently examined such controllability of the foreign matter, and has reached the following conclusion:

The present inventor has concluded that the most advantage obtained by using a photonic crystal configured as a periodic structure including a foreign matter for disturbing the periodicity (which foreign matter may be part of the periodic structure) lies in that large optical characteristics can be obtained by giving a kinetic function to the foreign matter, thereby dynamically changing the foreign matter. In addition, the function given to the foreign matter is not limited to the kinetic function but may be a change in dielectric constant. Alternatively, the foreign matter may be a kinetic function material exhibiting a non-linear reaction against a signal supplied from external, or optical function material. Examples of the kinetic function exhibiting materials inserted as foreign matters may include a piezoelectric material represented by a perovskite oxide such as PZT or PLZT, and polyvinylidene fluoride (PVDF). Examples of the dielectric constant changing materials inserted as foreign matters may include a material group having an electro-optic effect and photorefractive effect; a liquid crystal associated material group such as a ferroelectric liquid crystal and an electric field alignment type liquid crystal; a photochromism material group such as a cis-trans optical anisotropic material represented by an azobenzene base material and a spiropyron based/tungsten oxide based material; and a material group, in which molecules are directly aligned on the basis of a polarization state of incident light, such as a carbon sulfide/urea associated material. As other kinetic function materials, there can be used the following elements each allowing a large displacement: (1) a high polymer gel, (2) a shape memory alloy, (3) a hydrogen absorption alloy, (4) a hydraulic pressure utilizing element, (5) a static electricity utilizing element, (6) a magnetostrictive element, and (7) a piezoelectric/piezo-optic element.

A material group such as an inorganic/organic composite material, typically, a material in which organic amine is intercalated in a lamellar oxide, are each sufficiently regarded as a kinetic function material from the viewpoint of C-axis length displacement. Such material group are greatly expected as the future kinetic function material.

The above-described materials excluding the inorganic/organic composite material are extensively known at present.

Some kinds of characteristics of each of the above-described actuators are listed in FIG. 1. In addition, values shown in FIG. 1 are typically experimental values known at present, and therefore, such values should be regarded as reference values. Further, the displacement amount of the intercalation due to an electric field shown in FIG. 1 is a theoretically estimated value.

Of the characteristics of an actuator, most important physical values are a displacement amount (rate of extension/contraction), a generated force (strength), and a speed of response (control speed). It is expected to develop a material/device capable of satisfying these three physical values, that is, capable of increasing the displacement amount and generated force while shortening the speed of response; however, as is apparent from FIG. 1, in the present situation, it is not easy to develop such a material/device. The actuators listed in FIG. 1 not satisfying the above three physical values, however, are as hopeful kinetic function materials as ever so long as they are used for applications which make effective use of their merits. In particular, the intercalation compound group as inorganic/organic materials regarded to be excellent in displacement amount and speed of response are expected to be developed in future.

For comparison, the features of the nine kinds of kinetic function elements will be briefly described below.

(1) Piezoelectric Ceramic

The piezoelectric ceramic has a large generated force and a high speed responsiveness; however, it has a rate of extension/contraction which is as low as about 0.1%. In actual, an element, which makes use of the high speed responsiveness of the piezoelectric ceramic in combination with ultrasonic technique, has been presently used for an ultrasonic diagnostic device, a fish detector, an ultrasonic motor, and the like; while an element, which makes use of the extension/contraction amount of the piezoelectric ceramic, is limited to a minor application, for example, as a high precision actuator used for positioning of a needle in a scanning tunnel microscope (STM) or an interatomic force microscope (AFM).

(2) High Polymer Gel

The high polymer gel has an elongation which is as large as several tens % to several hundreds %; however, it has a generated force which is as significantly low as difficult to move a heavy object. Also, in general, it is not easy to control the extension/contraction of the high polymer gel. Further, the high polymer gel has a large disadvantage that the gel is weak against heat because it is based on a high polymer, and therefore, the high polymer gel is largely affected by a peripheral environment.

(3) Shape Memory Alloy

The shape memory alloy has a property that the shape of the alloy, which has been deformed at a low temperature, is restored to the original shape when the alloy is heated. In other words, the shape memory alloy is a material causing, in principle, thermal plastic martensite transformation. Accordingly, while not being different from a material causing irreversible plastic deformation, the shape memory alloy requires the increase/decrease in temperature for changing the size of the alloy. The shape memory alloy has another disadvantage that the alloy is not expected to be largely displaced because it makes use of twin crystal strain due to crystal lattice.

(4) Hydrogen Absorption Alloy

The hydrogen absorption alloy has a reversibility; however, it is disadvantageous in that the alloy is affected by an environmental temperature and is low in responsibility because it makes use of absorption reaction due to diffusion of hydrogen atoms through grain boundaries, and that a large reaction heat occurs upon absorption of hydrogen. Accordingly, it is difficult to realize a small actuator using the hydrogen absorption alloy because of, particularly, the largest problem associated with removal of reaction heat.

(5) Hydraulic Pressure Utilizing Element

The hydraulic pressure utilizing element is generally made from a composite material of rubber and fibers. Such an element is driven by a pneumatic pressure or hydraulic pressure by making use of the flexibility of the element. The element is most suitable for analog motion; however, since the element is hard to be finely machined, it presents a problem in miniaturization and integration.

(6) Static Electricity Utilizing Element

The static electricity utilizing element makes use of a coulomb force due to static electricity. The element has been developed to be used for a process of forming a fine structure of a semiconductor silicon. Accordingly, the element is very suitable for fine structure forming process, although it has a small problem in generated force. The largest problem of the element lies in reliability because a change in function with an elapsed time possibly occurs because of the presence of a sliding portion. The element has a further problem in that it is weak against the static electricity occurring in the peripheral environment.

(7) Magnetostrictive Element

The magnetostrictive element generally makes use of a super magnetostrictive effect, and is made from a material (typically, Tb—Dy—Fe alloy) having a strain of about 10–3 at room temperature. The magnetostrictive element is superior to the piezoelectric element in terms of large displacement amount, large generated force, and small mass; however, it has a critical disadvantage that the drive of the element requires an external magnetic field, and more specifically, a magnetic circuit must be disposed in the vicinity of the element. Accordingly, as compared with the piezoelectric element driven by a voltage, the electrostrictive element has a problem in miniaturization and integration.

(8) Optical Actuator

The optical actuator is made from, typically, PLZT exhibiting a photovolatic effect. The photovolatic effect is a phenomenon that an electromotive force occurs by pyroelectricity caused by light irradiation and a reverse-piezoelectric effect occurs along with the occurrence of the electromotive force, to thereby cause strain of the actuator. The actuator is advantageous in non-contact drive; however, it is disadvantageous in making it difficult to obtain a large displacement because the displacement is due to the reverse-piezoelectric effect via pyroelectricity, and in requiring an additional polling treatment to induce the displacement. However, it is important that the PLZT, which is an oxide like the piezoelectric material, has a large advantage that it is easy to constitute the element.

(9) Intercalation Material

A solution drive type element using the intercalation material allows, if an alignment film is used, a displacement being as large as 4 to 5 times; however, it is low in speed of response. On the other hand, an electric field drive type element using the intercalation material allows a displacement amount being as small as about 10 to 20%; however, it may exhibit a high speed of response comparable to that of a piezoelectric-material. Such an intercalation material is of a great interest, particularly, in its speed of response.

Hereinafter, patent documents relating to materials/devices associated with intercalation, which have been filed in Japan until now, will be briefly described.

Displacement elements using intercalation materials have been disclosed in Japanese Patent Laid-open Nos. Hei 5-110153 and Hei 6-125120. These documents describe displacement elements characterized in that an electric field is applied from external to a lamellar material in which an organic material is inserted, to change an alignment angle of the organic material inserted in the lamellar material. These documents, however, do not describe the application of the intercalation associated material to a photonic periodic structure.

To the best of the present inventor's knowledge, elements in which intercalation is combined with actuators have been disclosed in Japanese Patent Laid-open Nos. Hei 2-131376 and Hei 4-127885. Each of these elements uses a volume expansion resulting from an intercalation reaction as a drive force. The element disclosed in Japanese Patent Laid-open No. Hei 2-131376 has a structure in which polyethylene oxide as an electrolyte is sandwiched between graphite compound layers, wherein flexion occurs when Li is transferred between the layers. The element disclosed in Japanese Patent Laid-open No. Hei 4-127885 is configured such that positive and negative electrodes are made from $Ag0.7V2O5$ and $4AgI-Ag2WO4$ is used as a solid electrolyte. Each of the elements does not relate to a drive method with the insertion of an organic molecule as a motive force but relates to migration of ions in and from an inorganic skeleton. These documents do not describe the application of the intercalation associated material to a photonic crystal. Of course, the material group described in these documents can be applied to the present invention.

Next, patent documents associated with inorganic/organic intercalation materials, which have been filed until now, will be described.

(1) Intercalation Material Associated with Liquid Crystal

New optical phase difference plates formed by inserting an organic material in a lamellar inorganic compound such as clay mineral and liquid crystal displays using the optical phase difference plates have been disclosed in Japanese Patent Laid-open Nos. Hei 5-196819, Hei 6-82777, and Hei 6-82779. These documents do not describe any displacement device using the intercalation material and also do not describe the insertion of the intercalation material in a photonic crystal.

(2) Composite Intercalation Material

The application of a composite of a lamellar inorganic material, such as clay mineral, and an organic material (it is unclear whether or not intercalation is made) to a heat-resisting structural material such as a coating material, a molding material, or a filler in resin have been disclosed in Japanese Patent Laid-open Nos. Hei 6-200034, Hei 7-126396, Hei 8-12899, Hei 8-41091, Hei 10-264291, Hei 11-71465, Hei 11-92594, Hei 11-92677, Hei 11-106670, Hei 10-259016, Hei 10-259017, and Hei 10-310420. These documents, however, do not describe any optical or displacement element using the intercalation material, and also do not describe the insertion of the intercalation material in a photonic crystal at all.

(3) Photochromism Associated Intercalation Material

A technique using a new photochromism phenomenon in which an organic material is intercalated in a lamellar inorganic compound such as hydrotalcite type clay mineral has been disclosed in Japanese Patent Laid-open Nos. Hei 4-16776, Sho 63-251490, Hei 2-264246, Hei 6-95288, Hei 6-95289, Hei 6-95290, Hei 6-148791, Hei 11-71388, and Hei 6-48742. Some of these documents describe optical recording materials making use of a photochromism effect of a spiropyran based organic material, which are characterized by improving the stability and durability of color change. These documents, however, do not describe the insertion of the photochromism associated intercalation material in a photonic crystal.

The photochromism is a phenomenon that when a photochromism associated material is irradiated with ultraviolet rays, the structure of the material is changed and thereby the color thereof is changed, and when the material is irradiated with light having a different wavelength (for example, visible light) or heated, the structure of the material is returned to the original structure and thereby the color thereof is returned to the original color.

(4) Electrochrbmism Associated Intercalation Material

The electrochromisn associated intercalation materials have been disclosed in Japanese Patent Laid-open Nos. Hei 10-206907 and Hei 10-239714. Each of these documents, however, does not describe any displacement device, and also does not describe the insertion of the intercalation material in a photonic crystal at all.

(5) Lamellar Phosphor Associated Intercalation Material

The lamellar phosphor associated intercalation materials have been disclosed in Japanese Patent Laid-open Nos. Sho 63-251490, Hei 5-32412, and Hei 9-310065. Each of these documents, however, does not describe any displacement device, and also does not describe the insertion of the intercalation material in a photonic crystal at all.

(6) Electromagnetic Wave Absorber Associated Intercalation Material

The electromagnetic wave absorber associated intercalation material has been disclosed in Japanese Patent Laid-open No. Hei 8-53571. The document, however, does not describe any displacement device, and also does not describe the insertion of the intercalation material in a photonic crystal at all.

By the way, the term "intercalation phenomenon", which is used in a variety of senses, is not limited to the insertion of an organic chain in an inorganic skeleton described above. For example, electrochromic devices making use of a change in color tone due to insertion of lithium in a transmission metal oxide have been disclosed in Japanese Patent Laid-open Nos. Sho 57-208534, Sho 57-208535, Sho 57-208536, and Sho 57-208537.

Attempts making use of intercalation reaction for producing an electrode at one end of a capacitor structure have been disclosed in Japanese Patent Nos. 186013 and 1949235, and Japanese Patent Laid-open No. Sho 62-181413.

Techniques in which intercalation reaction is used for a full solid-state type voltage memory based on the principle similar to that of an Li cell have been disclosed in Japanese Patent Laid-open Nos. Hei 4-34864, 4-34866 and Hei 4-34868, and Japanese Patent No. 2734747.

Techniques associated with optical intercalation reaction (intercalation or deintercalation caused by light irradiation) have been disclosed in Japanese Patent Laid-open No. Hei 4-319545, Hei 7-56195 and 7-56196, and Japanese Patent No. 2715233.

An intercalation material, $H_2Ti_5O_{11}nH_2O$ has been disclosed in Japanese Patent No. 1936988. The document only describes that such an intercalation is expected to be applied to an absorber.

Absorbers and catalyst making use of intercalation of an organic chain in an inorganic skeleton such as $KCa_2Nb_3O_{10}$ have been disclosed in Japanese Patent Nos. 2653805, 2656778, and 1984612, and Japanese Patent Laid-open No. Hei 8-259208.

The application of intercalation to non-linear optics has been disclosed in Japanese Patent laid-open No. Hei 4-168429, and an optical storage medium using $V_2O_5$ has been disclosed in Japanese Patent No. 1708735.

A material making use of a photocatalytic effect has been disclosed in Japanese Patent No. 2681030.

Interlayer compounds of amine and alkali titanate have been disclosed in Japanese Patent Nos. 1579031 and 1367235, and Japanese Patent Laid-open No. Sho 62-100411. Each of these documents, however, does not describe any technique in which intercalation is applied to a displacement device.

Actuator devices using liquid crystal have been disclosed in Japanese Patent Laid-open Nos. Hei 3-5720, Hei 3-7079, Hei 6-324312, and Hei 9-277518. Each of these documents, however, describes only the technique in which the liquid crystal is driven by an electric field, and does not describe the insertion of an intercalation material to a photonic crystal.

In this way, each of the above-described documents does not describe the "technical thought in which the periodicity of a photonic crystal periodic crystal is controlled by insertion of a foreign matter in the crystal".

Following the description of the devices capable of controlling transverse waves, for example, electromagnetic waves such as light or a micro-wave, devices capable of controlling longitudinal waves such as sound waves will be described. It should be noted that the traveling speed of a sound wave through one medium is of course different from that of the sound wave through another medium. The device, which will be described below, can be basically used in air; however, it can also be used in liquid such as water. First, a difference between sound waves and electromagnetic waves will be briefly described. A traveling speed of sound waves through air is approximately 340 m/s, while the traveling speed of electromagnetic waves is 3~108 m/s which is as fast as 900,000 times sound waves. For example, a low frequency ultrasonic wave having a frequency of about 20 kHz to 200 kHz used for ultrasonic cleaning or ultrasonic machining is equivalent in terms of frequency to a low frequency (LF) electromagnetic wave longer in wavelength of a high frequency electromagnetic wave. On the other hand, a low frequency ultrasonic wave is equivalent in terms of wavelength to a microwave (MF). Such a difference is due to the significant difference between the traveling speeds of sound waves and light. For example, the wavelength of an ultrasonic wave having a frequency of 1 MHz in air is 0.34 mm. On the other hand, the wavelength of an electromagnetic wave having the same frequency in air is 300 m. In the case of forming a periodic structure has a periodicity with a unit cycle on the order of a wavelength of a sound wave, more specifically, having a unit cycle being 1/50 to 50 times, typically, 1/several times to several times a wavelength of a sound wave, the unit cycle of the periodic structure can be set at a value ranging from the order of millimeter to the order of micron meter or submicron meter. Meanwhile, an audio room or an anechoic room has a wall surface structure having irregularities arranged with a pitch corresponding to a wavelength of an audible sound, that is, ranging from about several cm to several m. The basic thought of such a wall surface structure of an audio room or an anechoic room is similar to that of the present invention. As a result, if the wavelength range of longitudinal sound waves to be modulated by a periodic structure is limited to a wavelength range of an ultrasonic wave, the unit cycle of the periodic structure may be set at a value ranging from the order of millimeter to the order of micron meter or submicron meter.

It has been described that a periodic change in a refractive index (more generally, periodic change in dielectric constant) is required to modulate visible light as a transverse electromagnetic wave. Next, it will be described what physical value should be periodically changed for controlling a sound wave. Now, letting the speed of sound be V [m/s], a pressure be P [N/m2], and a density be fĩ [kg/m3], the speed of sound in air is given by $V=(r\sim P/f\tilde{i})^{1/2}$ The relationship between the density fĩ and a temperature T is approximated by the following equation:

$f\tilde{i}0=f\tilde{i}T(1+T/273)$

On the basis of the above two equations, the speed of sound at the temperature T [ ] is given by $V(T)=331.5+0.60714T$ That is to say, the speed of sound changes depending an environmental temperature. When a sound wave enters from a portion (1) at which its temperature is low to a portion (2) at which its temperature is high, it refracts toward a boundary plane between the low temperature portion and the high temperature portion because of the following two equations:

$\sin f\cancel{E}1/\sin f\cancel{E}2=V1/V2, V2, V2$

In general, the traveling speed of a sound wave is faster in liquid than in gas, and is faster in solid than in liquid. For example, a sound wave travels at 1480 m/s in water, and at 5180 m/s in iron. The significant difference between traveling speeds of a sound wave through media means that upon entrance of a sound wave from air into water or from water into solid, there is a possibility that the sound wave results in total reflection if the entrance angle is slightly tilted from the vertical line. This is quite different from refraction of light. As a conclusion, when an ultrasonic wave enters from a low density portion into a high density portion, it refracts toward a boundary plane between the low density portion and the high density portion. That is to say, the refractive index of water for a sound wave becomes 1 or less on the basis of the refractive index of air. Such a refraction of a sound wave is reversed to that of light. The property of a sound wave, however, is basically similar to that of light. A medium for a sound wave, in which condensation and rarefaction are periodically repeated (equivalent to a medium for light, in which refractive index is periodically repeated) has a "ultrasound band gap" equivalent to the photonic band gap. The periodic medium for a sound wave having a such ultrasound band gap is also expected to be used for a wave selection device for transmitting a sound wave having a specific frequency, a device for changing the direction of a sound wave, or a device for improving the directivity of a sound wave.

For reference purposes, differences between electromagnetic waves and sound waves in terms of wavelength are listed in FIG. 2.

On the basis of the above-described examination of the present inventor, the present invention has been accomplished. To achieve the above objects, according a first invention, there is provided a functional material including: a periodic structure having a periodicity with a unit cycle on the order of a wavelength of an electromagnetic wave; and means for disturbing the periodicity of the periodic structure, the means being provided in at least one portion of the periodic structure; wherein the means for disturbing the periodicity of the periodic structure is controllable from external.

According to a second invention, there is provided a functional device including: a periodic structure having a periodicity with a unit cycle on the order of a wavelength of an electromagnetic wave; and means for disturbing the periodicity of the periodic structure, the means being provided in at least one portion of the periodic structure; wherein the means for disturbing the periodicity of the periodic structure is controllable from external.

In the first and second inventions, for example, a kinetic function or a change in refractive index may be given to the means for disturbing the periodicity by controlling, from external, the means for disturbing the periodicity; or a first electromagnetic wave incident on the periodic structure may be converted into a second electromagnetic wave, at least one attribute of which is different from that of the first electromagnetic wave, by controlling, from external, the means for disturbing the periodicity. The attribute of the second electromagnetic wave may be a traveling direction, a wavelength, an intensity, a polarization orientation, a spatial coherence, or a wavelength coherence of the second electromagnetic wave. The periodic structure may be a one-dimensional, two-dimensional, or three-dimensional periodic structure. The unit cycle of the periodic structure may be in a range of 1/50 time to 50 times, particularly, in a range of 1/several times to several times, for example, 1/5 time to 5 times of a wavelength of an electromagnetic wave. The periodic structure may be formed by stacking, distributing, or building-up elements identical to each other, and the means for disturbing the periodicity may be composed of an element different from the elements constituting the periodic structure. For example, the periodic structure may be formed by stacking, distributing, or building-up two kinds or more materials, and the means for disturbing the periodicity may be composed of a material different from the materials constituting the periodic structure. Further, the periodic structure may be composed of a group of dots formed on a base by printing.

In particular, if the electromagnetic wave used is light, the periodic structure may be formed by stacking, distributing, or building-up two kinds or more materials, and the means for disturbing the periodicity may be composed of a material which exhibits a kinetic function when receiving a signal from external. The two kinds or more materials constituting the periodic structure may be dielectric substances. The dielectric materials may be at least one kind of materials selected from a group consisting of oxides, fluorides, solid-solutions between oxides, solid-solutions between fluorides, chalcogenide compounds, single-semiconductors, and solid-solutions of single-semiconductors. The oxides may be at least two kinds of oxides selected from a group consisting of $TiO_2$, $SiO_2$, $ZrO_2$, $CeO_2$, $Al_2O_3$, $MgO$, $Si_xO_y$, $ThO_2$, $SnO_2$, $In_2O_3$, $ZnO$, $La_2O_3$, $Nd_2O_3$, $Sb_2O_3$, $Bi_2O_3$, $Pr_6O_{11}$, $Ti_xO_y$, $CaO$, and $SrTiO_3$. The fluorides may be at least two kinds of fluorides selected from a group consisting of $MgF_2$, $CeF_3$, $LaF_3$, $NdF_3$, $PbF_2$, $NaF$, $Na_3AlF_6$, $LiF$, and $CaF_2$. The chalcogenide compounds may be at least two kinds of chalcogenide compounds selected from a group consisting of $ZnS$, $ZnSe$, $CdS$, $CdSe$, $CdTe$, $PbS$, $PbTe$, and $Sb_2S_3$. The single-semiconductors may be at least two kinds of single-semiconductors selected from a group consisting of $Si$, $Ge$, and $Te$. The material exhibiting a kinetic function may be a perovskite-type piezoelectric material or an ilmenite-type piezoelectric material. The perovskite-type piezoelectric material may be one kind of perovskite-type piezoelectric materials selected from a group consisting of $Pb(ZrTi)O_3$ (called PZT), $(PbLa)(ZrTi)O_3$ (called PLZT), $BaTiO_3$, $(BaSrCa)(TiZrSnHf)O_3$, and $PbTiO_3$. The ilminite-type piezoelectric material may be $LiNbO_3$ or $LiTaO_3$. The material exhibiting a kinetic function may be at least one kind of piezoelectric materials selected from a group consisting of $Bi_{12}SiO_{20}$, $Bi_{12}GeO_{20}$, $Bi_{12}TiO_{20}$, KDP, $K(TaNb)O_3$, $(SrBa)Nb_2O_6$, $ZnO$, and $(ZnMg)O$ (Mg is slightly dissolved in solid state in ZnO). The material exhibiting a kinetic function may be a semiconductor material having no center of symmetry. The semiconductor material having no center of symmetry may be selected from CdTe, GaAs, InP, ZnS, ZnSe, and these semiconductors are doped with a trace of active metal ions.

The material exhibiting a kinetic function may be a host-guest type inorganic-organic composite material. A host of the host-guest type inorganic-organic composite material may be an inorganic lamellar material, and a base material thereof is a lamellar perovskite-type niobium containing material, a lamellar perovskite-type copper containing material, a lamellar titanate niobate, a lamellar rock salt structure oxide, a transition metal oxide material, a transition metal oxochloride, a lamellar polysilicate, a lamellar clay mineral, hydrotalcite, a transition metal chalcogenide, zirconium phosphate, or graphite (C).

The lamellar perovskite-type niobium containing material may be $KLaNb_2O_7$, $KCa_2Nb_3O_{10}$, $RbCa_2Nb_3O_{10}$, $CsCa_2Nb_3O_{10}$, or $KNaCa_2Nb_4O_{13}$. The lamellar perovskite-type copper containing material may be $Bi_2Sr_2CaCu_2O_8$ or $Bi_2Sr_2Ca_2Cu_3O_{10}$. The lamellar titanate niobate may be $KTiNbO_5$, $K_2Ti_4O_9$, or $K_4Nb_6O_{17}$. The rock salt structure oxide is $LiCoO_2$ or $LiNiO_2$. The transition metal oxide may be $MoO_3$, $V_2O_5$, $WO_3$, or $ReO_3$. The transition metal oxochloride may be $FeOCl$, $VOCl$, or $CrOCl$. The lamellar polysilicate may be $Na_2O-4SiO_2-7H_2O$. The lamellar clay mineral may be smectite, vermiculite, or mica. The transition metal chalcogenide may be $TaSe_2$, $TaS_2$, $MoS_2$, or $VSe_2$. The zirconium phosphate may be $Zr(HPO_4)_2NH_2O$.

In the first and second inventions, a conductive material for applying an electric field may be formed on both side surfaces of the material exhibiting a kinetic function. The conductive material may be ITO ($In_2O_3-SnO_4$ transparent conductive material). The material exhibiting a kinetic function may be different in refractive index from the materials constituting the periodic structure, or be identical in refractive index to the materials constituting the periodic structure. Preferably, letting A be a thin film made from a conductive material, B be a thin film made from a piezoelectric material or a material having an electro-optic effect different in refractive index from A, C be a thin film made from a paraelectric substance different in refractive index from each of A and B, the periodic structure includes a portion in which the thin films A, B, and C are stacked in the order of ABAC. The periodic structure may include a portion in which thin films made from a conductive material are periodically stacked on piezoelectric materials or materials having an electro-optic effect different in refractive index from the thin films made from a conductive material.

In the first and second inventions, the periodic structure may be formed by stacking, distributing, or building-up two kinds or more elements, and the means for disturbing the periodicity may include a material whose refractive index is changed on the basis of a signal supplied from external. The material whose refractive index is changed may be a polar organic material, a liquid crystal material, typically, a field alignment type liquid crystal material, urea or its associated material, or carbon disulfide or its associated material. The material whose refractive index is changed may be a spiro-pyran based compound, a $WO_3$ based electrochromism associated material, or a photochromism inorganic oxide such as $LiNbO_3$:Fe, $BaTiO_3$:Ce, or $SrTiO_3$:Fe. On the other hand, there may be adopted a wavelength selection light emitting material allowing time setting, including a periodic structure having a periodicity with a unit cycle on the order of a wavelength of an electromagnetic wave (wavelength of excitation light or emission wavelength), and a material made luminous due to inter-band transition contained in the periodic structure, wherein excitation light having such a wavelength as to allow the light to substantially pass through the periodic structure is made incident on the periodic structure, so that the luminous material is irradiated with the excitation light, to allow electrons of the luminous material to be changed from a ground state to an excitation state, and the periodic structure has a photonic band gap for the emission wavelength allowing emission transition of the luminous material, to keep the state in which the emission transition of the luminous material is forbidden. With this configuration, when control light is made incident from external on the periodic structure at an arbitrary time in such a state, the shape of a material, other than the luminous material of the periodic structure is changed or deformed, to disturb the periodicity of the periodic structure, with a result that the photonic field exerting an effect on the luminous material is changed, so that a window of a sharp wavelength of transmission light (which is equivalent to a mobile peak to be described later) is opened in the band gap, to allow emission transition of only the wavelength of the mobile peak of the luminous material.

In the first and second inventions, the means for disturbing the periodicity is composed of a material deformed by light irradiation or electric field application, typically, PLZT.

The functional material of the first invention may be formed on a flexible base or a silicon base, to form an artificial skin. The functional materials may be two-dimensionally, periodically formed on a base in such a manner as to be separated from each other, to form an artificial skin, and part of the functional materials may be deformed on the basis of a signal supplied from external.

According to the second invention, a pair of the functional devices, each of which has the periodic structure formed by a group of projections periodically disposed on a base, are movably opposed with the group of projections directed inwardly. One of the groups of projections in the other may be bitten in the other by relative movement of these functional devices, to effectively change the unit cycle of each of the periodic structures. The periodic structure may be formed by a group of piezoelectric elements periodically disposed on a base, and those selected from the piezoelectric elements may be warped when receiving a signal from external. The periodic structure may be formed by stacking, distributing, or building-up two kinds or more materials, and the means for distributing the periodicity may include a material which exhibits a kinetic function when receiving a signal from external. Concretely, the periodic structure may have a three-dimensional shape having six planes including a pair of opposed planes and electrodes for applying an electric field to the material exhibiting a kinetic function may be provided on the pair of planes, wherein when light having a broad wavelength distribution is made incident on the periodic structure in parallel to the pair of planes provided with the electrodes, the wavelength of the light passing through the periodic structure is changed by applying an electric field to the material exhibiting a kinetic function by using the electrodes.

According to a third invention, there is provided a functional material including: a periodic structure having a periodicity with a unit cycle on the order of a wavelength of a sound wave.

According to a fourth invention, there is provided a functional material including: a periodic structure having a periodicity with a unit cycle on the order of a wavelength of a sound wave; and means for disturbing the periodicity is provided in at least one portion of the periodic structure.

According to a fifth invention, there is provided a functional material including: a periodic structure having a periodicity with a unit cycle on the order of a wavelength of a sound wave; and means for disturbing the periodicity is provided in at least one portion of the periodic structure; wherein the means for disturbing the periodicity is controllable from external.

According to the third, fourth, and fifth inventions, a first sound wave may be converted into a second sound wave, at least one attribute of which is different from that of the first sound wave. The attribute of the second sound wave may be a traveling direction, a wavelength, an intensity, a polarization orientation, a spatial coherence, or a wavelength coherence of the second sound wave. The periodic structure may be a one-dimensional, two-dimensional, or three-dimensional periodic structure. The unit cycle of the periodic structure may be generally in a range of 1/50 time to 50 times of a wavelength of a sound wave, typically, in a range of 1/several times to several times, for example, in a range of 1/5 time to 5 times of a wavelength of a sound wave. The sound wave may be an ultrasonic wave. The periodic structure may be formed by stacking, distributing, or building-up elements identical to each other. The periodic structure may be composed of a group of dots formed on a base by printing, or a thread-like material such as gel. In particular, according to the fourth invention, the periodic structure may be composed of a group of dots formed on a base by printing, and the means for disturbing the periodicity is composed of a group of dots formed on the base by printing, the material for forming the dots constituting the means may be different from that for forming the dots constituting the periodic structure. Alternatively, the periodic structure may be composed of a thread-like material, and the means for disturbing the periodicity may be composed of a thread-like material different from the material constituting the periodic structure. The periodic structure may be composed of Peltier elements periodically disposed on a base.

According to the fifth invention, the density of a gas in the vicinity of the means for distributing the periodicity may be changed by controlling the means for distributing the periodicity from external. A first sound wave incident on the periodic structure may be changed from a second sound wave, at least one attribute of which is different from that of the first sound wave, by controlling the means for disturbing the periodicity from external. More generally, in addition to disturbance of the periodicity by giving a kinetic function to the means for disturbing the periodicity from external, the density of a gas, liquid, or solid may be modulated, or the density of one of media in the periodicity of (gas+liquid)/(liquid+solid)/(solid+gas) may be modulated.

According to the first and second inventions configured as described above, it is possible to control a wavelength, the emerged direction, and coherence of an electromagnetic wave passing through the above-described periodic structure, and to freely select the wavelength depending on the unit cycle of the periodicity of the periodic structure. For example, by setting the unit cycle of the periodicity of the periodic structure at several hundreds nm, it is possible to control light in a visible range, and by setting the unit cycle of the periodicity of the periodic structure at the order of fÊm, it is possible to control a microwave. According to the third, fourth and fifth inventions, it is possible to control the frequency and direction of a sound wave as a longitudinal wave by changing the density of the means for disturbing the periodicity, that is, the foreign matter inserted in the periodic structure.

The functional material and functional device of the present invention is advantageous in that a very small motion of the means for disturbing the periodicity, that is, the foreign matter in the periodic structure can change a physical value in a different dimension from that of the foreign matter, and therefore, they can realize an artificial skin capable of changing the color tone thereof and can contribute to the fields of optical communication and the like.

The foreign matter for disturbing the periodicity of the periodic structure can be controlled by a method of bringing electrodes into direct-contact with the foreign matter, a method of making an electromagnetic wave, for example, light having a strong electric field such as a laser light incident, from external, on the foreign matter, or a method of irradiating the foreign matter, from external, with an ultrasonic wave. In the case of adopting the method of irradiating the foreign matter with an ultrasonic wave from external, if PZT is used as the foreign matter, since the PZT is vibrated when being irradiated with the ultrasonic wave, the wavelength of transmission light is reciprocated in a specific wavelength range at a frequency corresponding to that of the vibration of the PZT.

It is of course possible to use at least one kind of materials constituting the periodic structure as a material to be controlled. For example, there can be adopted a configuration that a kinetic function element such as PZT is used as a component of the periodic structure. In this configuration, the element entirely moves when an electric field or a ultrasonic wave is applied thereto. This is not intended to shift the wavelength of transmission light but to change or modulate the wavelength (=energy) at the end of a phonic band gap.

Here, general effects obtained by adopting the electric field applying method in which electrodes are disposed on both sides of the foreign matter are described.

(1) The vector of the electric field may be desired to be in parallel to the orientation of the polarity of the foreign matter or the crystal axis of a piezoelectric element as the foreign matter. The relationship between the traveling direction of incident light and the electric field applying direction can be freely designed because such relationship is dependent on the axis of the foreign matter. For example, if the axis of the piezoelectric element as the foreign matter is in parallel to the traveling direction of incident light, the electric field applying direction may be desired to be nearly in parallel to the optical axis of the incident light, and if the axis of the piezoelectric element as the foreign matter is perpendicular to the traveling direction of incident light, the electric field applying direction may be desired to be nearly perpendicular to the optical axis of the incident light.

(2) The selection of the electrode material is effective to further give various functions to the periodic structure. For example, since a transparent conductive film such as ITO and a metal film are different from each other in extinction coefficient and thereby in dielectric constant, the function of the periodic structure can be further improved by newly designing the periodic structure from the viewpoint of suitable selection of the electrode material.

(3) Since the electrodes are directly disposed on both the sides of the foreign matter, it is possible to efficiently increase a field strength and hence to realize a high efficient drive of the periodic structure.

(4) Since the periodic structure including a control system can be configured as a full solid structure, it is possible to make the periodic structure compact.

On the other hand, general advantages obtained by adopting the method of giving the function to the periodic structure by light irradiation are as follows:

(1) The drive portion can be freely selected.

(2) It is not required to provide peripheral parts such as electrodes and wires.

(3) It is possible to drive a drive element placed in a closed space by directly irradiating it with laser light.

The method of giving the function to the periodic structure by making use of changing alignment of organic chains due to the field strength of polarized light has the following effects:

(1) Since the material is extended/contracted in the polarization direction of irradiation light, the controllability can be significantly simplified.

(2) In an optical alignment in which two polarization elements (generally called a polarizer and analyzer) are disposed in a state being perpendicular to each other (such arrangement is generally called a cross Nicols arrangement) and an inorganic/organic intercalation material is disposed therebetween with the stacking direction of the material substantially aligned with the optical axis, it is possible to easily change the polarization of a first incident light ray passing through the polarizer by making a second light ray having a strong linear polarization incident in the direction nearly perpendicular to the optical axis of the first light ray, that is, in the direction along a so-called a-b plane perpendicular to the stacking direction of the intercalation material, and hence to very easily modulate the light intensity of the light ray passing through the analyzer. Such an effect has been known as an optical Kerr effect; however, a conventional optical alignment exhibiting this effect has often used a liquid material such as liquid crystal. Additionally, a conventional optical alignment using a solid material, usable at the practical level, has not been reported for the reason that it has been difficult to cause large displacement of the atomic position only by an electric field due to polarization.

The use of long and short wavelengths is effective to change the refractive index of the foreign matter as follows:

(1) Since the structure of an intercalated organic material is changed, it is possible to easily change the refractive index of the foreign matter.

(2) The double wavelength control can reduce noise of environmental light.

(3) Since the wavelength of light can be simply selected, the material is useful not only for optical devices but also for clothes, covers, special coatings, and parts in the entertainment field.

BRIEF DESCRIPTION OF THE DRAWINGS

FIG. 1 is a diagram for comparing characteristics of respective kinetic function materials with each other;

FIG. 2 is a diagram for comparing electromagnetic waves with sound waves in terms of wavelength;

FIG. 3 is a schematic diagram illustrating a first embodiment of the present invention;

FIG. 6 is a diagram showing a spectrum of light passing through the one-dimensional periodic structure having the composition of 10 layers of [SiO2/TiO2]-M (foreign matter layer)-10 layers of [SiO2/TiO2] shown in FIG. 5;

FIG. 21 is a perspective view showing an optical functional device according to an eighth embodiment of the present invention;

FIGS. 22A to 22D are schematic diagrams illustrating a method of producing an optical functional device according to a ninth embodiment of the present invention;

FIG. 23 is a schematic diagram illustrating the operation of the optical functional device according to the ninth embodiment of the present invention;

FIG. 29 is a schematic diagram showing a sound wave functional device according to a fourteenth embodiment of the present invention;

FIG. 33 is a schematic diagram showing an optical functional device according to a seventeenth embodiment of the present invention;

DETAILED DESCRIPTION OF THE PREFERRED EMBODIMENTS

Hereinafter, preferred embodiments of the present invention will be described with reference to the accompanying drawings.

[Embodiment 1]

An optical functional device according to a first embodiment of the present invention will be described with reference to FIGS. 3 to 10.

A unit cycle of a periodic structure of an optical functional device is, as described above, selected at a value on the order of a wavelength of a transverse wave such as an electromagnetic wave or a longitudinal wave such as a sound wave to be modulated. In this embodiment, description will be made by example of a one-dimensional periodic structure configured to be matched to a visible light wavelength range as one of wavelength ranges of electromagnetic transverse waves. Such description can be of course extended to a two-dimensional or three-dimensional periodic structure.

FIG. 3 shows a one-dimensional periodic structure composed of multi-layer film in which two kinds of materials 1 and 2 are alternately, periodically stacked to each other. The material 1 is represented by SiO2 which has a refractive index approximated to 1.46 over the entire visible range, and the material 2 is represented by TiO2 which has a refractive index approximated to 2.30 over the entire visible range.

It is known that each of the materials SiO2 and TiO2 is generally transparent in the visible range; however, if these materials are stacked to a specific thickness to form a multi-layer film, such a multi-layer film may become non-transparent in a certain wavelength range. The reason for this will be described in accordance with the following simulation. Now, a reference wavelength of light is set at 550 nm in the visible range. Two kinds of materials, each having a thickness equivalent to ¼ of the reference wavelength of light, are stacked to each other. Here, letting the thickness of a material J be d(J), and a refractive index of the material J be n(J), the following equation is given:

$$n(J)d(J)=550/4$$

Figure 4:
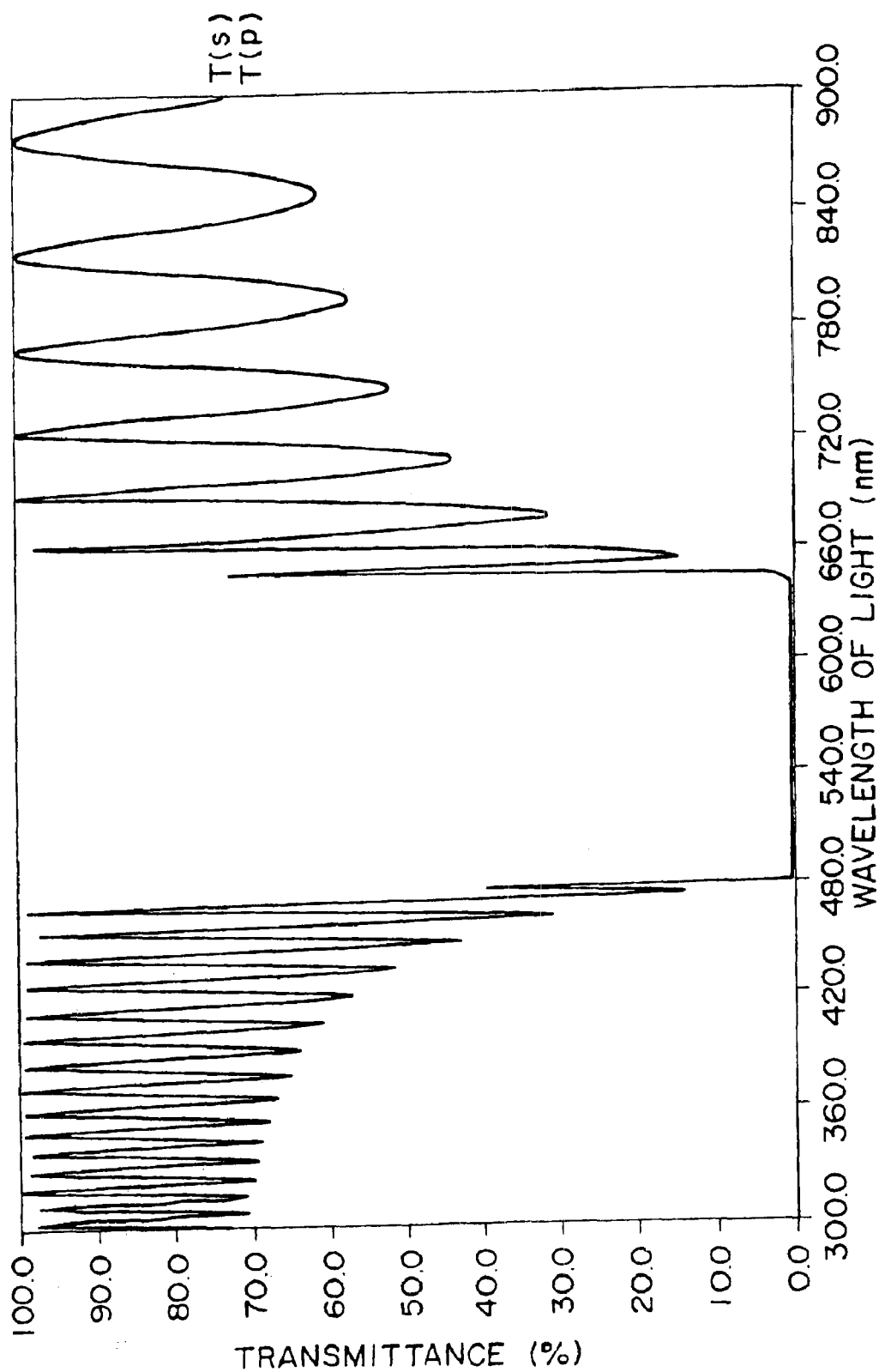
FIG. 4 is a diagram showing the spectrum of light passing through a one-dimensional periodic structure in which 20 layers, each including an SiO2 film and a TiO2 film, are repeatedly stacked.

The thickness d(SiO2)=94.2 nm and the thickness d(TiO2)=59.8 nm are obtained by substituting the refractive index n(SiO2)=1.46 and the refractive index n(TiO2)=2.30 in the above equation, respectively. Next, unit layers, each including the SiO2 film having a thickness of 94.2 nm and the TiO2 film having a thickness of 59.8 nm, are stacked repeatedly by 20 times, to form a multi-layer film. The light transmission characteristic of a one-dimensional periodic structure composed of the multi-layer film thus formed is examined by computer simulation. The result is shown in FIG. 4. As is apparent from FIG. 4, light having a wavelength in a wavelength range of 480 nm to 650 nm within the visible range cannot pass through the one-dimensional periodic structure. Such a wavelength range is called a "photonic band gap" or "stop band" of a one-dimensional periodic structure. It is known that an interference filter or a band pass filter is designed by making use of such a photonic band gap.

Figure 5:
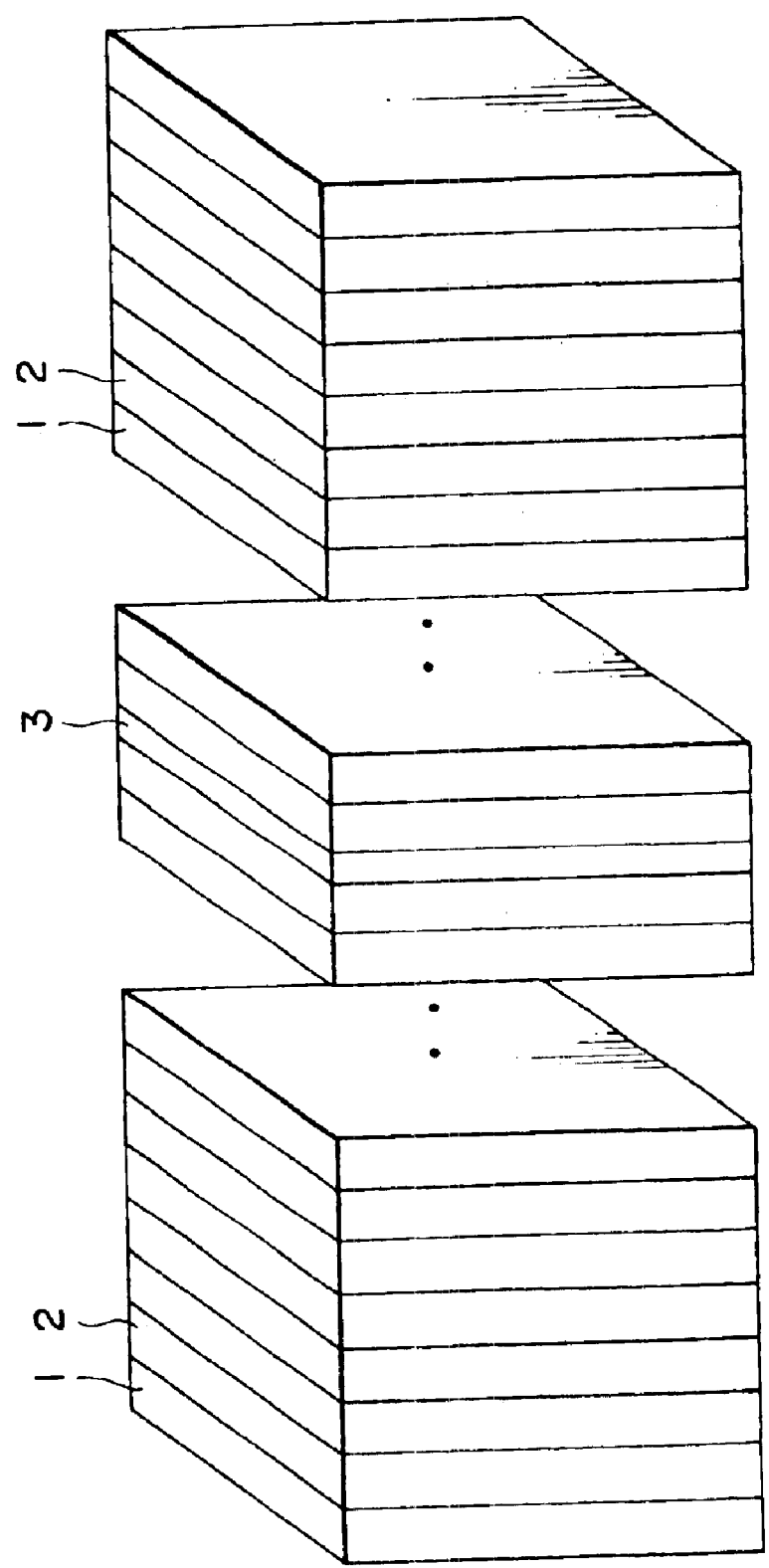
FIG. 5 is a schematic diagram illustrating a one-dimensional periodic structure having a composition of 10 layers of [SiO2/TiO2]-M (foreign matter layer)-10 layers of [SiO2/TiO2] used in the first embodiment of the present invention.
Figure 7A:
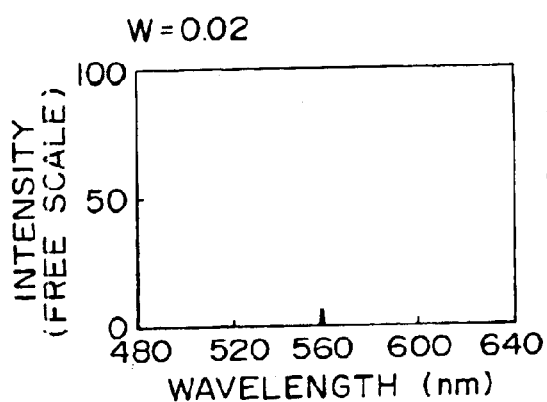
FIGS. 7A to 7F and FIGS. 8A to 8F are diagrams each showing a spectrum of light passing through the one-dimensional periodic structure having the composition of 10 layers of [SiO2/TiO2]-M (foreign matter layer)-10 layers of [SiO2/TiO2] shown in FIG. 5 with the thickness W (converted thickness) of the M layer changed by 0.02 stepwise from 0.02 to 0.24.
Figure 7D:
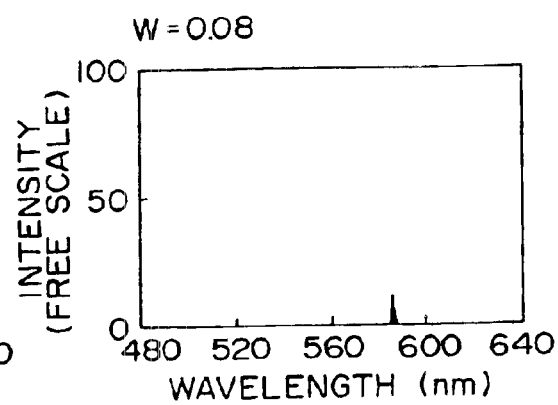
Figure 7B:
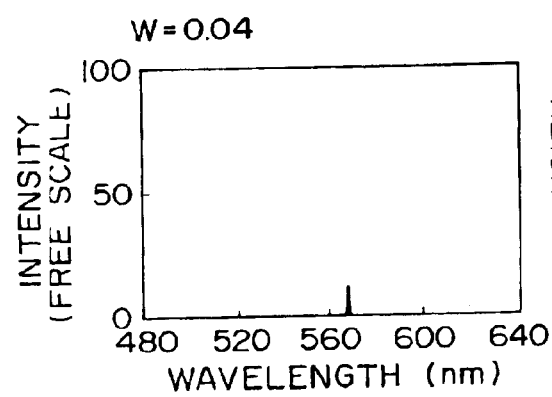
Figure 7E:
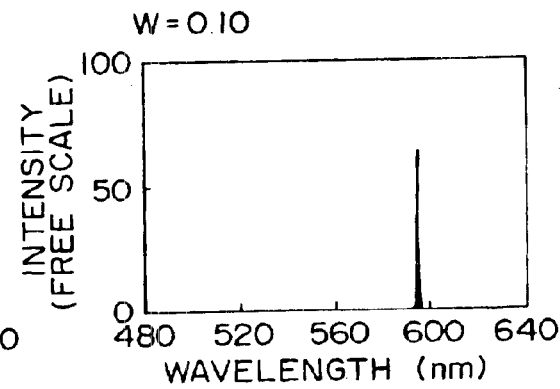
Figure 7C:
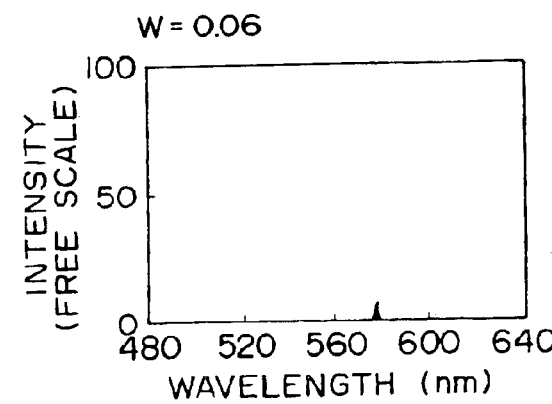
Figure 7F:
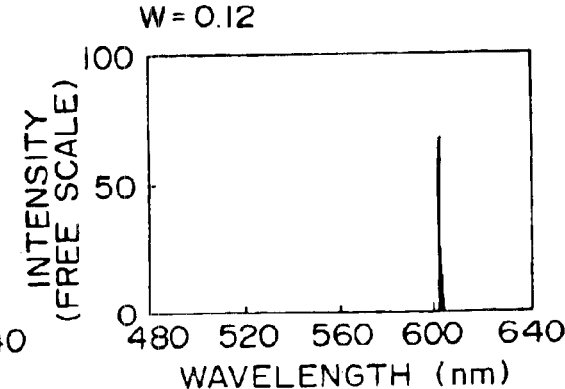
Figure 8A:
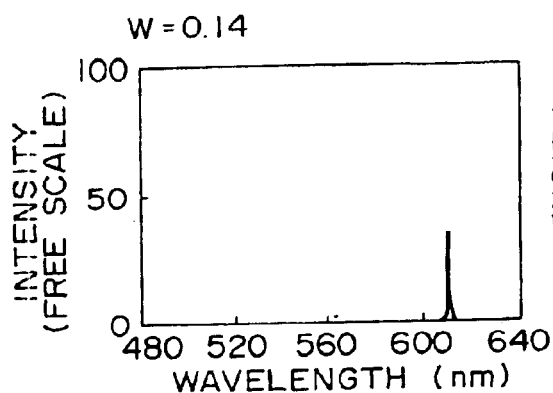
Figure 8D:
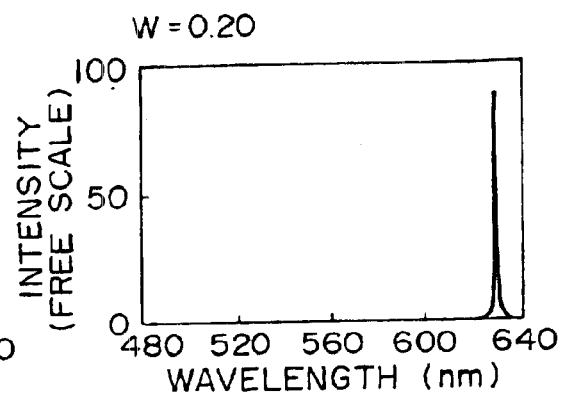
Figure 8B:
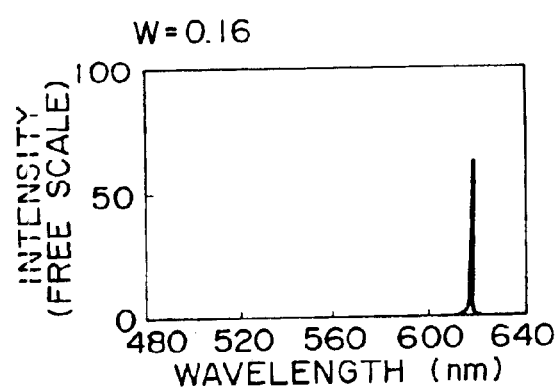
Figure 8E:
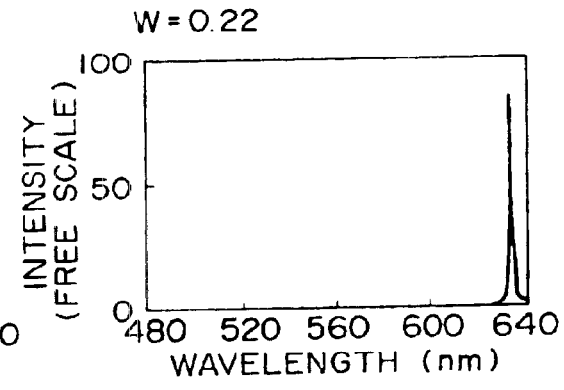
Figure 8C:
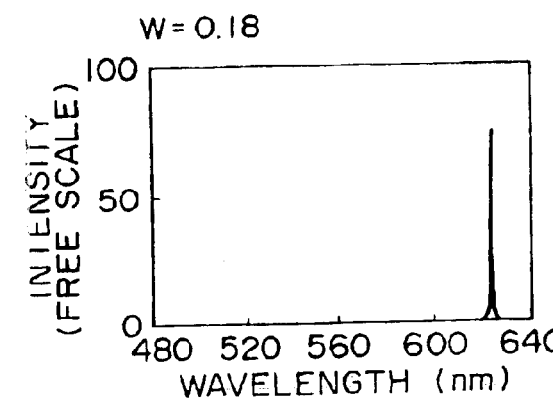
Figure 8F:
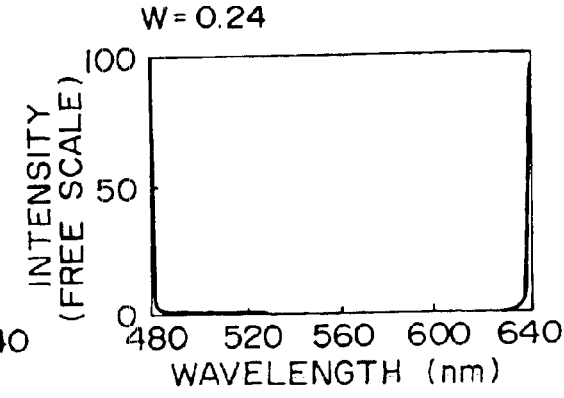

The insertion of a "foreign matter=impurity" for disturbing the periodicity in the above-described one-dimensional periodic structure will be described below. FIG. 5 shows a multi-layer film, in which 10 cycles of layers, each including the SiO2 film and the TiO2 film, are stacked, a layer made from a material M (n(M)=1.95) is stacked to a thickness d (M), and 10 cycles of layers, each including the SiO2 film and the TiO2 film, are stacked. The light transmission characteristic of the multi-layer film is examined by computer simulation. The result is shown in FIG. 6. In addition, the material M having the n(M)=1.95 is represented by ZrO2 having the refractive index d(M)=28.2 (equivalent to a converted thickness W=0.1 to be described later). As shown in FIG. 6, a spike-like transmission peak appears in the light non-transmission region within the visible range. This is a so-called impurity effect based on the photonic band theory, which is similar to the impurity effect based on the electronic band theory of a semiconductor in which an impurity level is formed in a band gap by doping carriers in a semiconductor.

The wavelength shift of the transmission light peak depending on a change in thickness of the foreign matter will be described below. It is known that the thickness of a piezoelectric material or the like is changed when an electric field is applied thereto from external. Such a piezoelectric material or the like can be used as the foreign matter. FIGS. 7A to 7F and FIGS. 8A to 8F are diagram each showing a spectrum of light obtained by calculation, which light passes through the one-dimensional periodic structure including 10 layers of [SiO2/TiO2]-M layer-10 layers of [SiO2/TiO2] with the thickness W (converted thickness) of the M layer changed by 0.02 stepwise from 0.02 to 0.24. In addition, the converted thickness W is determined on the basis of the following equation:

$$W = n(M)d(M)/550$$

Figure 9:
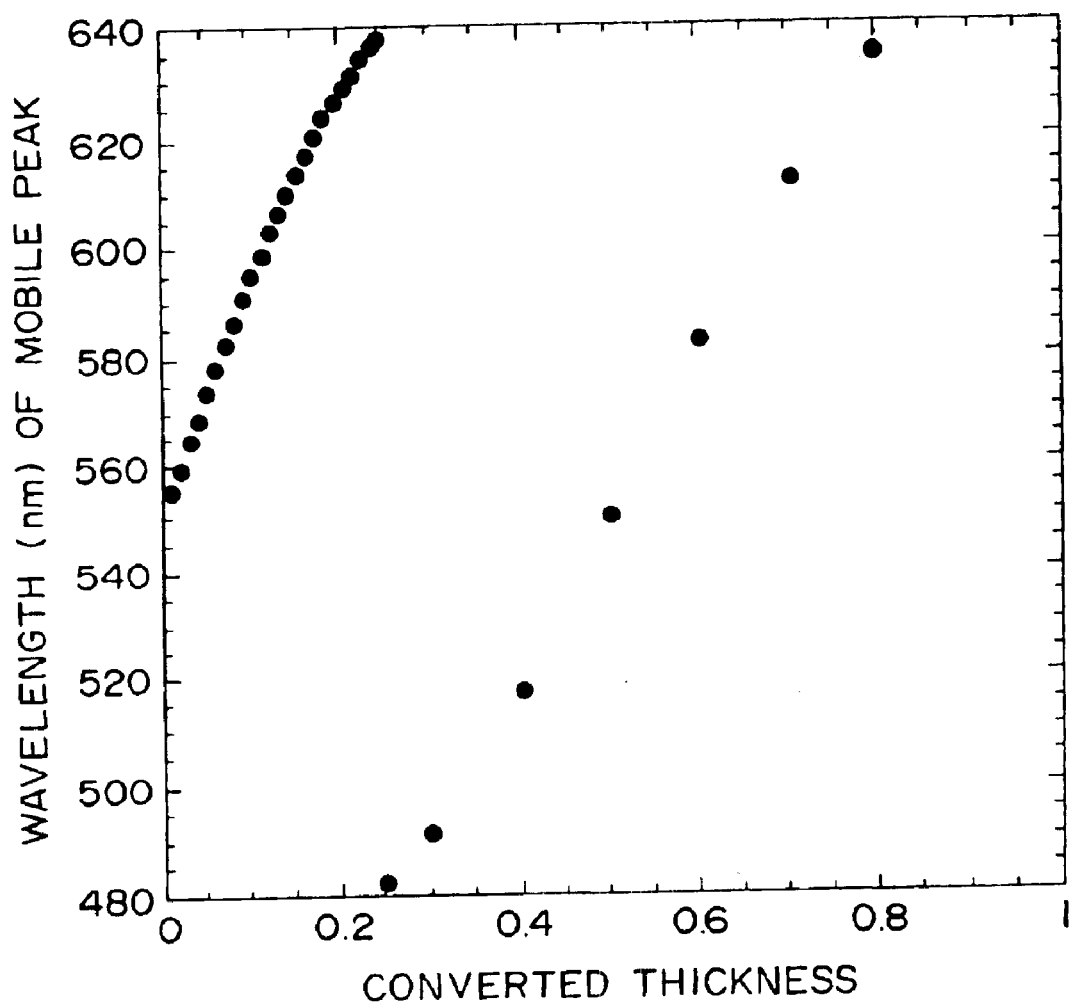
FIG. 9 is a diagram showing the wavelength shift of a mobile peak (MP) depending on a change in thickness (converted thickness) of the M layer in the one-dimensional periodic structure having the composition of 10 layers of [SiO2/TiO2]-M (foreign matter layer)-10 layers of [SiO2/TiO2] shown in FIG. 5.

In this equation, when ZnO2 is used as the material M, as described above, the refractive index n(M) becomes 1.95. FIG. 9 is a graph showing the wavelength shift of the transmission light peak appearing in the photonic gap depending on an increase in thickness (converted thickness) of the material M in a thickness range extended up to 0.8. As shown in FIG. 9, in the thickness range of 0.02 to 0.24, as the thickness of the M (foreign matter) layer is increased by 1 nm, the position of the transmission light peak is shifted to the long-wavelength side by about 1.4 nm. Such a phenomenon, in which the transmission light peak appearing in the photonic gap is shifted from the short-wavelength side to the long-wavelength side with an increase in thickness of the M (foreign matter) layer, has been first found this time. The transmission light peak is called a "mobile peak (MP)". At the end of the stop band, the MP appears again from the short-wavelength side, which is shifted again.

Figure 10:
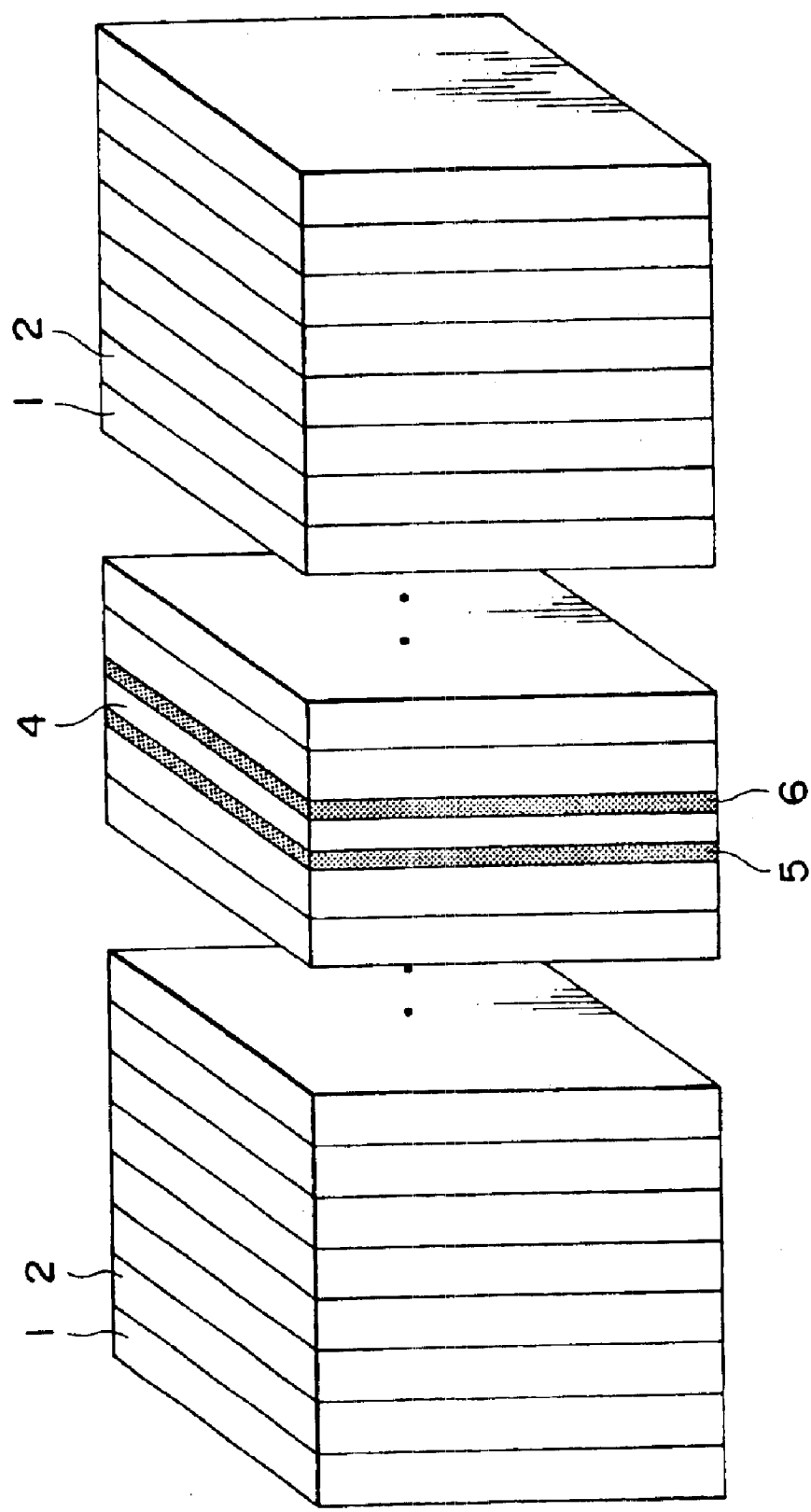
FIG. 10 is a schematic diagram showing an optical functional device according to the first embodiment of the present invention.

In this way, the mobile peak MP can be controlled by changing the thickness of the foreign matter. Next, a method of controlling the MP by changing the thickness of the foreign matter layer by means of control of an electric field applied thereto will be described with reference to FIG. 10. FIG. 10 shows an optical functional device according to the first embodiment.

Referring to FIG. 10, the optical functional device has a structure in which a PZT layer 4 put between two ITO layers 5 and 6 (transparent conductive films of In2O3-SnO4) functioning as transparent electrodes is inserted at the position of the M layer shown in FIG. 5.

In such a optical functional device, the thickness of the PZT layer 4 can be changed by applying a voltage between the ITO layers 5 and 6, thereby applying an electric field in the thickness direction of the PZT layer 4, to thus control the MP on the basis of the above-described principle.

According to the first embodiment, the wavelength of a transmission light can be selected on the basis of a signal supplied from external, that is, by applying a voltage between the ITO layers 5 and 6, and therefore, it is possible to realize a wavelength selection device allowing wavelength selection on the basis of a voltage applied from external.

[Embodiment 2]

An optical functional device according to a second embodiment will be described with reference to FIGS. 11 to 14.

Unlike the first embodiment in which the thickness of the M layer inserted as the foreign matter later in the one-dimensional periodic structure is changed, according to the second embodiment, the thickness of a foreign matter layer is kept constant and the dielectric constant, that is, the refractive index of the foreign matter layer is changed.

Figure 11:
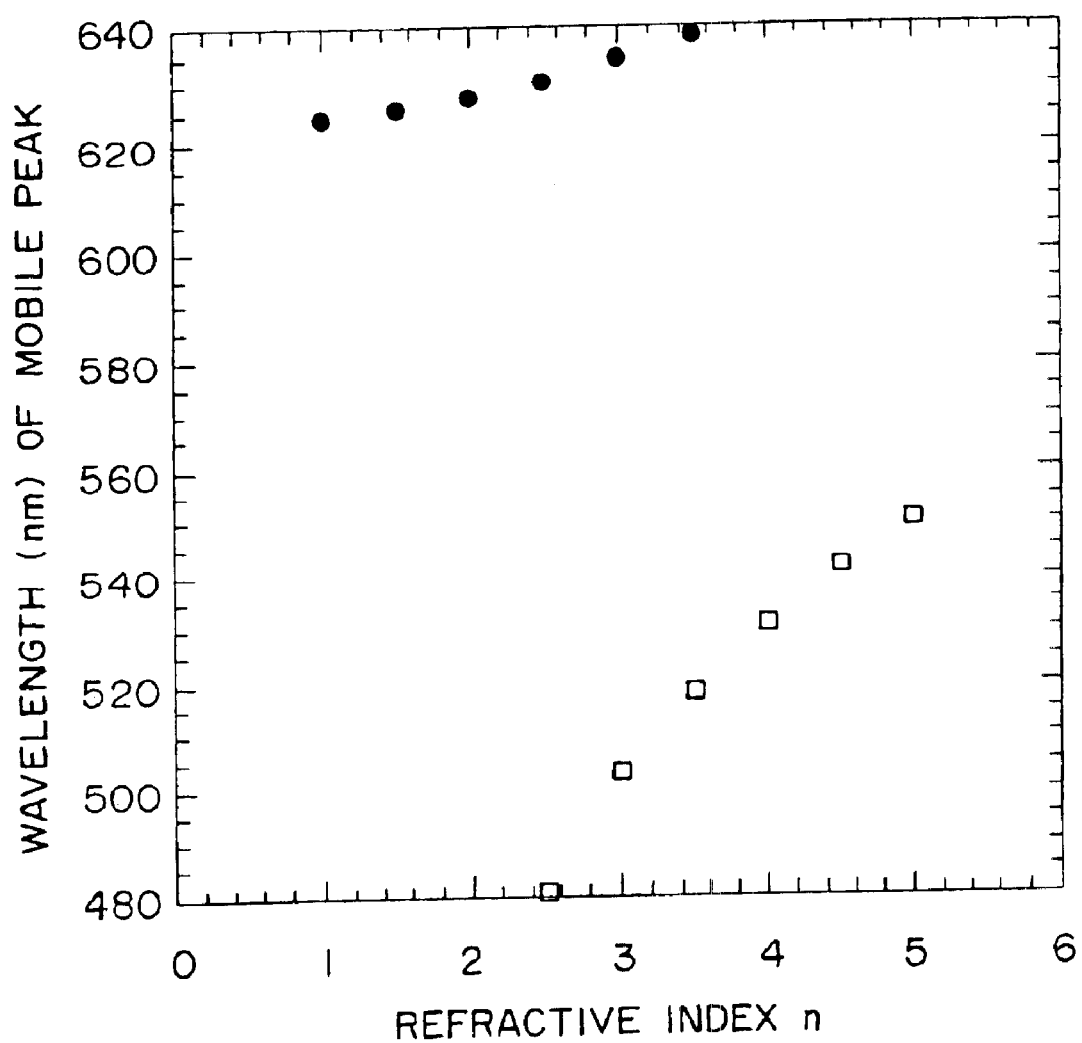
FIG. 11 is a diagram showing the wavelength shift of the mobile peak MP depending on a change in refractive index of the M layer (thickness is specified at 55 nm) in the one-dimensional periodic structure having the composition of 10 layers of [SiO2/TiO2]-M (foreign matter layer)-10 layers of [SiO2/TiO2] shown in FIG. 5.
Figure 12:
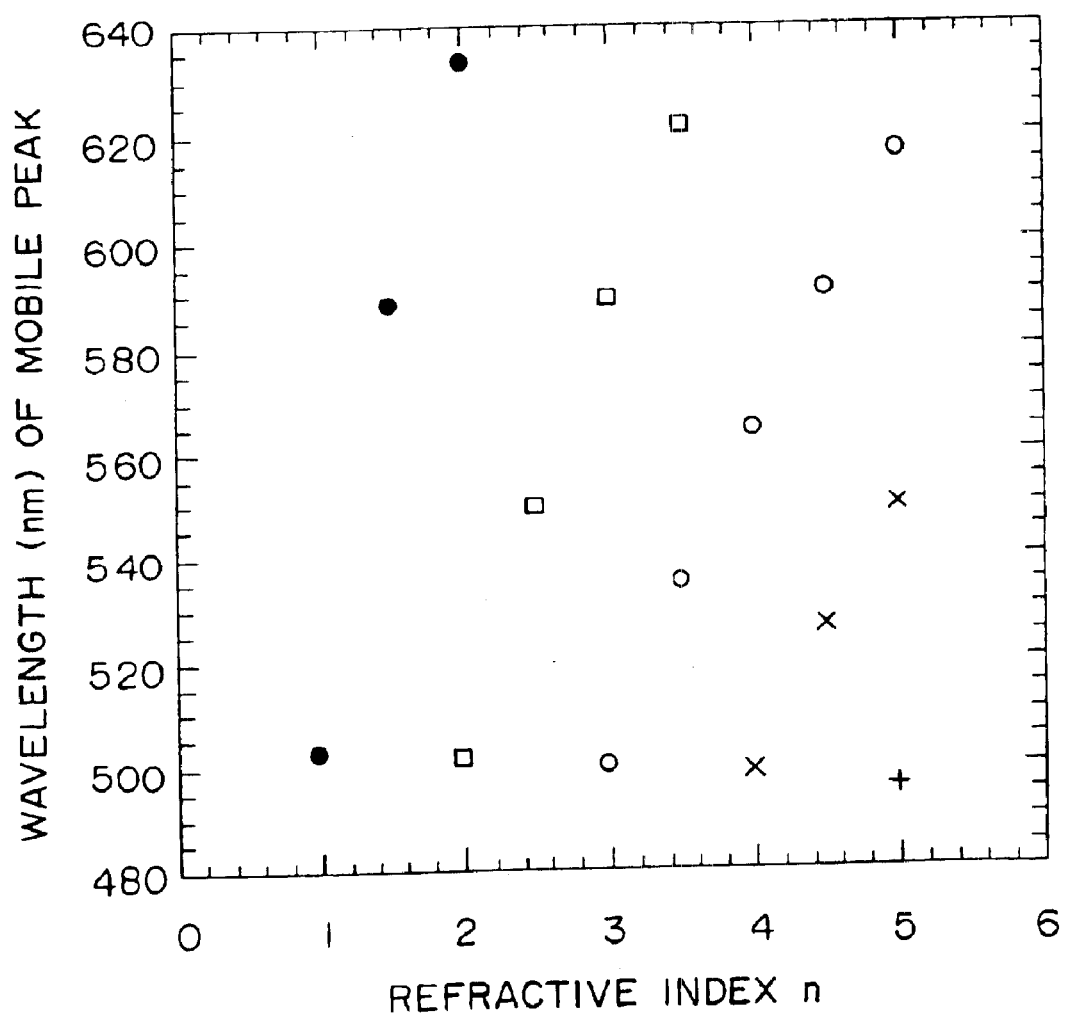
FIG. 12 is a diagram showing the wavelength shift of the mobile peak MP depending on a change in refractive index of the M layer (thickness is specified at 220 nm) in the one-dimensional periodic structure having the composition of 10 layers of [SiO2/TiO2]-M (foreign matter layer)-10 layers of [SiO2/TiO2] shown in FIG. 5.

With a foreign matter layer (thickness: specified at 55 nm) is inserted taken as a sample, the wavelength shift of a mobile peak MP depending on a change in refractive index of the foreign matter layer from 1 to 5 is calculated. The result is shown in FIG. 11. As is apparent from this figure, a spike-like MP appears in a stop band, which shifts on the long-wavelength side with an increase in refractive index "n". Similarly, with a foreign matter layer (thickness: specified at 220 nm) is inserted taken as a sample, the wavelength shift of a mobile peak MP depending on a change in refractive index of the foreign matter layer from 1 to 5 is calculated. The result is shown in FIG. 12. As is apparent from this figure, a spike-like MP appears in a stop band, which shifts on the long-wavelength side with an increase in refractive index "n", and in this case, the wavelength shift of the MP depending on the refractive index is repeated by some times.

Figure 13A:
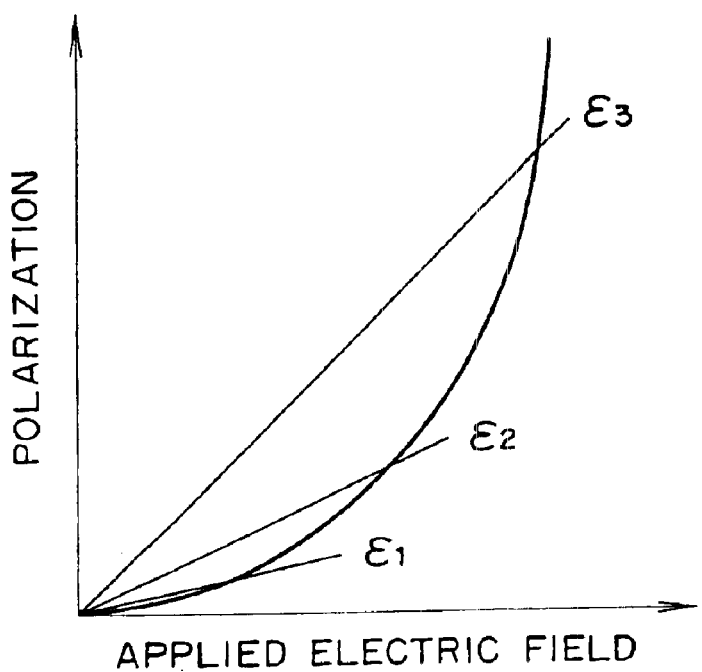
FIG. 13A is a diagram showing a relationship between a field intensity and a polarization of a non-linear medium.
Figure 13B:
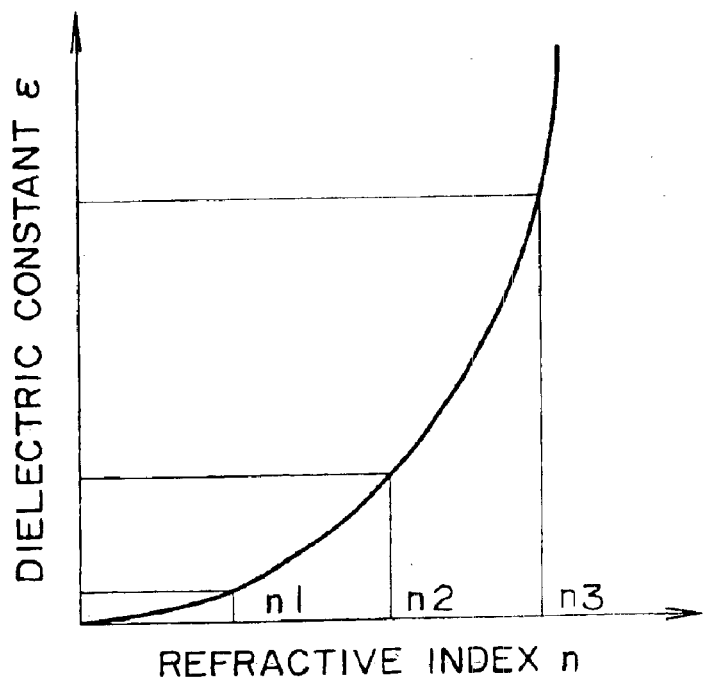
FIG. 13B is a diagram showing a relationship between a refractive index and a dielectric constant of a non-linear medium.

As described above, it becomes apparent that the behavior of the MP is dependent on not only the "thickness of the foreign matter layer" but also the "refractive index or dielectric constant of the foreign matter layer". In addition, an equation of fÅ=n2 where n is a refractive index and fÅ is a dielectric index is known. As shown in FIG. 13, a change in dielectric constant of a non-linear medium can be certainly induced by adjusting an electric field from external, which leads to a change in refractive index of the non-linear medium, to thereby change the optical characteristic of the functional device.

Figure 14:
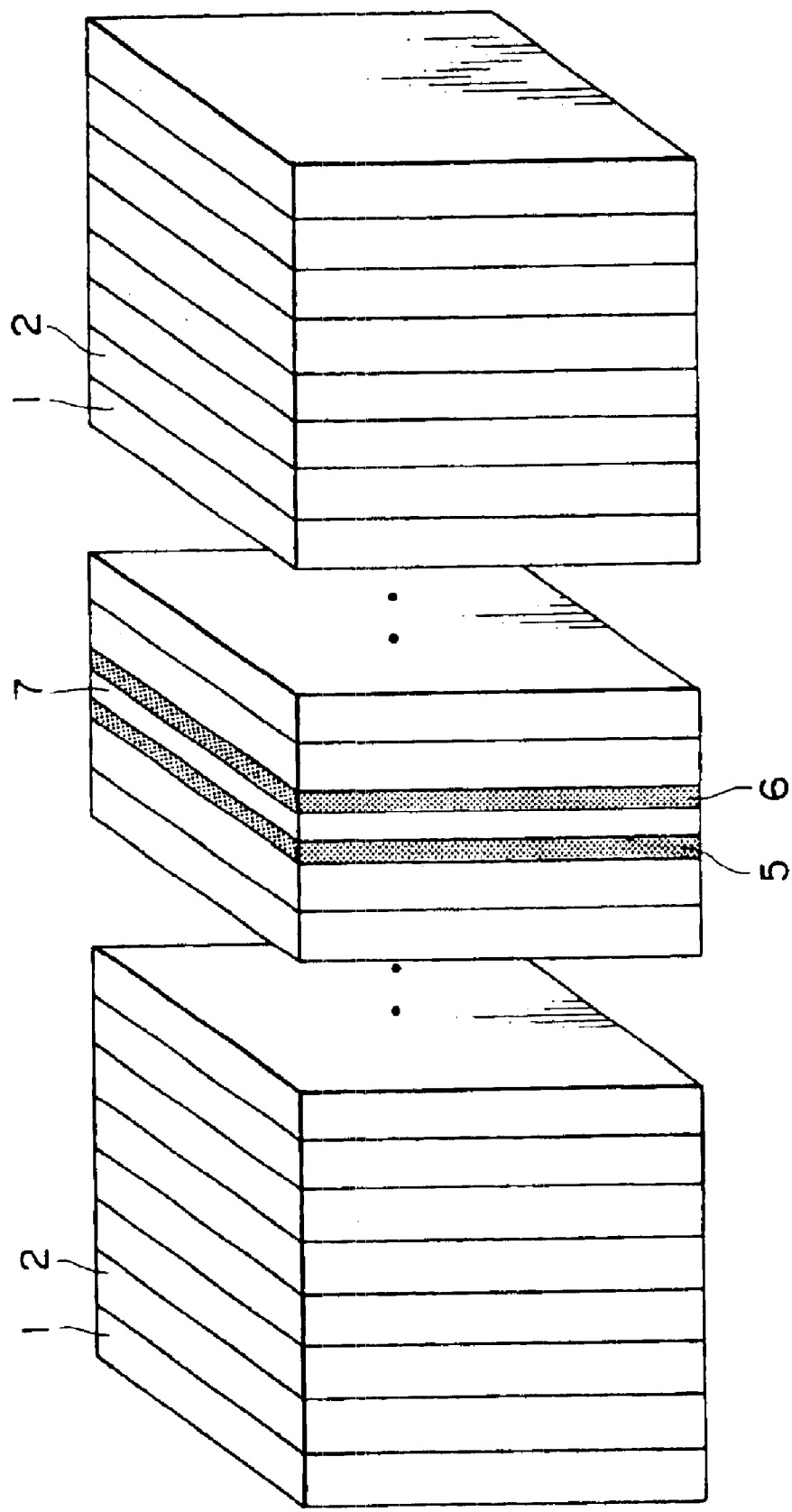
FIG. 14 is a schematic diagram showing an optical functional device according to a second embodiment of the present invention.

FIG. 14 shows an optical functional device according to the second embodiment of the present invention.

Referring to FIG. 14, the optical functional device according to the second embodiment has a structure in which a PLZT layer 7 interposed between ITO layers 5 and 6 functioning as transparent electrodes is inserted at a position of the M layer shown in FIG. 5.

In the optical functional device figured as described above, a refractive index of the PLZT layer 7 can be changed by applying a voltage between the ITO layers 5 and 6, thereby applying an electric field to the optical functional device in the thickness direction. As a result, the mobile peak MP can be controlled by changing the refractive index of the PLZT layer 7 on the basis of the above-described principle.

According to the second embodiment, like the first embodiment, it is possible to realize a wavelength selection device capable of selecting a wavelength of transmission light by changing a voltage applied to the device.

[Embodiment 3]

An artificially modulated light skin according to a third embodiment of the present invention will be described with reference to FIG. 15. The artificially modulated light skin in this embodiment is based on the basic principle of the first or second embodiment.

Figure 15:
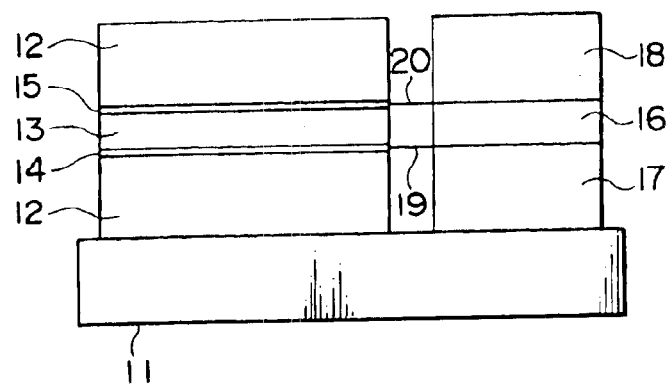
FIG. 15 is a schematic diagram showing an artificially modulated light skin according to a third embodiment of the present invention.

Referring to FIG. 15, in the artificially modulated light skin in this embodiment, a one-dimensional photonics periodic structure similar to that described in the second embodiment, which is composed of a periodic multi-layer film 12 having a one-dimensional periodic structure in which a foreign matter thin film 13 is inserted, is formed on a base 11 functioning as an artificial skin. Conductive electrode films 14 and 15 are formed at interfaces between the periodic multi-layer film 12 and the foreign mater thin film 13. The foreign matter thin film 13 is made from a material whose kinetic function, or dielectric constant or refractive index is changeable when an electric field is applied thereto from external. A piezoelectric element composed of a piezoelectric thin film 16 represented by PZT put between conductive electrode films 17 and 18 is formed at a position adjacent to the one-dimensional photonics periodic structure. The conductive electrode films 17 and 18 of the piezoelectric element are connected to the conductive electrode films 14 and 15 of the one-dimensional photonics periodic structure by means of wires 19 and 20, respectively. These base 11, one-dimensional photonics periodic structure, and piezoelectric element constitute an artificially modulated light skin.

In the artificially modulated light skin configured as described above, when the artificial skin is brought into contact with or hit against an external object, a large differential potential occurs between the conductive electrode films 17 and 18 by the piezoelectric effect, and thereby a voltage is applied between the conductive electrode films 14 and 15 of the one-dimensional photonics periodic structure, that is, to the foreign matter thin film 13 in the thickness direction thereof. As a result, the foreign matter thin film 13 exhibits a kinetic function or causes a change in refractive index, to generate a large change in spectrum of light which passes through or reflects from the one-dimensional photonics periodic structure, thereby changing the color of the artificial skin, for example, from blue-green to red.

As described above, according to the third embodiment, it is possible to realize an artificially modulated light skin whose color is changed when it is brought into contact with an external object.

[Embodiment 4]

An artificially modulated light skin according to a fourth embodiment of the present invention will be described with reference to FIG. 16.

Figure 16:
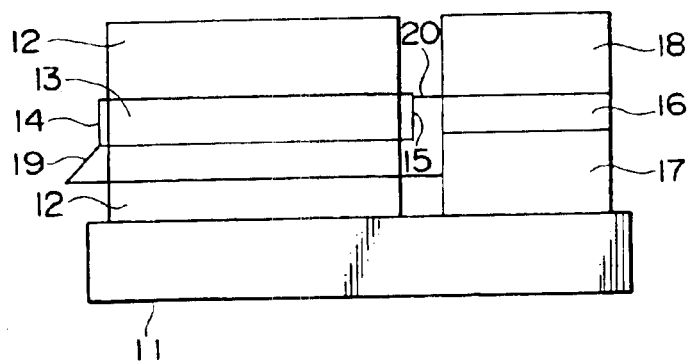
FIG. 16 is a schematic diagram showing an artificially modulated light skin according to a fourth embodiment of the present invention.

Referring to FIG. 16, the artificially modulated light skin according to this embodiment has the same configuration as that of the artificially modulated light skin according to the third embodiment, except that conductive electrode films 14 and 15 are formed on both end surfaces of a foreign matter thin film 13, and conductive electrode films 17 and 18 of a piezoelectric element are connected to the conductive electrode films 14 and 15 by means of wires 19 and 20, respectively.

The principle of the artificially modulated light skin configured as described above is the same as that of the artificially modulated light skin in the third embodiment.

According to the fourth embodiment, like the third embodiment, it is possible to realize an artificially modulated light skin whose color is changed when it is brought into contact with an external object.

[Embodiment 5]

An artificially modulated light skin according to a fifth embodiment of the present invention will be described with reference to FIG. 17.

Figure 17:
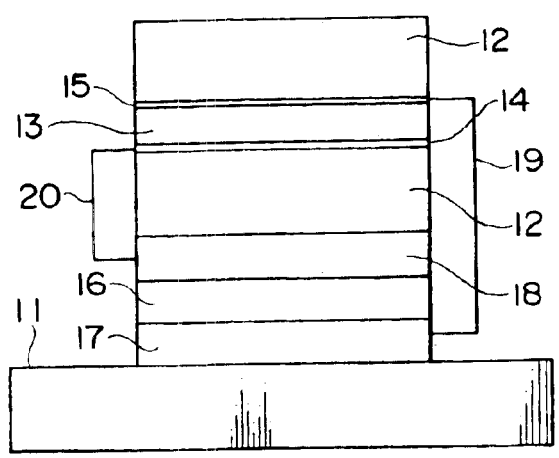
FIG. 17 is a schematic diagram showing an artificially modulated light skin according to a fifth embodiment of the present invention.

Referring to FIG. 17, the artificially modulated light skin according to this embodiment has the same configuration as that of the artificially modulated light skin according to the third embodiment, except that a one-dimensional photonics periodic structure is formed on a piezoelectric element.

The principle of the artificially modulated light skin configured as described above is the same as that of the artificially modulated light skin in the third embodiment.

According to the fifth embodiment, like the third embodiment, it is possible to realize an artificially modulated light skin whose color is changed when it is brought into contact with an external object.

[Embodiment 6]

An artificially modulated light skin according to a sixth embodiment of the present invention will be described with reference to FIG. 18.

Figure 18:
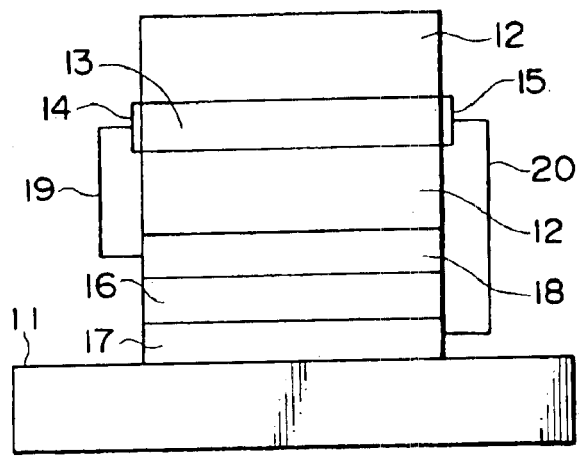
FIG. 18 is a schematic diagram showing an artificially modulated light skin according to a sixth embodiment of the present invention.

Referring to FIG. 18, the artificially modulated light skin according to this embodiment has the same configuration as that of the artificially modulated light skin according to the fourth embodiment, except that a one-dimensional photonics periodic structure is formed on a piezoelectric element.

The principle of the artificially modulated light skin configured as described above is the same as that of the artificially modulated light skin in the fourth embodiment.

According to the sixth embodiment, like the fourth embodiment, it is possible to realize an artificially modulated light skin whose color is changed when it is brought into contact with an external object.

[Embodiment 7]

An artificially modulated light skin according to a seventh embodiment will be described with reference to FIGS. 19 and 20.

Figure 19:
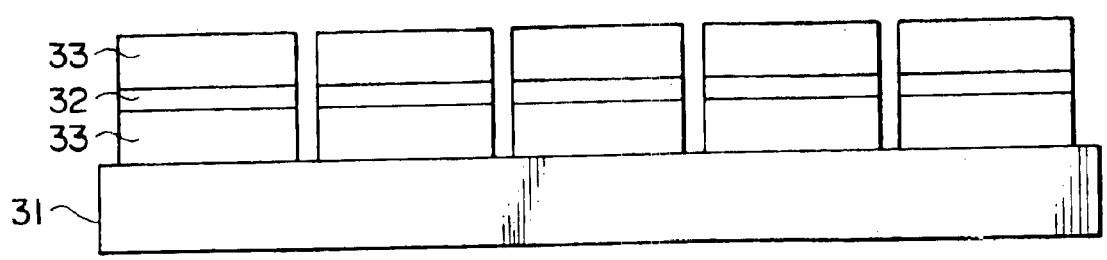
FIG. 19 is a schematic diagram showing an artificially modulated light skin according to a seventh embodiment of the present invention.
Figure 20:
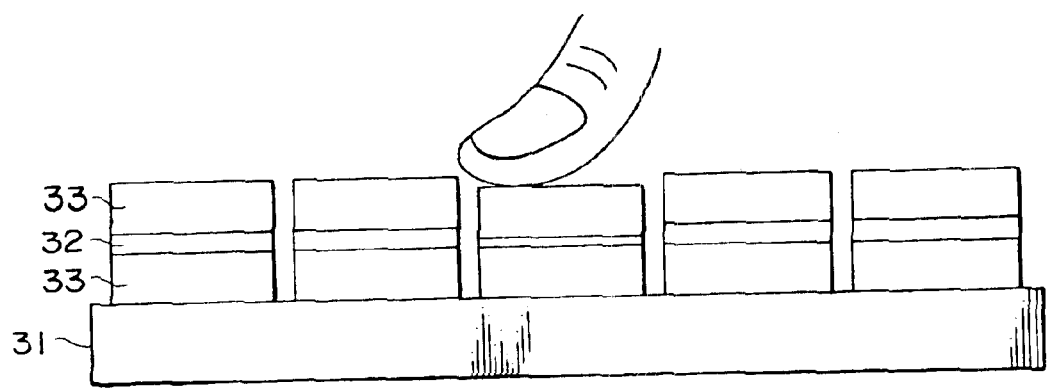
FIG. 20 is a schematic diagram illustrating the operation of the artificially modulated light skin according to the seventh embodiment of the present invention.

Referring to FIG. 19, in the artificially modulated light skin according to this embodiment, a one-dimensional photonics periodic structure similar to that described in the second embodiment, which is composed of a periodic multi-layer film 32 having a one-dimensional periodic structure in which a transparent rubber-like thin film 33 as a foreign matter thin film is inserted, is formed on a base 31 functioning as an artificial skin in parallel thereto. The one-dimensional photonics periodic structure is typically partitioned into sections arranged in a lattice pattern. A gap is provided between adjacent two of the sections. The size of each section is typically set at a value nearly equal to the size of a finger-tip of a person's hand. The transparent rubber-like thin film 33 is typically made from silicon rubber.

In the artificially modulated light skin configured as described above, as shown in FIG. 20, when the artificial skin is brought into contact with or hit against an external object, typically, a finger-tip 34, a stress generated in the section, being in contact with or hit against the finger tip 34, of the one-dimensional photonics periodic structure is plastically deformed, to largely change the thickness of the rubber-like thin film 32 as the foreign matter thin film, thereby changing the color of the artificial skin.

According to the seventh embodiment, it is possible to realize an artificially modulated light skin capable of changing the color of an artificial skin without use of any electric energy, and further, since the structure of the artificially modulated light skin can be simplified, it is possible to produce the artificially modulated light skin at a low cost.

[Embodiment 8]

An optical functional device according to an eighth embodiment will be described with reference to FIG. 21.

Unlike each of the first to seventh embodiments associated with the principle of the one-dimensional periodic structure and its application example, the eighth embodiment is concerned with an optical functional device having a two-dimensional periodic structure and its application example. Two-dimensional periodic structures can be produced by various techniques, for example, a lithography technique used for the semiconductor industry, a technique of arranging balls, and a printing technique using a printer head. Of these various technique, according to this embodiment, the printing technique using a printer head is adopted to produce a two-dimensional periodic structure. According to the current printing technique, it is possible to form dots of a desired material with 1000 DPI, that is, with cycles of 25 fẼm on a base by a manner of previously putting the desired material in a liquid phase which is solidified after injection in a sump of a generally used printer head (for example, of an injection type in which liquid is injected from the sump by a piezoelectric mechanism), and carrying out printing by injecting the desired material from the printer head onto the base. FIG. 21 is a conceptual view showing a dot film as a two-dimensional periodic structure obtained by forming dots on a base by an ink-jet method.

Referring to FIG. 21, the optical functional device according to this embodiment includes a two-dimensional periodic structure composed of dots 42 repeatedly disposed in specific cycles in the X-direction and in specific cycles in the Y-direction, wherein dots 43 made from a material different from that of the dots 42, which are disposed in one row in the Y-direction, are inserted in a halfway portion of the periodic structure. The one row of the dots 43 can be formed by changing, on halfway of formation of the dots 42 constituting the periodic structure by the ink-jet method, the ink material for the dots 42 to the ink material for the dots 43.

According to the eighth embodiment, it is expected to obtain an effect that, when light having a wavelength in an infrared range is made incident on the optical functional device of this embodiment, a reflection wavelength of the light incident on the optical functional device in the X-direction becomes different from that of the light incident on the optical functional device in the Y-direction. Further, if the unit cycle of the above-described two-dimensional periodic structure can be made finer up to a dimension nearly equal to a wavelength of light in a visible range by making finer intervals between the dots 43 and 44, it is possible to freely change the color tone, of the optical functional device, which is visible when light is made incident thereon. That is to say, indeterminate variations of the optical functional device according to this embodiment can be considered by previously selecting, that is, designing the kind of a liquid to be put in the sump of the printer head. For example, by using a metal colloid as the liquid to be put in the sump, it is possible to obtain a coating or an artificial skin capable of exhibiting special brightness.

[Embodiment 9]

An optical functional device according a ninth embodiment will be described with reference to FIGS. 22A to 22D and FIG. 23.

Unlike each of the first to eighth embodiments associated with the function of the optical functional device, which is exhibited with no functional property given to the foreign matter itself, and the production method of the optical functional device, according to the ninth embodiment, a wire structure is grown on a two-dimensional plane in the vertical direction and a functional property is given to a foreign matter itself in the structure.

According to the ninth embodiment, as shown in FIG. 22A, a single crystal silicon (Si) base 51 is first prepared. Then, as shown in FIG. 22B, gold (Au) is vapor-deposited on the single crystal Si base 51 by using a mask (not shown) having fine holes, to thereby periodically form a two-dimensional array of circular Au film portions 52. In the circular Au film portions 52, Si is grown by making use of a so-called surfactant effect of Au. In this case, as shown in FIG. 22C, since Si is grown on the back surfaces of the Au film portions 52 by the surfactant effect, Si columns 53 are formed under the Au film portions 52. The Au film portions 52 are removed; and as shown in FIG. 22D, cerium oxide (CeO2) layer portions 54 as buffer layer portions are grown on the Si columns 53, and lead lanthanum zirconate titanate (PLZT) layer portions 55 are grown on the cerium oxide layer portions 54. In this way, a two-dimensional periodic structure is formed.

The ninth embodiment makes use of a mechanism in which the layer portion 55 made from PLZT known as an optical actuator generates a differential potential across end surfaces thereof by a photovolatic force and simultaneously generates strain by the electrostrictive effect, when the layer 55 is irradiated with light. To be more specific, as shown in FIG. 23, by irradiating a specific PLZT layer portion 55 with laser light as control light from external, the shape of the PLZT layer portion 55 can be deformed, with a result that it is possible to control the signal light.

[Embodiment 10]

An optical functional device according to a tenth embodiment will be described with reference to FIGS. 24A to 24D and FIG. 25.

Figure 24A:
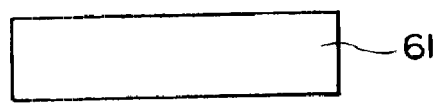
FIGS. 24A to 24D are schematic diagrams illustrating a method of producing an optical functional device according to a tenth embodiment of the present invention.
Figure 24B:
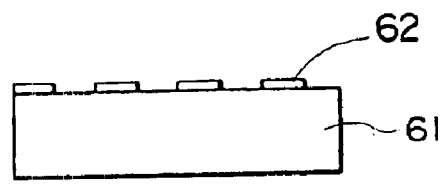
Figure 24C:
Figure 24D:
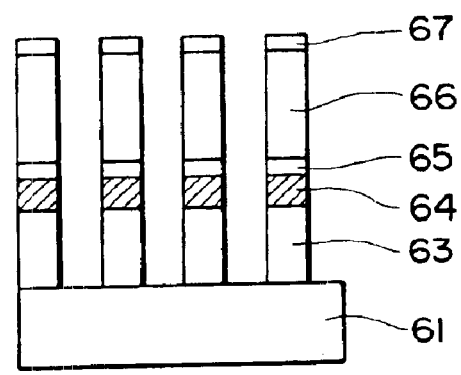

According to the tenth embodiment, as shown in FIG. 24A, a single crystal silicon (Si) base 61 is first prepared. Then, as shown in FIG. 24B, gold (Au) is vapor-deposited on the single crystal Si base 61 by using a mask (not shown) having fine holes, to thereby periodically form a two-dimensional array of circular Au film portions 62. In the circular Au film portions 62, Si is grown by making use of a so-called surfactant effect of Au. In this case, as shown in FIG. 24C, since Si is grown on the back surfaces of the Au film portions 62 by the surfactant effect, Si columns 63 are formed under the Au film portions 62. The Au film portions 62 are removed, and as shown in FIG. 24D, cerium oxide (CeO2) layer portions 64 as buffer layer portions are grown on the Si columns 63. These steps are the same as those described in the ninth embodiment. After that, according to this embodiment, SrRuO3 layer portions 65, PLZT layer portions 66, and SrRuO3 layer portions 67 are sequentially formed on the CeO2 layer portions 64. In this way, a two-dimensional periodic structure is formed. The SrRuO3 layer portion 65 and the SrRuO3 layer portion 67 are used as a lower electrode and an upper electrode, respectively.

Figure 25:
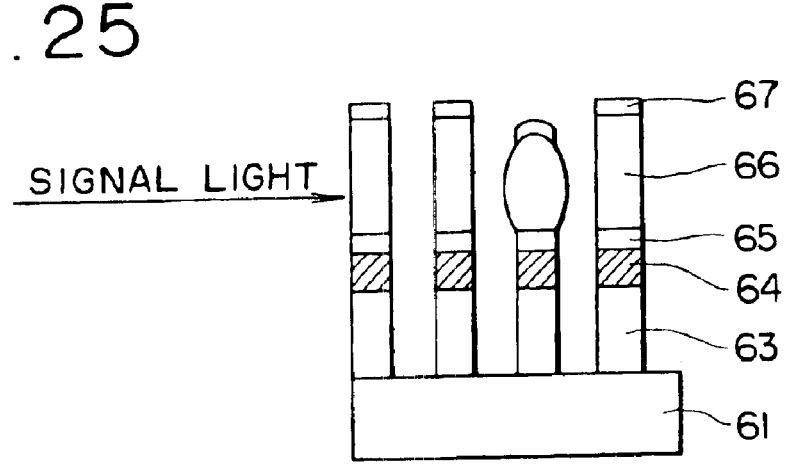
FIG. 25 is a schematic diagram illustrating the operation of the optical functional device according to the tenth embodiment of the present invention.

The tenth embodiment makes use of the mechanism that the PLZT layer portion generates strain by the electrostrictive effect. To be more specific, as shown in FIG. 25, by applying a voltage to a specific PLZT layer portion 66 via the SrRuO3 layers 65 and 66, the shape of the PLZT layer portion 66 can be deformed, with a result that it is possible to control the signal light.

[Embodiment 11]

A functional device according to an eleventh embodiment will be described with reference to FIG. 26.

Figure 26:
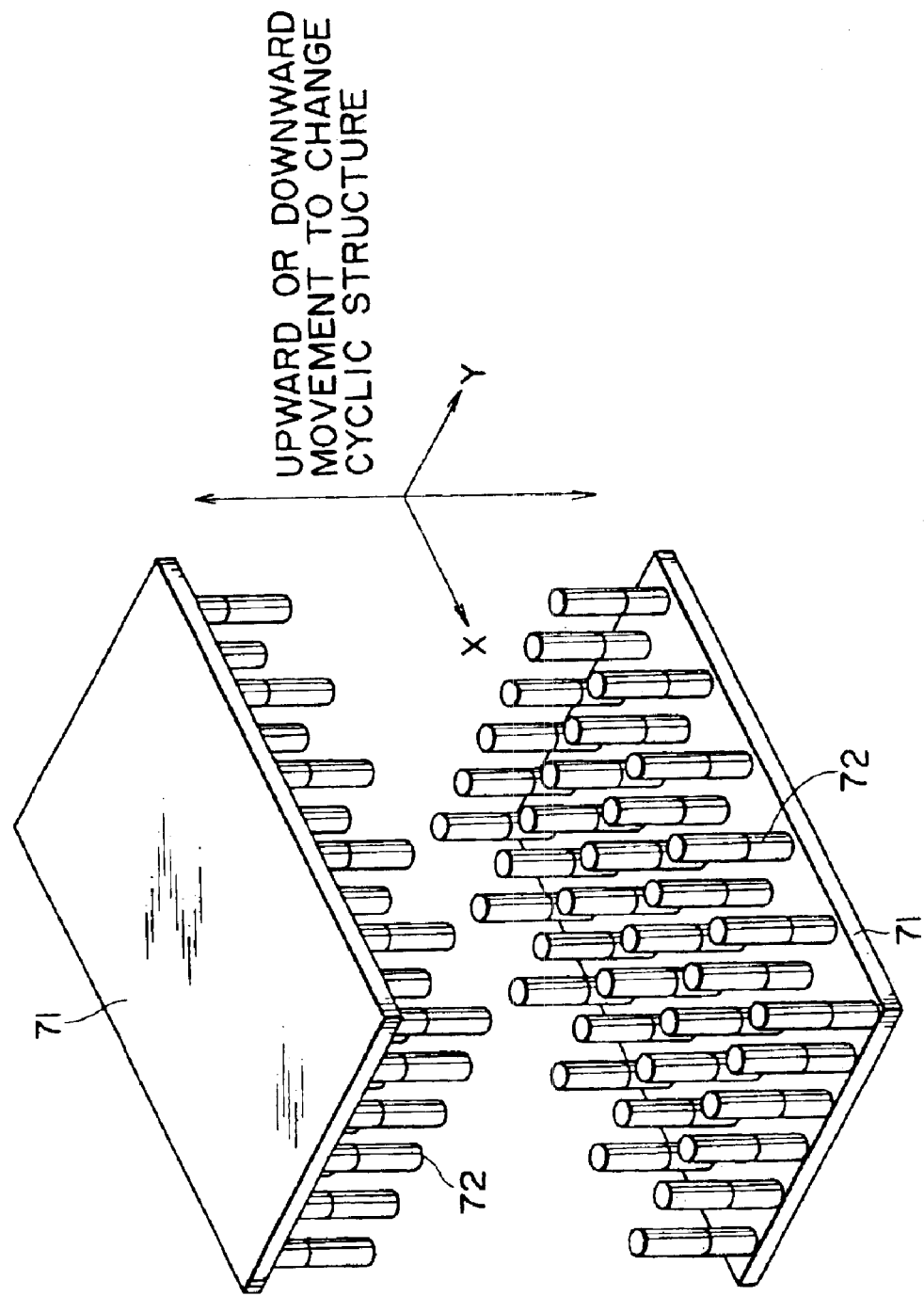
FIG. 26 is a schematic diagram showing an optical functional device according to an eleventh embodiment of the present invention.

According to the eleventh embodiment, as shown in FIG. 26, two pieces of two-dimensional periodic structures are prepared, in each of which wire-like projections 72 are formed on a base 71 in specific cycles in the X-direction and in specific cycles in the Y-direction. The two-dimensional periodic structures are disposed in such a manner as to face to each other. It should be noted that the two-dimensional periodic structure may be the same as that described, for example, in each of the eighth, ninth, and tenth embodiments. These two-dimensional periodic structures are movable in the vertical direction (Z-direction) and the in-plane directions (X-direction and Y-direction) by a drive mechanism (not shown).

According to the eleventh embodiment, one of the two-dimensional periodic structures is moved within the X-Y plane and stopped at a position at which each of the projections 72 of the one periodic structure bisects the interval between the corresponding two of the projections 72 of the other periodic structures in the X-direction or Y-direction, and the one periodic structure is moved in the vertical direction and stopped at a position at which the one periodic structure is bitten into the other periodic structure. With this configuration, the unit cycle in the X-direction or Y-direction can be modulated to half, and the degree of interference with an electromagnetic wave or sound wave can be changed by controlling the bitten depth of the one periodic structure into the other periodic structure. Of course, the eleventh embodiment can obtain the same effect as that of each of the eighth, ninth and tenth embodiments.

[Embodiment 12]

A two-dimensional periodic structure according to a twelfth embodiment will be described with reference to FIG. 27. In this embodiment, a periodic structure formed on a two-dimensional plane is modulated in accordance with a method different from that described in the eleventh embodiment.

Figure 27:
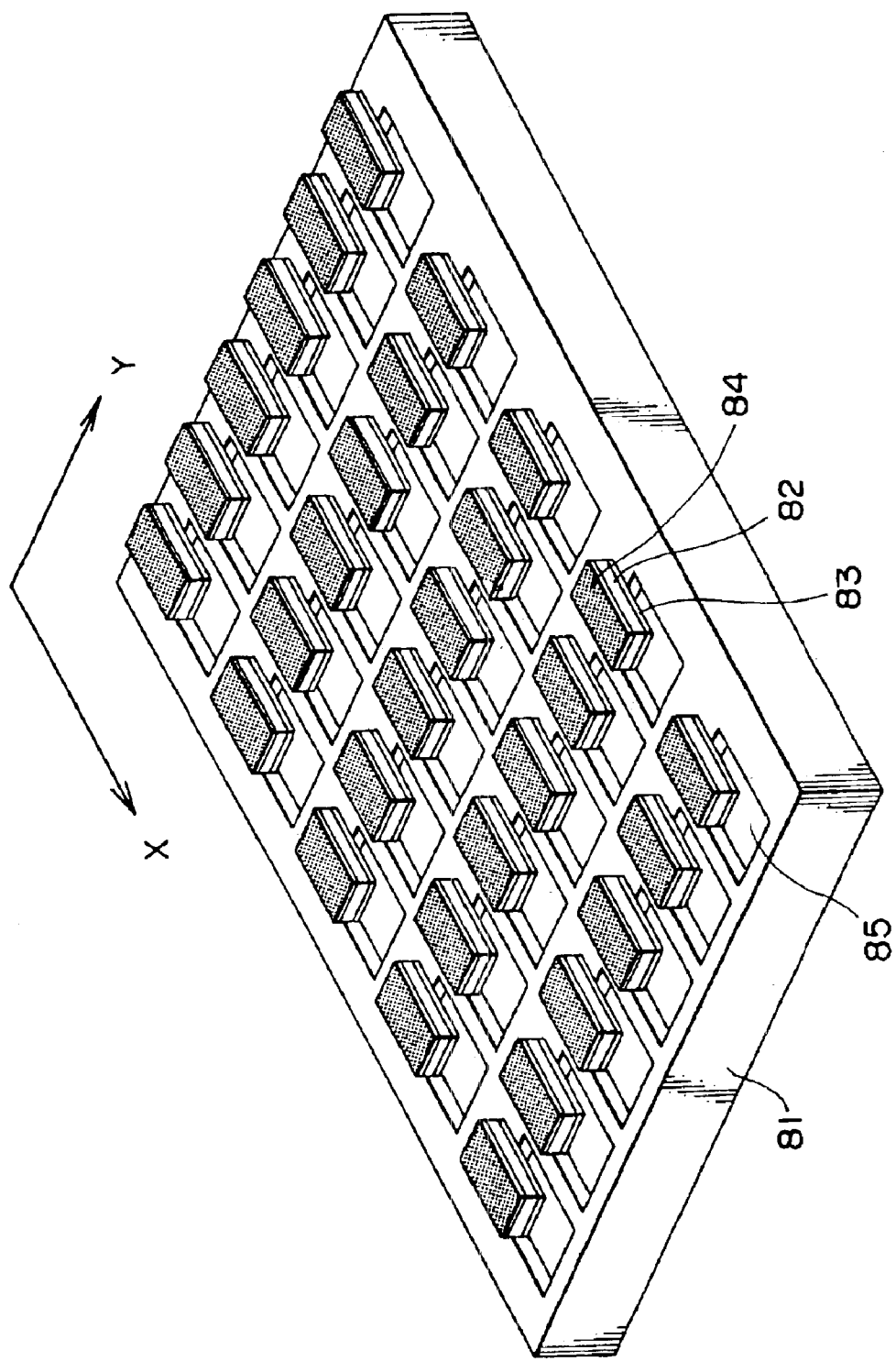
FIG. 27 is a schematic diagram showing an optical functional device according to a twelfth embodiment of the present invention.

According to the twelfth embodiment, as shown in FIG. 27, piezoelectric elements, each having a structure in which a piezoelectric thin film 82 configured as typically a PZT film is put between a lower electrode 83 and an upper electrode 84, are periodically formed on one principal plane of a base, typically, Si base 81 in specific cycles in the X-direction and in specific cycles in the Y-direction. Specific wires (not shown) are connected to pairs of the lower electrodes 83 and the upper electrodes 84 of the piezoelectric elements for independently applying a drive voltage between each pair of the electrodes 83 and 84. Square holes 85 are each formed in the base 81 by lithography and etching in such a manner as to be overlapped to a specific length of the piezoelectric element in the Y-direction. In this modulation method, the combination of the electrodes and wires can be variously changed. If the control method is previously determined, the electrodes and wires may be designed in accordance with the control method. In addition, the electrodes are not necessarily provided for all the piezoelectric elements.

In the twelfth embodiment, when a voltage is applied between the lower electrode 83 and the upper electrode 84 of the piezoelectric element located at a specific position to apply an electric field to the piezoelectric thin film 82 of the piezoelectric element, the piezoelectric thin film 82 located over the hole 85 is warped upwardly or downwardly by an electrostrictive effect, whereby the periodicity of the one-dimensional periodic structure in the Y-direction is disturbed at the specific position, to thereby control the mobile peak MP.

[Embodiment 13]

A sound wave functional device according to a thirteenth embodiment of the present invention will be described with reference to FIG. 28.

Figure 28:
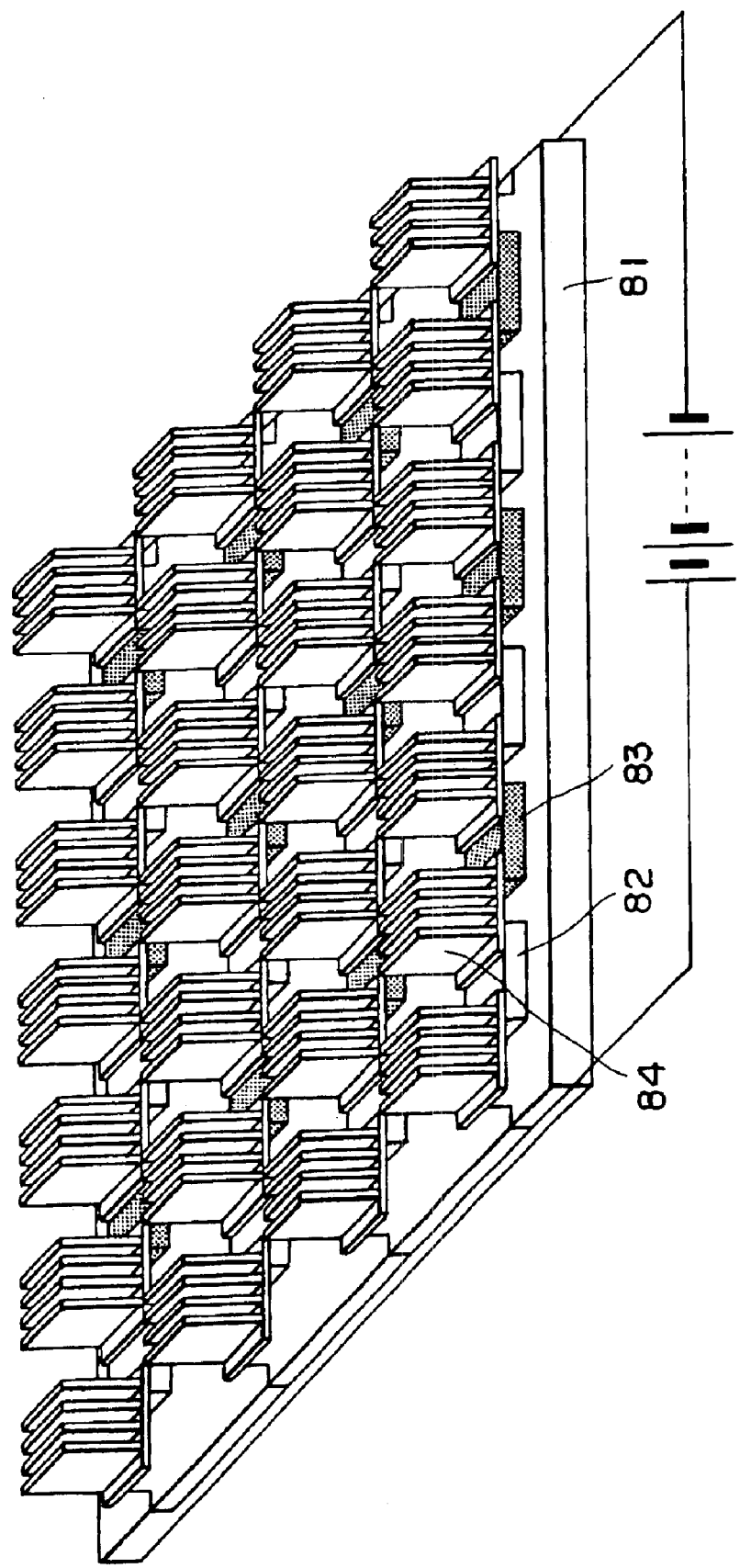
FIG. 28 is a schematic diagram showing a sound wave functional device according to a thirteenth embodiment of the present invention.

According to the thirteenth embodiment, as shown in FIG. 28, a plurality of Peltier element rows, in each of which a plurality of Peltier elements are periodically disposed on a base 81 in specific cycles in the X-direction while being connected in series, are periodically disposed in specific cycles in the Y-direction, to form a two-dimensional periodic structure. Each Peltier element includes an n-type semiconductor layer 82, a p-type semiconductor layer 83, and metal fins 84. A DC current is allowed to flow between both ends of each Peltier element row in the X-direction.

According to this thirteenth embodiment, when a DC current flows in each Peltier element row shown in FIG. 28, the metal fins 84 located between the n-type semiconductor 82 and the p-type semiconductor layer 83 in this order as seen in the flowing direction of the DC current becomes a low temperature junction portion (heat absorbing portion), while the metal fins 84 located between the p-type semiconductor layer 83 and the n-type semiconductor layer 82 in this order in the flowing direction of the DC current becomes a high temperature junction portion (heat generating portion). As a result, the density of air in the vicinity of the metal fins 84 at the low temperature junction portion is increased, while the density of air in the vicinity of the metal fins 84 at the high temperature junction portion is decreased, and thereby a periodic change in condensation and rarefaction of air occurs with the same pitch as the arrangement pitch of the Peltier elements in the X-direction. In such a state, a ultrasonic wave is made incident on the two-dimensional periodic structure in the X-direction, to obtain an effect similar to the photonic band effect.

The periodicity of the sound wave functional device can be variously changed by freely changing the arrangement of the p-type semiconductor layer 83 and the n-type semiconductor layer 82 of each Peltier element.

According to the thirteenth embodiment, it is possible to realize a sound wave functional device having a function similar to that of the photonic crystal by making use of Peltier elements.

[Embodiment 14]

A sound wave functional device according to a fourteenth embodiment of the present invention will be described with reference to FIG. 29.

According to the fourteenth embodiment, as shown in FIG. 29, threads 93 made from gel such as agar are stretched between two bases 91 and 92 just as a reed screen in such a manner as to be periodically disposed in specific cycles in the X-direction and in specific cycles in the Y-direction, to form a two-dimensional periodic structure. The periodicity of the periodic structure, which can exert an effect of the periodicity to a ultrasonic wave, is selected.

According to the fourteenth embodiment, it is possible to realize a sound wave functional device which is capable of exhibiting a function similar to that of the photonic crystal against an ultrasonic wave made incident on a two-dimensional periodic structure of the sound wave functional device.

[Embodiment 15]

An optical functional device according to a fifteenth embodiment of the present invention will be described with reference to FIGS. 30 and 31. It should be noted that in this embodiment and in the subsequent sixteenth to twentieth embodiments, description will be made of optical functional devices using intercalation materials and composite materials.

First, a method of producing an intercalation material will be briefly described by example of intercalation of organic amine (carbon number: 1 to 5, 8 or 10, or 12 or 18) in ceramic KTiNbO5.

Commercial raw powders of K2CO3, TiO2, and Nb2O5 were put in a mixer at a mole ratio of 1:1:1 and sufficiently mixed, and then the mixture was calcinated at 900 for 24 hr and crushed. This procedure was repeated by three times, to obtain a single phase sample of KTiNbO5.

The sample was subjected to ion exchange treatment using hydrochloric acid having a concentration of 2N at 60 for 1 hr, to nearly perfectly convert KTiNbO5 into HTiNbO5.

The intercalation of organic linear amine in the above powder of HTiNbO5 was performed as follows:

The kind of solvent used in the intercalation treatment differs depending on the carbon number of organic linear amine.

(1) Carbon Number: C=1, 2, 3, 4 or 5

With pure water used as a solvent, HTiNbO5 was added to 1 M of an amine solution until the concentration of HTiNbO5 became 0.05 mol/L, and the resultant solution was agitated at room temperature for 2 hr, and was left as it was for three days for drying.

(2) Carbon Number: C=8 or 10

With a mixed solution of pure water and ethanol at a mixing ratio (volume ratio) of 50:50 used as a solvent, HTiNbO5 was added to 1 M of an amine solution until the concentration of HTiNbO5 became 0.05 mol/L, and the resultant solution was agitated at room temperature for 2 hr, and was left as it was for three days for drying.

(3) Carbon Number: C=12 or 16

With a mixed solution of pure water and ethanol at a mixing ratio (volume ratio) of 50:50 used as a solvent, HTiNbO5 was added to 1 M of an amine solution until the concentration of HTiNbO5 became 0.05 mol/L. The resultant solution was agitated at room temperature for 2 hr, immediately subjected to centrifugal separation for 10 min to promote precipitation, followed by discard of supernatant, and was left as it was for two days for drying.

In this way, three kinds of RNH3TiNbO5 were synthesized by intercalating three kinds of organic amine in HTiNbO5 obtained from KTiNbO5.

Particles of each of KTiNbO5, HTiNbO5, and organic amine intercalated RNH3TiNbO5 have particle sizes of 1 fÊm or less. In particular, the particles of organic amine intercalated RNH3TiNbO5 are formed into flake shapes. FIG. 30 shows a change in C-axis lattice constant depending on an increase in carbon number of organic amine intercalated RNH3TiNbO5. As shown in FIG. 30, the C-axis lattice constant is elongated from 1.7 nm to 8.2 nm at maximum depending on an increase in carbon number.

Figure 30:
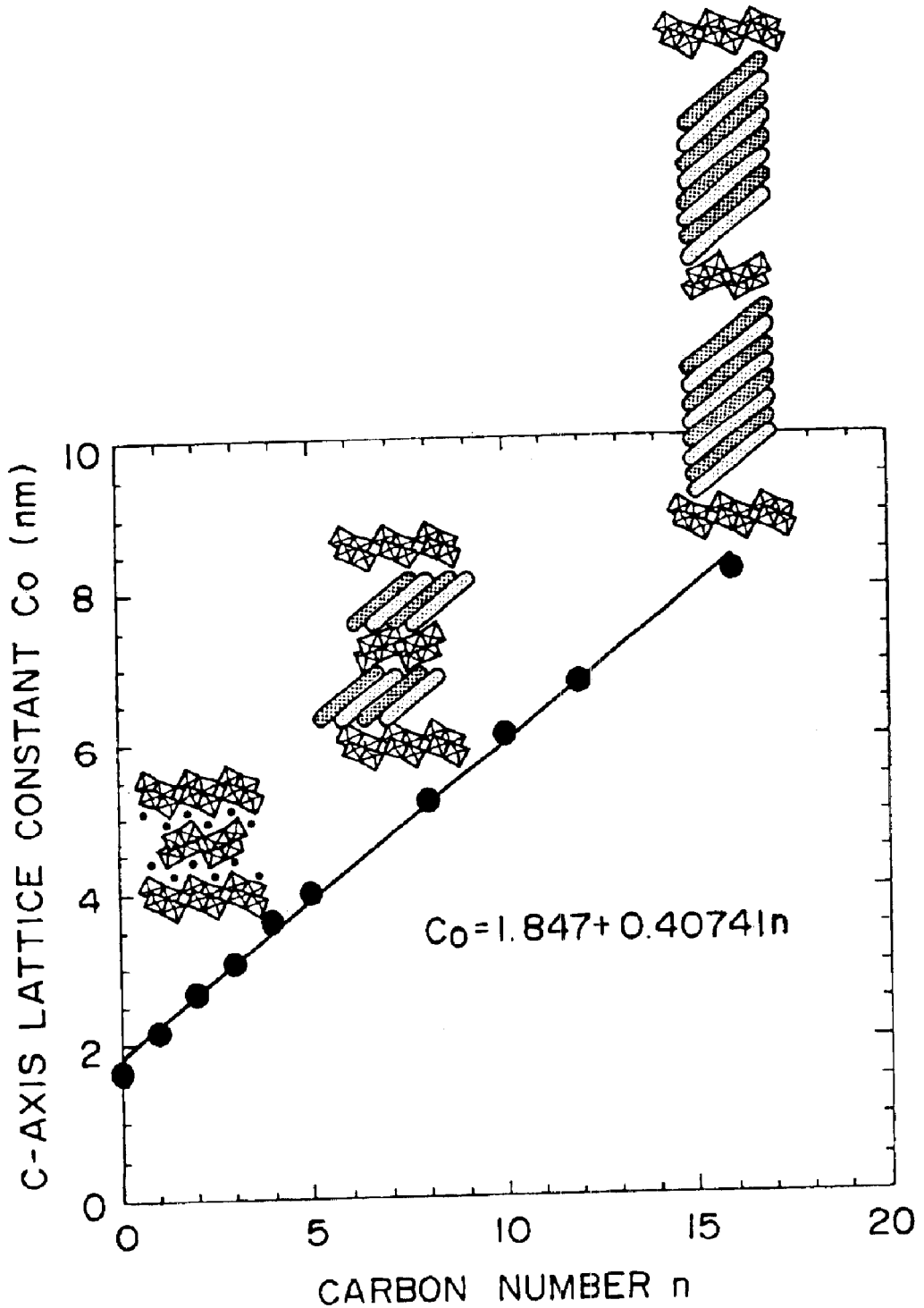
FIG. 30 is a diagram showing a correlation between the number of carbons and a lattice constant of organic linear amine inserted in an inorganic skeleton having a composition of TiNbO5.

From the result shown in FIG. 30, a relationship between the C-axis lattice constant C0 and the carbon number "n" can be linearly approximated as expressed by the following equation:

$$C0=1.847+0.40741n$$

Figure 31:
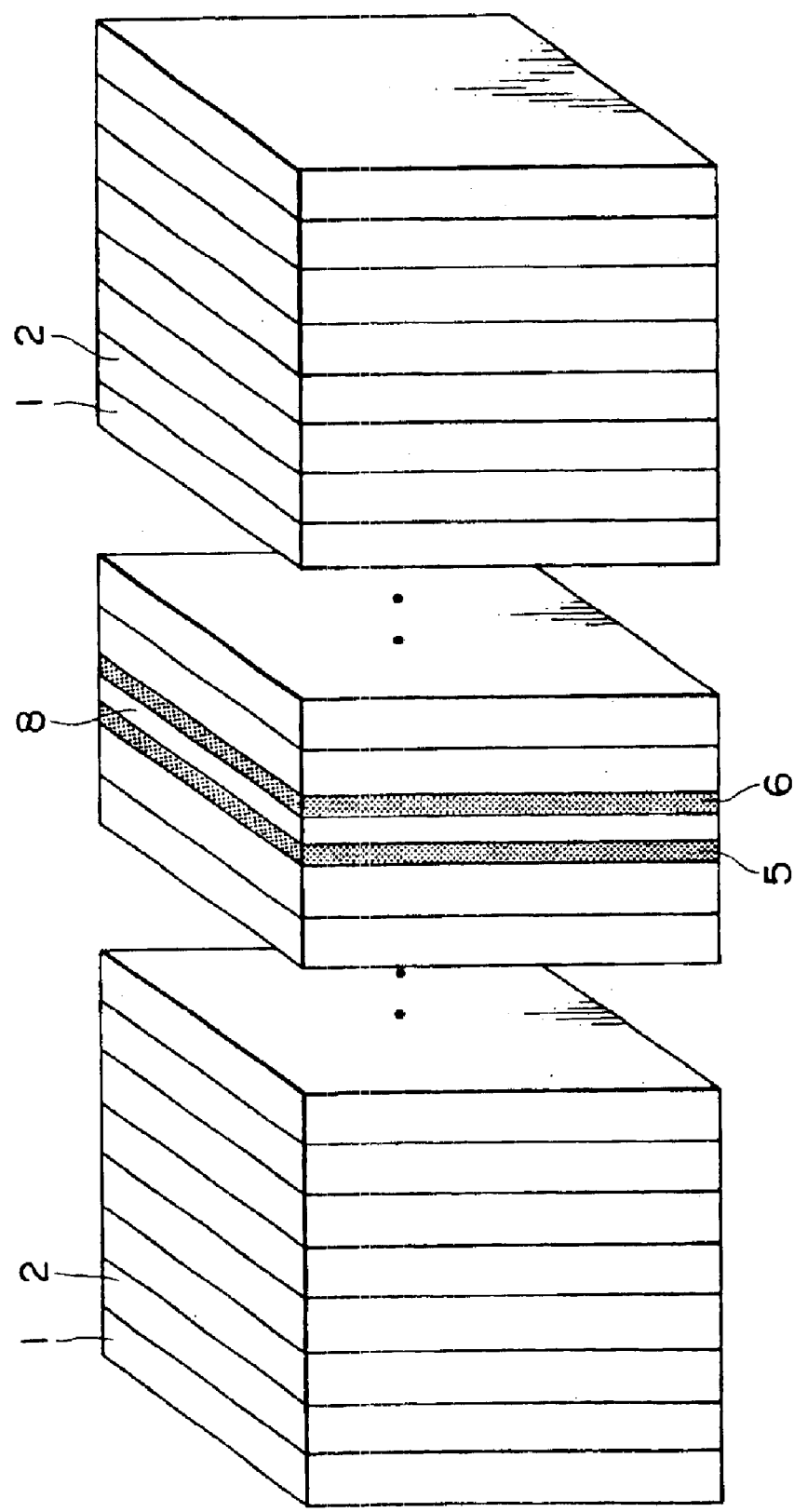
FIG. 31 is a schematic diagram showing an optical functional device according to a fifteenth embodiment of the present invention.

FIG. 31 shows an optical functional device using the organic amine intercalation material thus obtained according to the fifteenth embodiment.

Referring to FIG. 31, the optical functional device according to the fifteenth embodiment has a structure in which an inorganic/organic intercalation material layer configured as an RNH3TiNbO5 layer 8 put between ITO layers 5 and 6 as transparent electrodes is inserted at the position of the M layer of the one-dimensional periodic structure having the composition of [(SiO2)n/(TiO2)m] shown in the first embodiment.

According to the fifteenth embodiment, when a voltage is applied between the ITO layers 5 and 6 to apply an electric field to the RNH3TiNbO5 layer 8 in the thickness direction, molecular chains are aligned in the direction nearly parallel to the electric field direction due to the relationship between the dipole moment of the molecules and the external electric field, with a result that the C-axis lattice constant of the intercalation material is elongated. Accordingly, a transmission light peak, that is, the mobile peak MP can be located in the above-described photonic band gap or stop band.

According to the fifteenth embodiment, it is possible to realize a wavelength selection device capable of modulating a wavelength of light by controlling a voltage applied thereto.

[Embodiment 16]

An optical functional device according to a sixteenth embodiment will be described with reference to FIG. 32.

Figure 32:
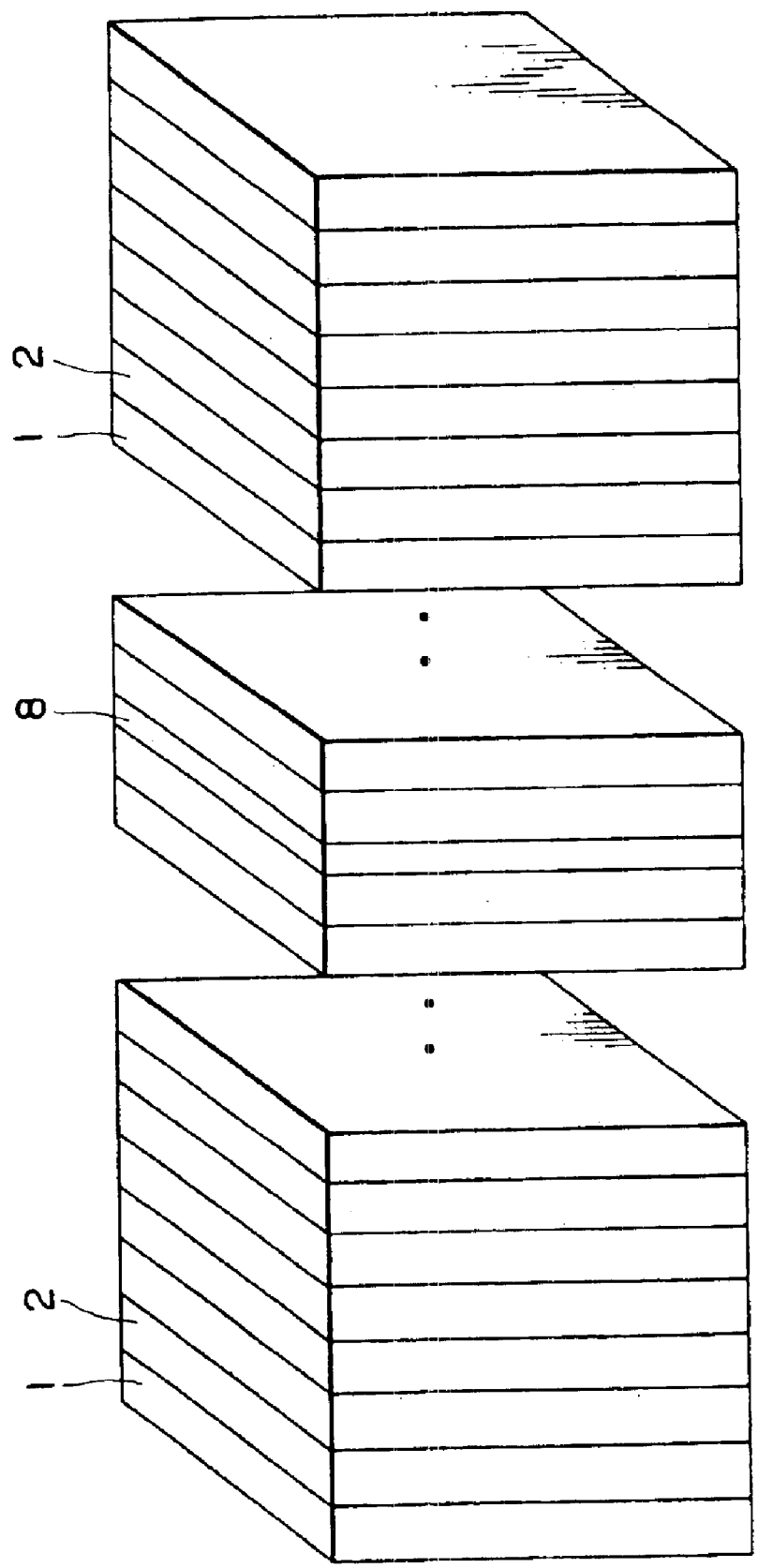
FIG. 32 is a schematic diagram showing an optical functional device according to a sixteenth embodiment of the present invention.

Referring to FIG. 32, the optical functional device according to the sixteenth embodiment has a structure in which an intercalation material layer configured as an RNH3TiNbO5 layer 8 is inserted at the position of the M layer shown in FIG. 5.

In the practical use, the optical functional device is put in an amine solution. In the amine solution, since the C-axis lattice constant of the RNH3TiNbO5 layer 8 is elongated, the thickness of the RNH3TiNbO5 layer 8 is increased. Here, since the increase in thickness of the RNH3TiNbO5 layer 8 is changed by the carbon number of the amine solution, the thickness of the RNH3TiNbO5 layer 8 can be controlled to a desired value by changing the carbon number of the amine solution. The RNH3TiNbO5 layer 8 can be returned to the original state by cleaning the optical functional device with hydrochloric acid.

According to the sixteenth embodiment, it is possible to realize an optical functional device capable of selecting a wavelength of transmission light by using an amine solution.

[Embodiment 17]

An optical functional device according to a seventeenth embodiment of the present invention will be described with reference to FIG. 33.

According to the seventeenth embodiment, as shown in FIG. 33, micro-balls 101, in each of which a so-called Kerr effect material causing molecular alignment by a strong electric field applied thereto, typically, carbon disulfide is contained, are three-dimensionally, periodically disposed, to form a three-dimensional periodic structure. The ball 101 may be a micro-capsule made from a ceramic material or an organic material. A transparent electrode 102 and a transparent electrode 103 are disposed at both ends of the three-dimensional periodic structure composed of the balls 101. Each of-the transparent electrodes 102 and 103 may be formed by an ITO film or a thin metal film allowing transmission of light.

According to the seventeenth embodiment, a voltage is applied between the transparent electrodes 102 and 103, to apply a specific weak electric field to the three-dimensional periodic structure, thereby aligning molecular chains in each ball 101 in parallel to the optical axis of incident light: In such a state, the polarization of incident light is not changed at all. Here, it is assumed that the refraction of light in the ball 101 has no anisotropy.

Next, control light having a strong field strength is made incident on the three-dimensional periodic structure. At this time, if the orientation of polarization of the control light is perpendicular to the optical axis, chains of carbon disulfide in the balls 101 in the irradiation region are aligned in parallel to the orientation of polarization. As a result, the refractive index against the incident light is partially changed at the above region irradiated with the control light. This means that the periodicity of the three-dimension periodic structure is disturbed by irradiation of the control light. In this way, the wavelength shift of the mobile peak MP appearing in the stop band of the signal light is controlled by the field strength of the control light supplied from external.

According to the seventeenth embodiment, it is possible to realize a wavelength selection device capable of selecting a wavelength of transmission light by control light.

[Embodiment 18]

A functional device according to an eighteenth embodiment of the present invention will be described below.

According to the eighteenth embodiment, a liquid crystal allowed to be aligned by an electric field of polarized light is enclosed in the balls 101 used in the seventeenth embodiment. Specific examples of the liquid crystals may include the following liquid crystals (1) to (5):

(1) Chiral Based Liquid Crystal

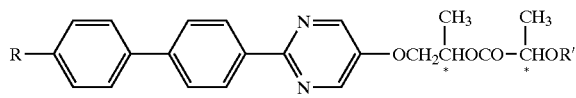

(2) Phenyl Pyrimidine Based Liquid Crystal

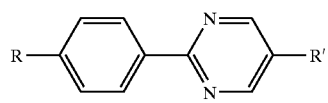

(3) Phenyl Pyridine Based Liquid Crystal

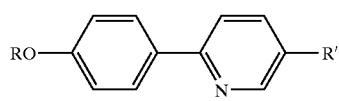

(4) Amine Based Liquid Crystal

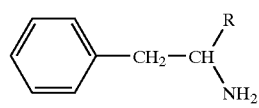

(5) Biphenyl Pyrimidine Based Liquid Crystal

The other configuration of the eighteenth embodiment is the same as that of the seventeenth embodiment, and therefore, the description thereof is omitted.

The eighteenth embodiment exhibits the same effect as that of the seventeenth embodiment.

[Embodiment 19]

An optical functional device according to an nineteenth embodiment, which relates to light emission control by a photonic crystal with a kinetic function, will be described with reference to FIGS. 34A to 34C, FIGS. 35A to 35C, and FIGS. 36A to 36C.

Figure 34C:
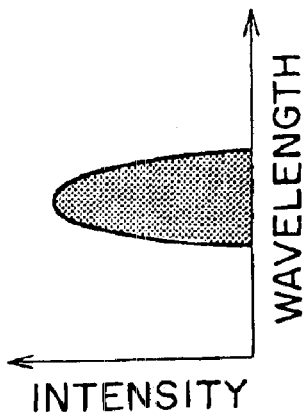
FIGS. 34A to 34C are schematic diagrams illustrating an optical functional device according to a nineteenth embodiment of the present invention.
Figure 34B:
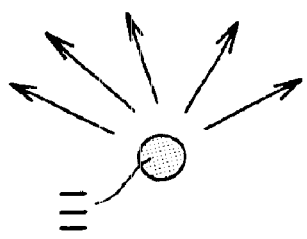
Figure 34A:
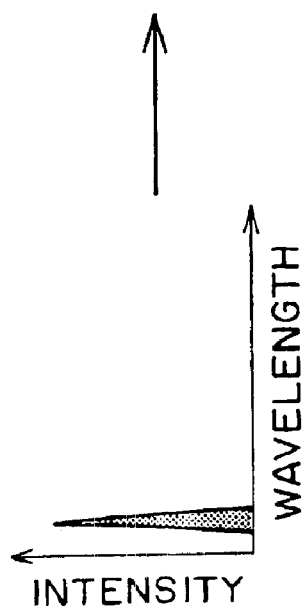

A luminous body 111 made from alumina or silica containing a rare earth element as a phosphor material is, as shown in FIG. 34B, irradiated with and excited by light having a spectral distribution shown in FIG. 34A, to cause light emission having a spectrum shown in FIG. 34C.

Figure 35C:
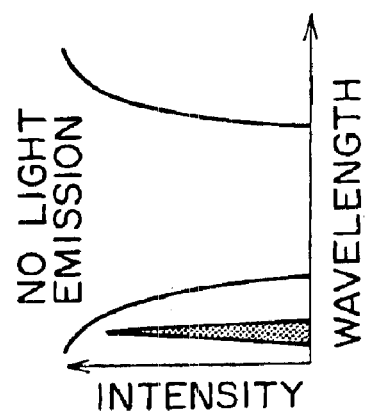
FIGS. 35A to 35C are schematic diagrams illustrating the optical functional device according to the nineteenth embodiment of the present invention.
Figure 35B:
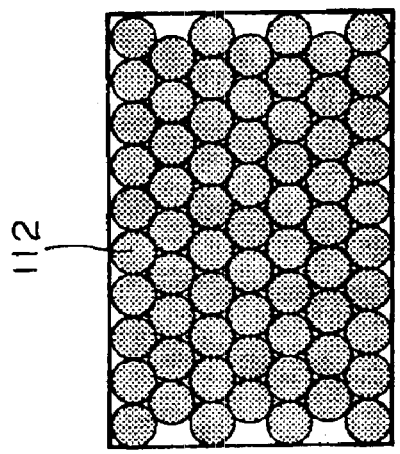
Figure 35A:
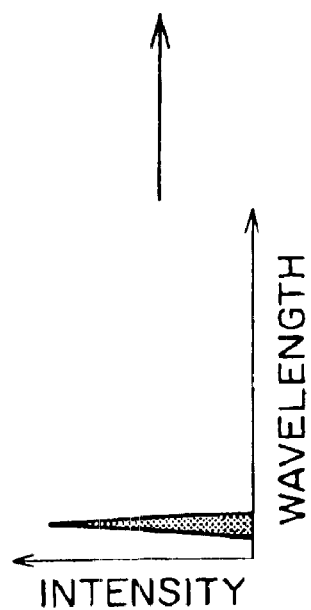
Figure 36A:
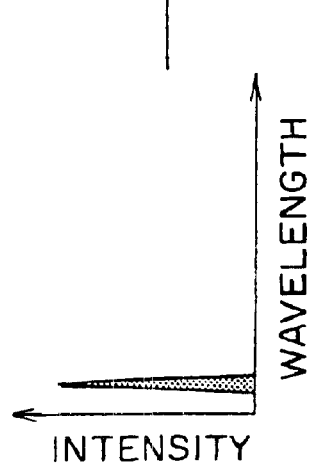
FIGS. 36A to 36C are schematic diagrams illustrating the optical functional device according to the nineteenth embodiment of the present invention.
Figure 36B:
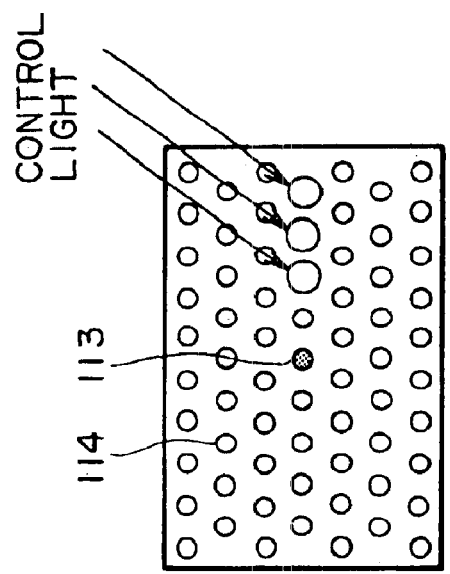
Figure 36C:
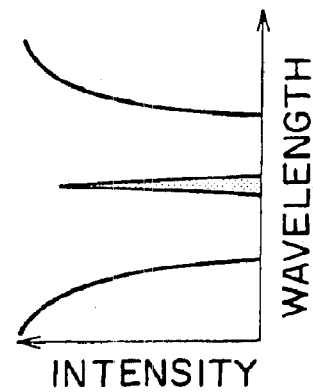

Next, a three-dimensional periodic structure shown in FIG. 35B, in which luminous bodies 112 made from a blue or green phosphor material such as ZnS are three-dimensionally disposed, is irradiated with light having a spectral distribution shown in FIG. 35A, to cause light emission having a spectrum shown in FIG. 35C. In other words, such a three-dimensional periodic structure constitutes a usual photonic crystal structure having a stop band.

According to the eighteenth embodiment, a kinetic function is given to such a photonic crystal. A three-dimensional periodic structure, which includes micro-balls 114 containing an optical strain effect material such as PLZT and also includes in part luminous bodies 113 made from a blue or green phosphor material such as ZnS shown in FIG. 35B, is irradiated with light having a spectral distribution shown in FIG. 36A. At this time, the micro-balls 114 of the three-dimensional periodic structure cause strain by control light supplied from external, to be enlarged. This configuration is similar to that shown in FIG. 23. As a result, light emitted from the luminous bodies 113, which have been excited by the incident light, is emerged from the three-dimensional periodic structure, to cause light emission having a spectrum shown in FIG. 36C. In this way, the mobile peak MP appears in the stop band of the signal light. The wavelength shift of the MP can be controlled by the field strength of the control light supplied from external.

To be more specific, the wavelength selection light emitting material allowing time setting according to this embodiment includes a periodic structure having a periodicity with a unit cycle on the order of a wavelength of an electromagnetic wave (wavelength of excitation light or emission wavelength), and a material made luminous due to inter band transition contained in the periodic structure, wherein excitation light having such a wavelength as to allow the light to substantially pass through the periodic structure is made incident on the periodic structure, so that the luminous material is irradiated with the excitation light, to allow electrons of the luminous material to be changed from a ground state to an excitation state, and the periodic structure has a photonic band gap for the emission wavelength allowing emission transition of the luminous material, to keep the state in which the emission transition of the luminous material is forbidden. With this configuration, when control light or control electric field is made incident from external on the periodic structure at an arbitrary time in such a state, the shape of a material, other than the luminous material of the periodic structure is changed or deformed, to disturb the periodicity of the periodic structure, with a result that the photonic field exerting an effect on the luminous material is changed, so that a window of a sharp wavelength of transmission light (which is equivalent to a mobile peak to be described later) is opened in the band gap, to allow emission transition of only the wavelength of the mobile peak of the luminous material.

According to the eighteenth embodiment, it is possible to realize a wavelength selection device capable of selecting a wavelength of transmission light by control light supplied from external.

[Embodiment 20]

An optical functional device according to a twentieth embodiment of the present invention will be described with reference to FIG. 37.

Figure 37:
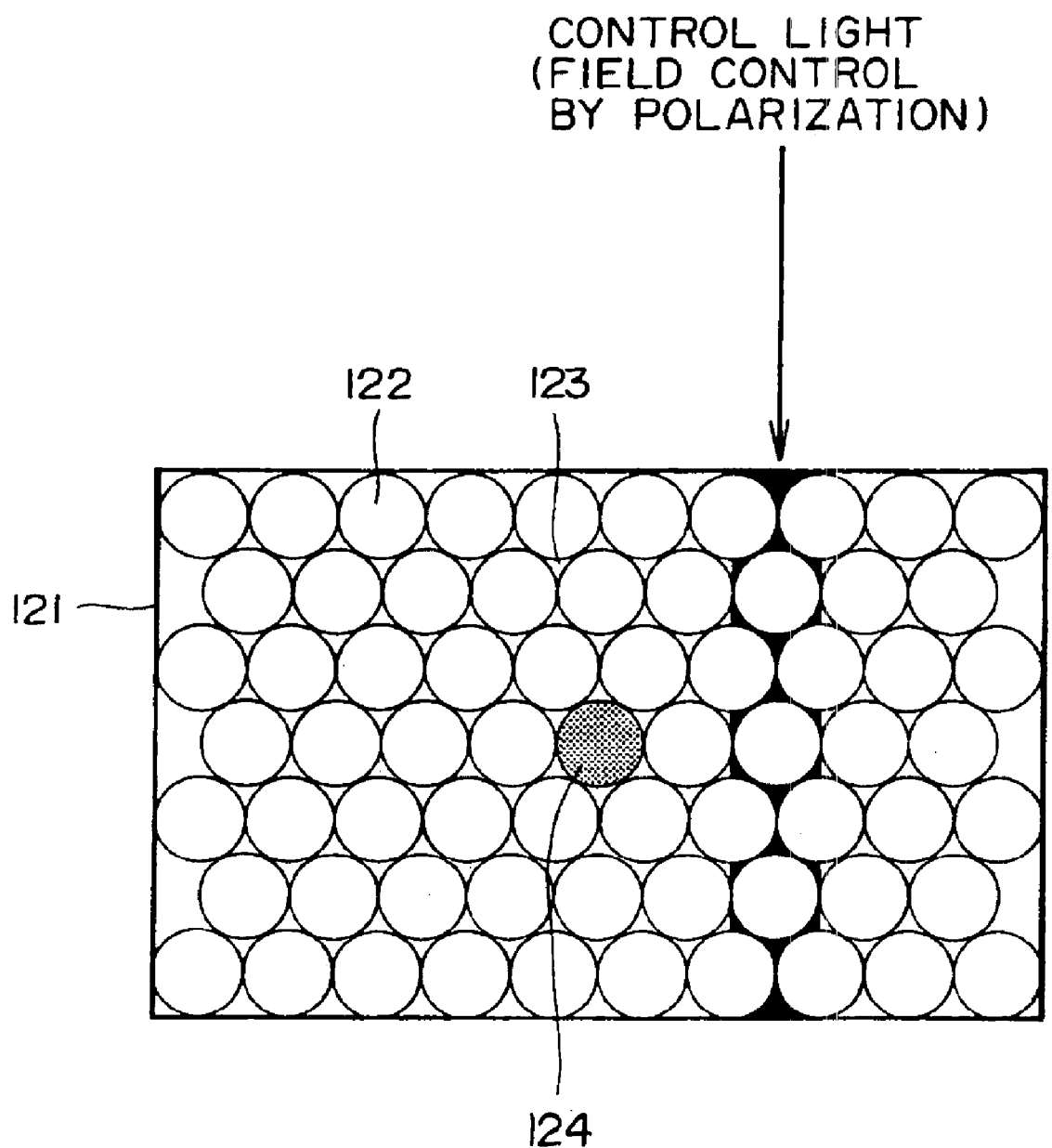
FIG. 37 is a schematic diagram illustrating n optical functional device according to a twentieth embodiment of the present invention.

According to the twentieth embodiment, as shown in FIG. 37, a vessel 121 is filled with micro-balls 122 to form a three-dimensional periodic structure, wherein gaps among the micro-balls 122 are filled with an electric field alignment type liquid organic material 123, and further luminous bodies 124 are inserted in the periodic structure. When control light is made incident on a specific portion of the three-dimensional periodic structure, chains of organic molecules of the organic material 123 are aligned in the vector of the electric field applied thereto, to thereby locally changing the refractive index of the organic material 123. With this configuration, like the nineteenth embodiment, the MP appears in the stop band of signal light.

Although the preferred embodiments of the present invention have been described, various variations may be made without departing the technical scope of the present invention.

That is to say, the numerical values, structures, shapes, materials, growth methods, processes, and the like used in the above-described embodiments are illustrative purposes only, and therefore, they can be changed without departing from the scope of the present invention.

The arrangement of the periodic structure and the piezoelectric element, and the wiring method in the artificially modulated light skin may be different from those described in the third to sixth embodiments.

In the first and second embodiments, the one-dimensional periodic structure is formed by alternately stacking $SiO_2$ and $TiO_2$; however, these materials may be replaced with other materials such as $CeO_2$, $ZrO_2$, $MgF_2$, $CaF_2$, $SnO_2$, $ZnO$, and $In_2O_3$, as needed.

The M layer as the foreign matter layer may be inserted in a plurality of portions of the one-dimensional periodic structure.

As described above, according to the functional material and the functional device of the present invention, it is possible to change a wavelength of an electromagnetic wave such as light or convert an incident electromagnetic wave into another electromagnetic wave whose attribute is different from the incident electromagnetic wave on the basis of a signal supplied from external.

Further, according to the functional material and the functional device of the present invention, it is possible to change a wavelength of a transmission sound wave such as a transmission ultrasonic wave or convert an incident sound wave into another sound wave whose attribute is different from that of the incident sound wave on the basis of a signal supplied from external.

What is claimed is:

1. A functional material comprising:
   a periodic structure having a periodicity with a unit cycle on the order of a wavelength of an electromagnetic wave; and
   means for disturbing the periodicity of said periodic structure, said means being provided in at least one portion of said periodic structure;
   wherein said means for disturbing the periodicity of said periodic structure is controllable from external.

2. A functional material according to claim 1, wherein a kinetic function or a change in refractive index is given to said means for disturbing the periodicity by controlling, from external, said means for disturbing the periodicity.

3. A functional material according to claim 1, wherein a first electromagnetic wave incident on said periodic structure is converted into a second electromagnetic wave, at least one attribute of which is different from that of said first electromagnetic wave, by controlling, from external, said means for disturbing the periodicity.

4. A functional material according to claim 3, wherein said attribute of said second electromagnetic wave is a traveling direction, a wavelength, an intensity, a polarization orientation, a spatial coherence, or a wavelength coherence of said second electromagnetic wave.

5. A functional material according to claim 1, wherein said periodic structure is a one-dimensional, two-dimensional, or three-dimensional periodic structure.

6. A functional material according to claim 1, wherein the unit cycle of said periodic structure is in a range of $\frac{1}{50}$ time to 50 times of a wavelength of an electromagnetic wave.

7. A functional material according to claim 1, wherein the unit cycle of said periodic structure is in a range of $\frac{1}{5}$ time to 5 times of a wavelength of an electromagnetic wave.

8. A functional material according to claim 1, wherein said periodic structure is formed by stacking, distributing, or building-up elements identical to each other, and said means for disturbing the periodicity is composed of an element different from said elements constituting said periodic structure.

9. A functional material according to claim 1, wherein said periodic structure is formed by stacking, distributing, or building-up two kinds or more materials, and said means for disturbing the periodicity is composed of a material different from said materials constituting said periodic structure.

10. A functional material according to claim 1, wherein said periodic structure is formed by stacking, distributing, or building-up two kinds or more materials, and said means for disturbing the periodicity is composed of a material which exhibits a kinetic function when receiving a signal from external.

11. A functional material according to claim 10, wherein said two kinds or more materials constituting said periodic structure are dielectric substances.

12. A functional material according to claim 11, wherein said dielectric materials are at least one kind of materials selected from a group consisting of oxides, fluorides, solid-solutions between oxides, solid-solutions between fluorides, chalcogenide compounds, single-semiconductors, and solid-solutions of single-semiconductors.

13. A functional material according to claim 12, wherein said oxides are at least two kinds of oxides selected from a group consisting of $TiO_2$, $SiO_2$, $ZrO_2$, $CeO_2$, $Al_2O_3$, $MgO$, $Si_xO_y$, $ThO_2$, $SnO_2$, $In_2O_3$, $ZnO$, $La_2O_3$, $Nd_2O_3$, $Sb_2O_3$, $Bi_2O_3$, $Pr_6O_{11}$, $Ti_xO_y$, $CaO$, and $SrTiO_3$.

14. A functional material according to claim 12, wherein said fluorides are at least two kinds of fluorides selected from a group consisting of $MgF_2$, $CeF_3$, $LaF_3$, $NdF_3$, $PbF_2$, $NaF$, $Na_3AlF_6$, $LiF$, and $CaF_2$.

15. A functional material according to claim 12, wherein said chalcogenide compounds are at least two kinds of chalcogenide compounds selected from a group consisting of $ZnS$, $ZnSe$, $CdS$, $CdSe$, $CdTe$, $PbS$, $PbTe$, and $Sb_2S_3$.

16. A functional material according to claim 12, wherein said single-semiconductors are at least two kinds of single-semiconductors selected from a group consisting of Si, Ge, and Te.

17. A functional material according to claim 10, wherein said material exhibiting a kinetic function is a piezoelectric material or a material having an electro-optic effect.

18. A functional material according to claim 10, wherein said material exhibiting a kinetic function is a perovskite-type piezoelectric material or an ilmenite-type piezoelectric material.

19. A functional material according to claim 18, wherein said perovskite-type piezoelectric material is one kind of perovskite-type piezoelectric materials selected from a group consisting of $Pb(ZrTi)O_3$, $(PbLa)(ZrTi)O_3$, $BaTiO_3$, $(BaSrCa)(TiZrSnHf)O_3$, and $PbTiO_3$.

20. A functional material according to claim 18, wherein said ilminite-type piezoelectric material is $LiNbO_3$ or $LiTaO_3$.

21. A functional material according to claim 10, wherein said material exhibiting a kinetic function is at least one kind of piezoelectric materials selected from a group consisting of $Bi_{12}SiO_{20}$, $Bi_{12}GeO_{20}$, $Bi_{12}TiO_{20}$, KDP, $K(TaNb)O_3$, $(SrBa)Nb_2O_6$, $ZnO$, and $(ZnMg)O$.

22. A functional material according to claim 10, wherein said material exhibiting a kinetic function is a semiconductor material having no center of symmetry.

23. A functional material according to claim 22, wherein said semiconductor material having no center of symmetry is selected from CdTe, GaAs, InP, ZnS, ZnSe, and these semiconductors are doped with a trace of active metal ions.

24. A functional material according to claim 10, wherein said material exhibiting a kinetic function is a host-guest type inorganic-organic composite material.

25. A functional material according to claim 24, wherein a host of said host-guest type inorganic-organic composite material is an inorganic lamellar material, and a base material thereof is a lamellar perovskite-type niobium containing material, a lamellar perovskite-type copper containing material, a lamellar titanate niobate, a lamellar rock salt structure oxide, a transition metal oxide material, a transition metal oxochloride, a lamellar polysilicate, a lamellar clay mineral, hydrotalcite, a transition metal chalcogenide, zirconium phosphate, or graphite.

26. A functional material according to claim 25, wherein said lamellar perovskite-type niobium containing material is $KLaNb_2O_7$, $KCa_2Nb_3O_{10}$, $RbCa_2Nb_3O_{10}$, $CsCa_2Nb_3O_{10}$, or $KNaCa_2Nb_4O_{13}$.

27. A functional material according to claim 25, wherein said lamellar perovskite-type copper containing material is $Bi_2Sr_2CaCu_2O_8$ or $Bi_2Sr_2Ca_2Cu_3O_{10}$.

28. A functional material according to claim 25, wherein said lamellar titanate niobate is $KTiNbO_5$, $K_2Ti_4O_9$, or $K_4Nb_6O_{17}$.

29. A functional material according to claim 25, wherein said rock salt structure oxide is $LiCoO_2$ or $LiNiO_2$.

30. A functional material according to claim 25, wherein said transition metal oxide is $MoO_3$, $V_2O_5$, $WO_3$, or $ReO_3$.

31. A functional material according to claim 25, wherein said transition metal oxochloride is $FeOCl$, $VOCl$, or $CrOCl$.

32. A functional material according to claim 25, wherein said lamellar polysilicate is $Na_2O\text{-}4SiO_2\text{-}7H_2O$.

33. A functional material according to claim 25, wherein said lamellar clay mineral is smectite, vermiculite, or mica.

34. A functional material according to claim 25, wherein said transition metal chalcogenide is $TaSe_2$, $TaS_2$, $MoS_2$, or $VSe_2$.

35. A functional material according to claim 10, wherein a conductive material for applying an electric field is formed on both side surfaces of said material exhibiting a kinetic function.

36. A functional material according to claim 35, wherein said conductive material is ITO ($In_2O_3$ $SnO_4$).

37. A functional material according to claim 36, wherein said material exhibiting a kinetic function is different in refractive index from said materials constituting said periodic structure.

38. A functional material according to claim 36, wherein said material exhibiting a kinetic function is identical in refractive index to said materials constituting said periodic structure.

39. A functional material according to claim 10, wherein letting A be a thin film made from a conductive material, B be a thin film made from a piezoelectric material or a material having an electro-optic effect different in refractive index from A, C be a thin film made from a paraelectric substance different in refractive index from each of A and B, said periodic structure includes a portion in which said thin films A, B, and C are stacked in the order of ABAC.

40. A functional material according to claim 10, wherein said periodic structure includes a portion in which thin films made from a conductive material are periodically stacked on piezoelectric materials or materials having an electro-optic effect different in refractive index from said thin films made from a conductive material.

41. A functional material according to claim 10, wherein said functional material is formed on a flexible base, to form an artificial skin.

42. A functional material according to claim 10, wherein said functional material is formed on a silicon base, to form an artificial skin.

43. A functional material according to claim 10, wherein said functional materials are two-dimensionally, periodically formed on a base in such a manner as to be separated from each other, to form an artificial skin, and part of said functional materials are deformed on the basis of a signal supplied from external.

44. A functional material according to claim 1, wherein said periodic structure is formed by stacking, distributing, or building-up two kinds or more elements, and said means for disturbing the periodicity includes a material whose refractive index is changed on the basis of a signal supplied from external.

45. A functional material according to claim 44, wherein said material whose refractive index is changed is a polar organic material.

46. A functional material according to claim 44, wherein said material whose refractive index is changed is a liquid crystal material.

47. A functional material according to claim 46, wherein said liquid crystal material is a field alignment type liquid crystal material.

48. A functional material according to claim 44, wherein said material whose refractive index is changed is urea or its associated material.

49. A functional material according to claim 44, wherein said material whose refractive index is changed is carbon disulfide or its associated material.

50. A functional material according to claim 44, wherein said material whose refractive index is changed is a spiropyran based compound, a $WO_3$ based electrochromism associated material, or a photochromism inorganic oxide.

51. A functional material according to claim 50, wherein said photochromism inorganic oxide is $LiNbO_3$:Fe, $BaTiO_3$:Ce, or $SrTiO_3$:Fe.

52. A functional material according to claim 1, wherein said means for disturbing the periodicity is composed of a material deformed by light irradiation or electric field application.

53. A functional material according to claim 1, wherein said periodic structure is composed of a group of dots formed on a base by printing.

54. A functional device comprising:
    a periodic structure having a periodicity with a unit cycle on the order of a wavelength of an electromagnetic wave; and
    means for disturbing the periodicity of said periodic structure, said means being provided in at least one portion of said periodic structure;
    wherein said means for disturbing the periodicity of said periodic structure is controllable from external.

55. A functional device according to claim 54, wherein a pair of said functional devices, each of which has said periodic structure formed by a group of projections periodically disposed on a base, are movably opposed with said group of projections directed inwardly.

56. A functional device according to claim 54, wherein said periodic structure is formed by a group of piezoelectric elements periodically disposed on a base, and those selected from said piezoelectric elements are warped when receiving a signal from external.

57. A functional device according to claim 54, wherein said periodic structure is formed by stacking, distributing, or building-up two kinds or more materials, and said means for distributing the periodicity includes a material which exhibits a kinetic function when receiving a signal from external.

58. A functional device according to claim 57, wherein said periodic structure has a three-dimensional shape having six planes including a pair of opposed planes and electrodes for applying an electric field to said material exhibiting a kinetic function are provided on said pair of planes; and when light having a broad wavelength distribution is made incident on said periodic structure in parallel to said pair of planes provided with said electrodes, the wavelength of the light passing through said periodic structure is changed by applying an electric field to said material exhibiting a kinetic function by using said electrodes.

59. A functional material comprising:

a periodic structure having a periodicity with a unit cycle on the order of a wavelength of a sound wave.

60. A functional material according to claim 59, wherein a first sound wave is converted into a second sound wave, at least one attribute of which is different from that of said first sound wave.

61. A functional material according to claim 60, wherein said attribute of said second sound wave is a traveling direction, a wavelength, an intensity, a polarization orientation, a spatial coherence, or a wavelength coherence of said second sound wave.

62. A functional material according to claim 59, wherein said periodic structure is a one-dimensional, two-dimensional, or three-dimensional periodic structure.

63. A functional material according to claim 59, wherein the unit cycle of said periodic structure is in a range of 1/50 time to 50 times of a wavelength of a sound wave.

64. A functional material according to claim 59, wherein the unit cycle of said periodic structure is in a range of 1/5 time to 5 times of a wavelength of a sound wave.

65. A functional material according to claim 59, said sound wave is an ultrasonic wave.

66. A functional material according to claim 59, wherein said periodic structure is formed by stacking, distributing, or building-up elements identical to each other.

67. A functional material according to claim 59, wherein said periodic structure is composed of a group of dots formed on a base by printing.

68. A functional material according to claim 59, wherein said periodic structure is composed of a thread-like material.

69. A functional material according to claim 59, wherein said periodic structure is composed of Peltier elements periodically disposed on a base.

70. A functional material comprising:

a periodic structure having a periodicity with a unit cycle on the order of a wavelength of a sound wave; and means for disturbing the periodicity is provided in at least one portion of said periodic structure.

71. A functional material according to claim 70, wherein a first sound wave is converted into a second sound wave, at least one attribute of which is different from that of said first sound wave.

72. A functional material according to claim 71, wherein said attribute of said second sound wave is a traveling direction, a wavelength, an intensity, a polarization orientation, a spatial coherence, or a wavelength coherence of said second sound wave.

73. A functional material according to claim 70, wherein said periodic structure is a one-dimensional, two-dimensional, or three-dimensional periodic structure.

74. A functional material according to claim 70, wherein the unit cycle of said periodic structure is in a range of 1/50 time to 50 times of a wavelength of a sound wave.

75. A functional material according to claim 70, wherein the unit cycle of said periodic structure is in a range of 1/5 time to 5 times of a wavelength of a sound wave.

76. A functional material according to claim 70, said sound wave is an ultrasonic wave.

77. A functional material according to claim 70, wherein said periodic structure is formed by stacking, distributing, or building-up elements identical to each other.

78. A functional material according to claim 70, wherein said periodic structure is composed of a group of dots formed on a base by printing, and said means for disturbing the periodicity is composed of a group of dots formed on said base by printing, said material for forming said dots constituting said means being different from that for forming said dots constituting said periodic structure.

79. A functional material according to claim 70, wherein said periodic structure is composed of a thread-like material, and said means for disturbing the periodicity is composed of a thread-like material different from said material constituting said periodic structure.

80. A functional material comprising:

a periodic structure having a periodicity with a unit cycle on the order of a wavelength of a sound wave; and means for disturbing the periodicity is provided in at least one portion of said periodic structure;

wherein said means for disturbing the periodicity is controllable from external.

81. A functional material according to claim 80, wherein the density of a gas in the vicinity of said means for distributing the periodicity is changed by controlling said means for distributing the periodicity from external.

82. A functional material according to claim 80, wherein a first sound wave incident on said periodic structure is changed from a second sound wave, at least one attribute of which is different from that of said first sound wave, by controlling said means for disturbing the periodicity from external.

83. A functional material according to claim 82, wherein said attribute of said second sound wave is a traveling direction, a wavelength, an intensity, a polarization orientation, a spatial coherence, or a wavelength coherence of said second sound wave.

84. A functional material according to claim 80, wherein said periodic structure is a one-dimensional, two-dimensional, or three-dimensional periodic structure.

85. A functional material according to claim 80, wherein the unit cycle of said periodic structure is in a range of 1/50 time to 50 times of a wavelength of a sound wave.

86. A functional material according to claim 80, wherein the unit cycle of said periodic structure is in a range of 1/5 time to 5 times of a wavelength of a sound wave.

87. A functional material according to claim 80, wherein said periodic structure is formed by stacking, distributing, or building-up elements identical to each other.

88. A functional material comprising:

a periodic structure containing a material made luminous due to inter-band transition;

wherein excitation light having such a wavelength as to allow said light to substantially pass through said periodic structure is made incident on said periodic structure from external, so that said luminous material is irradiated with said excitation light to allow electrons of said luminous material to be changed from a ground state to an excitation state; and said periodic structure has a photonic band gap for said emission wavelength allowing emission transition of said luminous material.

89. A wavelength selection light emitting material allowing time setting comprising:

a luminous material made luminous due to inter-band transition, said luminous material being contained in a periodic structure having a periodicity with a unit cycle on the order of a wavelength of excitation light or emission wavelength;

wherein when said wavelength selection light emission material is irradiated from external with excitation light, said luminous material is excited to cause electron transition to an excitation state, and said luminous material is made luminous on a basis of a signal.

90. A wavelength selection light emission material allowing time setting according to claim 89, wherein said luminous material causes the electron transition from a ground state to the excitation state by irradiating said luminous material with said excitation light which substantially passes through said periodic structure;

said periodic structure has a photonic band gap for the emission wavelength allowing emission transmission of said luminous material, to thereby keep a state in which the emission transition of said luminous material is forbidden; and the shape of a material, other than said luminous material, forming said periodic structure is changed or deformed on a basis of a signal, to disturb the periodicity of said periodic structure, with a result that the photonic field exerting an effect on said luminous material is changed, so that a window of a sharp mobile peak is opened in the photonic band gap, to allow emission transition of only light having a wavelength at the mobile peak of said luminous material.

* * * * *